US012369005B2

(12) United States Patent
Son et al.

(10) Patent No.: US 12,369,005 B2
(45) Date of Patent: Jul. 22, 2025

(54) APPARATUS AND METHOD FOR PROCESSING MULTI-CHANNEL AUDIO SIGNAL

(71) Applicant: SAMSUNG ELECTRONICS CO., LTD., Suwon-si (KR)

(72) Inventors: Yoonjae Son, Suwon-si (KR); Sangchul Ko, Suwon-si (KR); Woohyun Nam, Suwon-si (KR); Kyungrae Kim, Suwon-si (KR); Jungkyu Kim, Suwon-si (KR); Tammy Lee, Suwon-si (KR); Hyunkwon Chung, Suwon-si (KR); Sunghee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 17/749,840

(22) Filed: May 20, 2022

(65) Prior Publication Data

US 2022/0386055 A1 Dec. 1, 2022

Related U.S. Application Data

(63) Continuation of application No. PCT/KR2022/006983, filed on May 16, 2022.

(30) Foreign Application Priority Data

May 21, 2021 (KR) ........................ 10-2021-0065662
Oct. 20, 2021 (KR) ........................ 10-2021-0140581

(51) Int. Cl.
*G10L 19/008* (2013.01)
*G10L 25/21* (2013.01)
(Continued)

(52) U.S. Cl.
CPC .............. *H04S 3/008* (2013.01); *G10L 25/21* (2013.01); *G10L 25/30* (2013.01); *G10L 25/51* (2013.01);
(Continued)

(58) Field of Classification Search
CPC ..... H04S 3/008; H04S 2400/01; G10L 25/21; G10L 25/30; G10L 25/51; G10L 25/78
(Continued)

(56) References Cited

U.S. PATENT DOCUMENTS 8,515,759 B2 8/2013 Engdegard et al.
9,031,243 B2 5/2015 LeBoeuf et al.
(Continued)

FOREIGN PATENT DOCUMENTS

KR 10-2009-0057131 A 6/2009
KR 10-1328962 B1 11/2013
(Continued)

OTHER PUBLICATIONS

Ko, et al., "Polyphonic sound event detection using multi-channel audio features and gated recurrent neural networks", 2017, The Journal of the Acoustical Society of Korea vol. 36, No. 4, 7 pages total, https://doi.org/10.7776/ASK.2017.36.4.267.
(Continued)

*Primary Examiner* — William J Deane, Jr.
(74) *Attorney, Agent, or Firm* — Sughrue Mion, PLLC

(57) ABSTRACT

An apparatus for processing audio includes at least one processor configured to obtain a down-mixed audio signal from a bitstream, to obtain down-mixing-related information from the bitstream, to de-mix the down-mixing-related information by using down-mixing-related information, and to reconstruct an audio signal including at least one frame based on the de-mixed audio signal. The down-mixing-
(Continued)

related information is information generated in units of frames by using an audio scene type.

18 Claims, 37 Drawing Sheets

(51) Int. Cl.

| | |
|---|---|
| ***G10L 25/30*** | (2013.01) |
| ***G10L 25/51*** | (2013.01) |
| ***G10L 25/78*** | (2013.01) |
| ***H04S 3/00*** | (2006.01) |

(52) U.S. Cl.
CPC .......... *G10L 25/78* (2013.01); *H04S 2400/01* (2013.01); *H04S 2400/03* (2013.01)

(58) Field of Classification Search
USPC .......................................... 381/1, 2, 17, 103
See application file for complete search history.

(56) References Cited

U.S. PATENT DOCUMENTS

| | | | |
|---|---|---|---|
| 9,361,897 | B2 | 6/2016 | Yoo et al. |
| 9,565,509 | B2 | 2/2017 | Engdegard et al. |
| 10,163,446 | B2 | 12/2018 | Koppens et al. |
| 10,674,302 | B2 | 6/2020 | Ward et al. |
| 10,904,692 | B2 | 1/2021 | Robinson et al. |
| 2010/0316230 | A1 | 12/2010 | Oh et al. |
| 2011/0015770 | A1* | 1/2011 | Seo ....................... G10L 19/008 700/94 |
| 2015/0243289 | A1 | 8/2015 | Radhakrishnan et al. |
| 2017/0034639 | A1* | 2/2017 | Chon ...................... H04S 3/008 |
| 2020/0015028 | A1 | 1/2020 | Pihlajakuja et al. |
| 2020/0252736 | A1 | 8/2020 | Chon |
| 2021/0400421 | A1 | 12/2021 | Tsingos et al. |
| 2022/0020382 | A1 | 1/2022 | Wuebbolt et al. |
| 2022/0286799 | A1* | 9/2022 | Lee ....................... G10L 19/008 |
| 2023/0041256 | A1* | 2/2023 | Wu ..................... G10L 21/0216 |
| 2023/0360665 | A1* | 11/2023 | Kim ........................ G10L 15/16 |

FOREIGN PATENT DOCUMENTS

| | | | |
|---|---|---|---|
| KR | 10-2014-0017682 | A | 2/2014 |
| KR | 10-2015-0032718 | A | 3/2015 |
| WO | 2023/210978 | A1 | 11/2023 |
| WO | 2023/219292 | A1 | 11/2023 |

OTHER PUBLICATIONS

Jang, et al., "A Study on Realistic Sound Reproduction for UHDTV", 2015, Journal of the Korea Broadcasting Engineers, vol. 20, No. 1, http://dx.doi.org/10.5909/JBE.2015.20.1.68, 15 pages total.

International Search Report (PCT/ISA/210) issued Aug. 17, 2022 by the International Searching Authority for International Patent Application No. PCT/KR2022/006983.

Written Opinion (PCT/ISA/237) issued Aug. 17, 2022 by the International Searching Authority for International Patent Application No. PCT/KR2022/006983.

Communication dated Jun. 19, 2024, issued by the European Patent Office in counterpart European Application No. 22804931.8.

Woo Hyun Nam et al., "AI 3D immersive audio codec based on content-adaptive dynamic down-mixing and up-mixing framework," Audio Engineering Society, Convention Paper 10525 presented at the 151st Convention, Oct. 2021, total 7 pages, XP55906966A.

* cited by examiner

FIG. 6A

610

| | BCG | DCG #1 | DCG #2 |
|---|---|---|---|
| Case 1 | 2ch | 4ch | 6ch |
| | C1 | C2 M1 M2 | C3 C4 C5 |
| | 3.1.2ch | | |
| | 7.1.4ch | | |

C1 = L2 / R2
C2 = Hfl3 / Hfr3
M1 = C
M2 = LFE
C3 = L / R
C4 = Ls / Rs
C5 = Hfl / Hfr

620

| | BCG | DCG #1 | DCG #2 |
|---|---|---|---|
| Case 2 | 2ch | 6ch | 4ch |
| | C1 | C2 C3 M1 M2 | C4 C5 |
| | 7.1.0ch | | |
| | 7.1.4ch | | |

C1 = L2 / R2
C2 = L / R
C3 = Ls / Rs
M1 = C
M2 = LFE
C4 = Hfl / Hfr
C5 = Hbl / Hbr

630

| | BCG | DCG #1 |
|---|---|---|
| Case 3 | 2ch | 10ch |
| | C1 | C2 C3 C4 C5 M1 M2 |
| | 7.1.4ch | |

C1 = L2 / R2
C2 = L / R
C3 = Ls / Rs
C4 = Hfl / Hfr
C5 = Hbl / Hbr
M1 = C
M2 = LFE

APPARATUS AND METHOD FOR PROCESSING MULTI-CHANNEL AUDIO SIGNAL

CROSS-REFERENCE TO RELATED APPLICATION

This application is a bypass continuation of International Application No. PCT/KR2022/006983, filed on May 16, 2022, which is based on and claims priority to Korean Patent Application No. 10-2021-0065662, filed on May 21, 2021, in the Korean Intellectual Property Office and to Korean Patent Application No. 10-2021-0140581, filed on Oct. 20, 2021, in the Korean Intellectual Property Office, the disclosures of which are incorporated by reference herein in their entireties.

TECHNICAL FIELD

The disclosure relates to the field of processing a multi-channel audio signal. More particularly, the disclosure relates to the field of processing an audio signal of a lower channel layout (for example, a three-dimensional (3D) audio channel layout in front of a listener) from a multi-channel audio signal. The disclosure relates to the field of performing down-mixing processing or up-mixing processing on a multi-channel audio signal according to an audio scene type. In addition, the disclosure relates to the field of performing down-mixing processing or up-mixing processing on a multi-channel audio signal according to an energy value of an audio signal of a height channel.

BACKGROUND ART

An audio signal is generally a two-dimensional (2D) audio signal, such as a 2 channel audio signal, a 5.1 channel audio signal, a 7.1 channel audio signal, and a 9.1 channel audio signal.

However, it may be necessary to generate a three-dimensional (3D) audio signal (an n-channel audio signal or a multi-channel audio signal, in which n is an integer greater than 2) from a 2D audio signal to provide a spatial 3D effect of sound due to uncertainty of audio information in a height direction.

In a conventional channel layout for a 3D audio signal, a channel is arranged omni-directionally around a listener. However, there are increasing needs for a viewer who wants to experience an immersive sound, such as theater content in a home environment, according to expansion of an Over-The-Top (OTT) service, an increase in the resolution of a television (TV), and enlargement of a screen of an electronic device such as a tablet. Accordingly, there is a need to process an audio signal of a 3D audio channel layout (a 3D audio channel layout in front of the listener) in which a channel is arranged in front of the listener in consideration of sound image representation of an object (a sound source) on the screen.

In addition, in the case of a conventional 3D audio signal processing system, an independent audio signal for each independent channel of a 3D audio signal has been encoded/decoded. In particular, to reconstruct a two-dimensional (2D) audio signal (such as a conventional stereo audio signal) after a 3D audio signal is reconstructed, the reconstructed 3D audio signal needs to be down-mixed.

DESCRIPTION OF EMBODIMENTS

Technical Problem

An embodiment of the disclosure provides processing a multi-channel audio signal for supporting a three-dimensional (3D) audio channel layout in front of a listener.

Solution to Problem

In accordance with an aspect of the disclosure, a method of processing audio includes identifying an audio scene type of an audio signal, the audio signal including at least one frame; determining down-mixing-related information in units of frames, the down-mixing-related information corresponding to the audio scene type; down-mixing the audio signal by using the down-mixing-related information; and transmitting the down-mixed audio signal and the down-mixing-related information.

The identifying of the audio scene type may include obtaining a center channel audio signal from the audio signal; identifying a dialogue type from the obtained center channel audio signal; obtaining a front channel audio signal and a side channel audio signal from the audio signal; identifying a sound effect type based on the front channel audio signal and the side channel audio signal; and identifying the audio scene type based on at least one of the identified dialogue type and the identified sound effect type.

The identifying of the dialogue type may include identifying the dialogue type by using a first neural network for identifying the dialogue type; identifying the dialogue type as a first dialogue type when a probability value of the dialogue type identified by using the first neural network is greater than a predetermined first probability value for the first dialogue type; and identifying the dialogue type as a default dialogue type when the probability value of the dialogue type identified by using the first neural network is less than or equal to the predetermined first probability value.

The identifying of the sound effect type may include identifying the sound effect type by using a second neural network for identifying the sound effect type; identifying the sound effect type as a first sound effect type when a probability value of the sound effect type identified by using the second neural network is greater than a predetermined second probability value for the first sound effect type; and identifying the sound effect type as a default sound effect type when the probability value of the sound effect type identified by using the second neural network is less than or equal to the predetermined second probability value.

The identifying of the audio scene type based on the at least one of the identified dialogue type or the identified sound effect type may include identifying the audio scene type as a first dialogue type when the identified dialogue type is the first dialogue type; identifying the audio scene type as a first sound effect type when the identified sound effect type is the first sound effect type; and identifying the audio scene type as a default type when the identified dialogue type is the default type and the identified sound effect type is the default type.

The transmitted down-mixing-related information may include index information indicating one of a plurality of audio scene types.

The method may further include detecting a sound source object; and identifying an additional weight parameter for mixing from a surround channel to a height channel, based on information about the detected sound source object, wherein the down-mixing-related information further includes the additional weight parameter.

The method may further include identifying an energy value of a height channel audio signal from the audio signal; identifying an energy value of a surround channel audio signal from the audio signal; and identifying an additional weight parameter for mixing from the surround channel to the height channel, based on the identified energy value of the height channel audio signal and the identified energy value of the surround channel audio signal, wherein the down-mixing-related information further includes the additional weight parameter.

The identifying of the additional weight parameter may include identifying the additional weight parameter as a first value, when the energy value of the height channel audio signal is greater than a predetermined first value and a ratio of the energy value of the height channel audio signal to the energy value of the surround channel audio signal is greater than a predetermined second value; and identifying the additional weight parameter as a second value, when the energy value of the height channel audio signal is less than or equal to the predetermined first value or the ratio is less than or equal to the predetermined second value.

The identifying of the additional weight parameter may include identifying a weight level for at least one time section of the audio signal based on a weight target ratio within audio content of the audio signal; and identifying the additional weight parameter corresponding to the weight level, and wherein a weight of a boundary section between a first time section of the audio signal and a second time section of the audio signal has a value between a weight of a remaining section of the first time section excluding the boundary section and a weight of a remaining section of the second time section excluding the boundary section.

The down-mixing may include identifying a down-mix profile corresponding to the audio scene type; obtaining, according to the down-mix profile, a down-mixing weight parameter for mixing from a first audio signal of at least one first channel to a second audio signal of a second channel; and down-mixing the audio signal based on the obtained down-mixing weight parameter, and the down-mixing weight parameter may correspond to the audio scene type is previously determined.

The detecting of the sound source object may include identifying a movement of the sound source object and a direction of the sound source object based on correlation and delay between channels of the audio signal; and identifying a type of the sound source object and characteristics of the sound source object from the audio signal by using a Gaussian mixed model-based object estimation probability model, wherein the information about the detected sound source object includes information about at least one of the movement of the sound source object, the direction of the sound source object, the type of the sound source object, or the characteristics of the sound source object, and wherein the identifying the additional weight parameter includes identifying the additional weight parameter for mixing from the surround channel to the height channel based on the at least one of the movement of the sound source object, the direction of the sound source object, the type of the sound source object, or the characteristics of the sound source object.

In accordance with an aspect of the disclosure, a method of processing audio includes obtaining a down-mixed audio signal from a bitstream; obtaining down-mixing-related information from the bitstream, wherein the down-mixing-related information is generated in units of frames by using an audio scene type; de-mixing the down-mixed audio signal by using the down-mixing-related information; and reconstructing an audio signal including at least one frame based on the de-mixed audio signal.

The audio scene type may be identified based on at least one of a dialogue type or a sound effect type.

The audio signal may include an up-mixed channel group audio signal, wherein the up-mixed channel group audio signal includes an up-mixed channel audio signal of at least one up-mixed channel, and wherein the up-mixed channel audio signal includes a second audio signal that is obtained through de-mixing from a first audio signal of at least one first channel.

The down-mixing-related information may further include information about an additional weight parameter for de-mixing from a height channel to a surround channel, and the reconstructing of the audio signal may include reconstructing the audio signal by using a down-mixing weight parameter and the information about the additional weight parameter.

In accordance with an aspect of the disclosure, an apparatus for processing audio includes at least one processor configured to execute one or more instructions, wherein the at least one processor is further configured to identify an audio scene type of an audio signal, the audio signal comprising at least one frame; determine down-mixing-related information in units of frames, the down-mixing-related information corresponding to the audio scene type; down-mix the audio signal by using the down-mixing-related information; and transmit the down-mixed audio signal and the down-mixing-related information.

In accordance with an aspect of the disclosure, an apparatus for processing audio includes at least one processor configured to execute one or more instructions, wherein the at least one processor is further configured to obtain a down-mixed audio signal from a bitstream; obtain down-mixing-related information from the bitstream, wherein the down-mixing-related information is generated in units of frames by using an audio scene type; de-mix the down-mixed audio signal by using the down-mixing-related information; and reconstruct an audio signal comprising at least one frame based on the de-mixed audio signal.

A method of processing audio according to an embodiment includes identifying an audio scene type of an audio signal including at least one frame, determining down-mixing-related information to correspond to the audio scene type; down-mixing the audio signal including the at least one frame by using the down-mixing-related information; generating, based on an audio scene type of a previous frame and an audio scene type of a current frame, flag information indicating whether the audio scene type of the previous frame is the same as the audio scene type of the current frame; and transmitting at least one of the down-mixed audio signal, the flag information, or the down-mixing-related information.

The transmitting may include, when the audio scene type of the previous frame is the same as the audio scene type of the current frame, transmitting flag information indicating that the audio scene type of the previous frame and the audio scene type of the current frame are the same, and down-mixing-related information for the previous frame, wherein down-mixing-related information for the current frame may not be transmitted.

The transmitting may include, when the audio scene type of the previous frame is the same as the audio scene type of the current frame, transmitting the down-mixed audio signal and the down-mixing-related information for the previous frame, wherein flag information indicating that the audio scene type of the previous frame and the audio scene type of the current frame are the same as each other and the down-mixing-related information for the current frame may not be transmitted.

According to an embodiment of the disclosure, a method for processing audio includes obtaining a down-mixed audio signal from a bitstream, obtaining, from the bitstream, flag information indicating whether an audio scene type of a previous frame and an audio scene type of a current frame are the same as each other, obtaining down-mixing-related information for the current frame based on the flag information, wherein the down-mixing-related information for the current frame is information generated by using the audio scene type thereof, de-mixing the down-mixed audio signal by using the down-mixing-related information for the current frame, and reconstructing an audio signal including at least one frame based on the de-mixed audio signal.

The obtaining of the down-mixing-related information of the current frame may include, when the flag information indicates that the audio scene type of the previous frame is the same as the audio scene type of the current frame, obtaining the down-mixing-related information for the current frame based on down-mixing-related information for the previous frame.

A computer-readable recording medium may have recorded thereon a program for implementing the method of an above-noted aspect of the disclosure.

Advantageous Effects of Disclosure

With a method and an apparatus for processing a multi-channel audio signal according to an embodiment of the disclosure, while supporting backward compatibility with a conventional stereo (2 channel) audio signal, both of an audio signal of a three-dimensional (3D) audio channel layout in front of a listener and an audio signal of a 3D audio channel layout omni-directionally around the listener may be encoded.

However, effects achieved by the apparatus and the method of processing a multi-channel audio signal according to an embodiment of the disclosure are not limited to those described above, and other effects that are not mentioned will be clearly understood by those of ordinary skill in the art to which this disclosure belongs from the following description.

BRIEF DESCRIPTION OF DRAWINGS

The above and other aspects, features, and advantages of certain embodiments of the disclosure will be more apparent from the following description taken in conjunction with the accompanying drawings, in which:

FIG. 6A is a view for describing a transmission order and a rule of an audio stream in each channel group by the audio encoding apparatuses according to an embodiment.

MODE OF DISCLOSURE

Figure 1A:
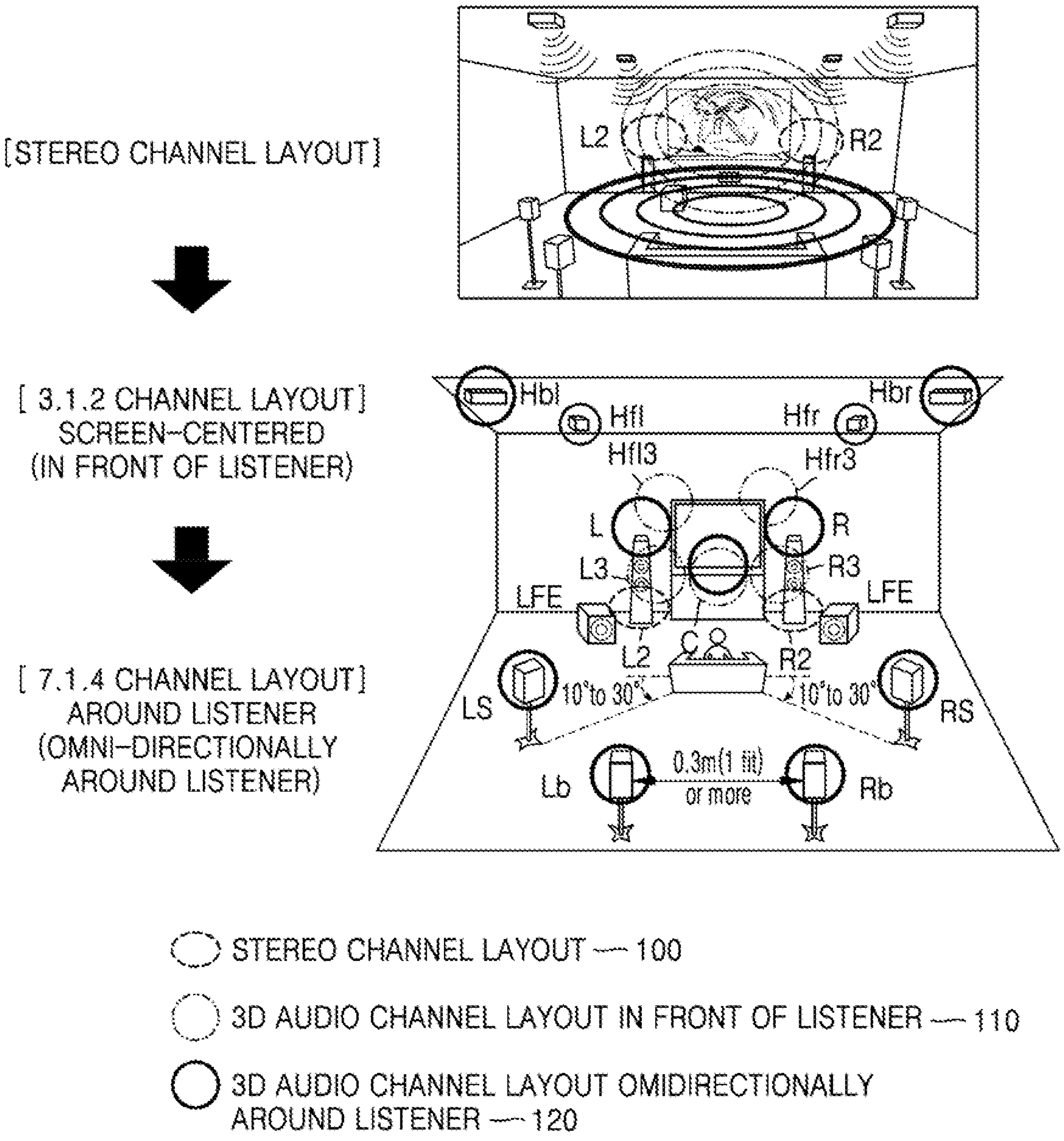
FIG. 1A is a view for describing a scalable channel layout structure according to an embodiment.

Throughout the disclosure, the expression "at least one of a, b or c" indicates only a, only b, only c, both a and b, both a and c, both b and c, all of a, b, and c, or variations thereof.

The disclosure may have various modifications thereto and various embodiments of the disclosure, and thus particular embodiments of the disclosure will be illustrated in the drawings and described in detail in a detailed description. It should be understood, however, that this is not intended to limit the disclosure to a particular embodiment of the disclosure, and should be understood to include all changes, equivalents, and alternatives falling within the spirit and scope of the disclosure.

In describing an embodiment of the disclosure, when it is determined that the detailed description of the related art unnecessarily obscures the subject matter, a detailed description thereof will be omitted. Moreover, a number (e.g., a first, a second, etc.) used in a process of describing an embodiment of the disclosure is merely an identification symbol for distinguishing one component from another component.

Moreover, herein, when a component is mentioned as being "connected" or "coupled" to another component, it may be directly connected or directly coupled to the another component, but unless described otherwise, it should be understood that the component may also be connected or coupled to the another component via still another component therebetween.

In addition, for a component represented by " . . . unit", "module", etc., two or more components may be integrated into one component or one component may be divided into two or more for each detailed function. Each component to be described below may additionally perform a function of some or all of functions in charge of other components in addition to a main function of the component, and some of the main functions of the components may be dedicated to and performed by other components.

Herein, a "deep neural network (DNN)" is a representative example of an artificial neural network model simulating a brain nerve, and is not limited to an artificial neural network model using a specific algorithm.

Herein, a "parameter" may be a value used in an operation process of each layer constituting a neural network, and may include, for example, a weight (and a bias) used in application of an input value to a predetermined calculation formula. The parameter may be expressed in the form of a matrix. The parameter may be a value set as a result of training and may be updated through separate training data according to a need.

Herein, a "multi-channel audio signal" may mean an audio signal of n channels (where n is an integer greater than 2). A "mono channel audio signal" may be a one-dimensional (1D) audio signal, a "stereo channel audio signal" may be a two-dimensional (2D) audio signal, and a "multi-channel audio signal" may be a three-dimensional (3D) audio signal.

Herein, a "channel (speaker) layout" may represent a combination of at least one channel, and may specify spatial arrangement of channels (speakers). A channel used herein is a channel through which an audio signal is actually output, and thus may be referred to as a presentation channel.

For example, a channel layout may be a "X.Y.Z channel layout". Herein, X may be the number of surround channels, Y may be the number of subwoofer channels, and Z may be the number of height channels. The channel layout may specify a spatial location of a surround channel/subwoofer channel/height channel.

Examples of the "channel (speaker) layout" may include a 1.0.0 channel (or a mono channel) layout, a 2.0.0 channel (or a stereo channel) layout, a 5.1.0 channel layout, a 5.1.2 channel layout, a 5.1.4 channel layout, a 7.1.0 layout, a 7.1.2 layout, and a 3.1.2 channel layout, but the "channel layout" is not limited thereto, and there may be various other channel layouts.

Channels specified by the "channel (speaker) layout" may be referred to as various names, but may be uniformly named for convenience of explanation.

Channels constituting the "channel (speaker) layout" may be named based on respective spatial locations of the channels.

For example, a first surround channel of the 1.0.0 channel layout may be named as a mono channel. For the 2.0.0 channel layout, a first surround channel may be named as an L2 channel and a second surround channel may be named as an R2 channel.

Herein, "L" represents a channel located on the left side of a listener, and "R" represents a channel located on the right side of the listener. "2" represents that the number of surround channels is 2.

For the 5.1.0 channel layout, a first surround channel may be named as an L5 channel, a second surround channel may be named as an R5 channel, a third surround channel may be named as a C channel, a fourth surround channel may be named as an Ls5 channel, and a fifth surround channel may be named as an Rs5 channel. Herein, "C" represents a channel located at the center with respect to the listener. "s" refers to a channel located on a side of the listener. The first subwoofer channel of the 5.1.0 channel layout may be named as a low frequency effect (LFE) channel. Herein, LFE may refer to a low frequency effect. In other words, the LFE channel may be a channel for outputting a low frequency sound effect.

The surround channels of the 5.1.2 channel layout and the 5.1.4 channel layout may be named identically with the surround channels of the 5.1.0 channel layout. Similarly, the subwoofer channel of the 5.1.2 channel layout and the 5.1.4 channel layout may be named identically with the subwoofer channel of the 5.1.0 channel layout.

A first height channel of the 5.1.2 channel layout may be named as an Hl5 channel. Herein, H represents a height channel. A second height channel may be named as a Hr5 channel.

For the 5.1.4 channel layout, a first height channel may be named as an Hfl channel, a second height channel may be named as an Hfr channel, a third height channel may be named as an Hbl channel, and a fourth height channel may be named as an Hbr channel. Herein, f indicates a front channel with respect to the listener, and b indicates a back channel with respect to the listener.

For the 7.1.0 channel layout, a first surround channel may be named as an L channel, a second surround channel may be named as an R channel, a third surround channel may be named as a C channel, a fourth surround channel may be named as a Ls channel, a fifth surround channel may be named as an Rs channel, a sixth surround channel may be named as an Lb channel, and a seventh surround channel may be named as an Rb channel.

Respective surround channels of the 7.1.2 channel layout and the 7.1.4 channel layout may be named identically with the surround channels of the 7.1.0 channel layout. Similarly, respective subwoofer channels of the 7.1.2 channel layout and the 7.1.4 channel layout may be named identically with a subwoofer channel of the 7.1.0 channel layout.

For the 7.1.2 channel layout, a first height channel may be named as an Hl7 channel, and a second height channel may be named as a Hr7 channel.

For the 7.1.4 channel layout, a first height channel may be named as an Hfl channel, a second height channel may be named as an Hfr channel, a third height channel may be named as an Hbl channel, and a fourth height channel may be named as an Hbr channel.

For the 3.1.2 channel layout, a first surround channel may be named as an L3 channel, a second surround channel may be named as an R3 channel, and a third surround channel may be named as a C channel. A first subwoofer channel of the 3.1.2 channel layout may be named as an LFE channel. For the 3.1.2 channel layout, a first height channel may be named as an Hfl3 channel (or a Tl channel), and a second height channel may be named as an Hfr3 channel (or a Tr channel).

Herein, some channels may be named differently according to channel layouts, but may represent the same channel. For example, the Hl5 channel and the Hl7 channel may be the same channels. Similarly, the Hr5 channel and the Hr7 channel may be the same channels.

Meanwhile, channels are not limited to the above-described channel names, and various other channel names may be used.

For example, the L2 channel may be named as an L" channel, the R2 channel may be named as an R" channel, the L3 channel may be named as an ML3 (L') channel, the R3 channel may be named as an MR3 (R') channel, the Hfl3 channel may be named as an MHL3 channel, the Hfr3 channel may be named as an MHR3 channel, the Ls5 channel may be named as an MSL5 (Ls') channel, the Rs5 channel may be named as an MSR5 (Rs') channel, the Hl5 channel may be named as an MHL5 (Hl') channel, the Hr5 channel may be named as an MHR5 (Hr') channel, and the C channel may be named as a MC channel.

Channels of the channel layout for the above-described layout may be named as in Table 1.

TABLE 1

| channel layout | channel name |
|---|---|
| 1.0.0 | Mono |
| 2.0.0 | L2/R2 |
| 5.1.0 | L5/C/R5/Ls5/Rs5/LFE |
| 5.1.2 | L5/C/R5/Ls5/Rs5/Hl5/Hr5/LFE |
| 5.1.4 | L5/C/R5/Ls5/Rs5/Hfl/Hfr/Hbl/Hbr/LFE |
| 7.1.0 | L/C/R/Ls/Rs/Lb/Rb/LFE |
| 7.1.2 | L/C/R/Ls/Rs/Lb/Rb/Hl7/Hr7/LFE |
| 7.1.4 | L/C/R/Ls/Rs/Lb/Rb/Hfl/Hfr/Hbl/Hbr/LFE |
| 3.1.2 | L3/C/R3/Hfl3/Hfr3/LFE |

Meanwhile, a "transmission channel" is a channel for transmitting a compressed audio signal, and a portion of the "transmission channel" may be the same as the "presentation channel", but is not limited thereto, and another portion of the "transmission channel" may be a channel (mixed channel) of an audio signal in which an audio signal of the presentation channel is mixed. In other words, the "transmission channel" may be a channel containing the audio signal of the "presentation channel", but may be a channel of which a portion is the same as the presentation channel and the residual portion is a mixed channel different from the presentation channel.

The "transmission channel" may be named to be distinguished from the "presentation channel". For example, when the transmission channel is an A/B channel, the A/B channel may contain audio signals of L2/R2 channels. When the transmission channel is a T/P/Q channel, the T/P/Q channel may contain audio signals of C/LFE/Hfl3 and Hfr3 channels. When the transmission channel is an S/UN channel, the S/U/V channel may contain audio signals of L and R/Ls and Rs/Hfl and Hfr channels.

In the disclosure, a "3D audio signal" may refer to an audio signal for detecting the distribution of sound and the location of sound sources in a 3D space.

In the disclosure, a "3D audio channel in front of a listener" may refer to a 3D audio channel based on a layout of an audio channel disposed in front of the listener. The "3D audio channel in front of the listener" may be referred to as a "front 3D audio channel". In particular, the "3D audio channel in front of the listener" may be referred to as a "screen-centered 3D audio channel" because it is a 3D audio channel based on a layout of an audio channel arranged around the screen located in front of the listener.

In the disclosure, a "listener omni-direction 3D audio channel" may mean a 3D audio channel based on a layout of an audio channel arranged omni-directionally around the listener. The "listener omni-direction 3D audio channel" may be referred to as a "full 3D audio channel". Herein, the omni-direction may mean a direction including all of front, side, and rear directions. In particular, the "listener omni-direction 3D audio channel" may also be referred to as a "listener-centered 3D audio channel" because it is a 3D audio channel based on a layout of an audio channel arranged omni-directionally around the listener.

In the disclosure, a "channel group", which is a sort of data unit, may include a (compressed) audio signal of at least one channel. More specifically, the channel group may include at least one of a base channel group that is independent of another channel group or a dependent channel group that is dependent on at least one channel group. In this case, a target channel group on which a dependent channel group depends may be another dependent channel group, and may be a dependent channel group related to a lower channel layout. Alternatively, a channel group on which the dependent channel group depends may be a base channel group. The "channel group" contains a sort of data of the channel group so that the channel group may be referred to as a "coding group". The dependent channel group, which is used to further extend the number of channels from channels included in the base channel group, may be referred to as a scalable channel group or an extended channel group.

An audio signal of the "base channel group" may include an audio signal of a mono channel or an audio signal of a stereo channel. Without being limited thereto, the audio signal of the "base channel group" may include an audio signal of the 3D audio channel in front of the listener.

For example, the audio signal of the "dependent channel group" may include an audio signal of a channel other than the audio signal of the "base channel group" from among the audio signal of the 3D audio channel in front of the listener or the audio signal of the listener omni-direction 3D audio channel. In this case, a portion of the audio signal of the other channel may be an audio signal (i.e., an audio signal of a mixed channel) in which audio signals of at least one channel are mixed.

For example, the audio signal of the "base channel group" may be an audio signal of a mono channel or an audio signal of a stereo channel. The "multi-channel audio signal" reconstructed based on the audio signals of the "base channel group" and the "dependent channel group" may be the audio signal of the 3D audio channel in front of the listener or the audio signal of the listener omni-direction 3D audio channel.

In the disclosure, "up-mixing" may mean an operation in which the number of presentation channels of an output audio signal increases in comparison to the number of presentation channels of an input audio signal through de-mixing.

In the disclosure, "de-mixing" may mean an operation of separating an audio signal of a particular channel from an audio signal (i.e., an audio signal of a mixed channel) in which audio signals of various channels are mixed, and may mean one of mixing operations. In this case, "de-mixing" may be implemented as a calculation using a "de-mixing matrix" (or a "down-mixing matrix" corresponding thereto), and the "de-mixing" matrix may include at least one "de-mixing weight parameter" (or a "down-mixing weight parameter" corresponding thereto) as a coefficient of a de-mixing matrix (or a "down-mixing matrix" corresponding thereto). Alternatively, the "de-mixing" may be implemented as an arithmetic calculation based on a portion of the "de-mixing matrix" (or the "down-mixing matrix" corresponding thereto), and may be implemented in various manners, without being limited thereto. As described above, "de-mixing" may be related to "up-mixing".

"Mixing" may mean any operation of generating an audio signal of a new channel (i.e., a mixed channel) by summing values obtained by multiplying each of audio signals of a plurality of channels by a corresponding weight (i.e., by mixing the audio signals of the plurality of channels).

"Mixing" may be divided into "mixing" performed by an audio encoding apparatus in a narrow sense and "de-mixing" performed by an audio decoding apparatus.

"Mixing" performed in the audio encoding apparatus may be implemented as a calculation using "(down)mixing matrix", and "(down)mixing matrix" may include at least one "(down)mixing weight parameter" as a coefficient of the (down)mixing matrix. Alternatively, the "(down)mixing" may be implemented as an arithmetic calculation based on a portion of the "(down)mixing matrix", and may be implemented in various manners, without being limited thereto.

In the disclosure, an "up-mixed channel group" may mean a group including at least one up-mixed channel, and the "up-mixed channel" may mean a de-mixed channel separated through de-mixing with respect to an audio signal of an encoded/decoded channel. The "up-mixed channel group" in a narrow sense may include an "up-mixed channel". However, the "up-mixed channel group" in a broad sense may further include an "encoded/decoded channel" as well as the "up-mixed channel". Herein, the "encoded/decoded channel" may mean an independent channel of an audio signal encoded (compressed) and included in a bitstream or an independent channel of an audio signal obtained by being decoded from a bitstream. In this case, to obtain the audio signal of the encoded/decoded channel, a separate (de) mixing operation is not required.

The audio signal of the "up-mixed channel group" in the broad sense may be a multi-channel audio signal, and an output multi-channel audio signal may be one of at least one multi-channel audio signal (i.e., an audio signal of at least one up-mixed channel group or an up-mixed channel audio signal) as an audio signal output through a device such as a speaker.

In the disclosure, "down-mixing" may mean an operation in which the number of presentation channels of an output audio signal decreases in comparison to the number of presentation channels of an input audio signal through mixing.

In the disclosure, a "factor for error removal" (or an error removal factor (ERF)) may be a factor for removing an error of an audio signal, which occurs due to lossy coding.

The error of the audio signal, which occurs due to lossy coding, may include an error caused by quantization, more specifically, an error, etc., caused by encoding (quantization) based on psycho-acoustic characteristics. The "factor for error removal" may be referred to as a "coding error removal (CER) factor", or an "error cancelation ratio", etc. In particular, the "error removal factor" may be referred to as a "scale factor" because an error removal operation substantially corresponds to a scale operation.

Hereinbelow, embodiments of the disclosure according to the technical spirit of the disclosure will be sequentially described in detail.

FIG. 1A is a view for describing a scalable channel layout structure according to an embodiment of the disclosure.

A conventional 3D audio decoding apparatus receives a compressed audio signal of independent channels of a particular channel layout from a bitstream. The conventional 3D audio decoding apparatus reconstructs an audio signal of a listener omni-direction 3D audio channel by using the compressed audio signal of the independent channels received from the bitstream. In this case, only the audio signal of the particular channel layout may be reconstructed.

Alternatively, the conventional 3D audio decoding apparatus receives the compressed audio signal of the independent channels (a first independent channel group) of the particular channel layout from the bitstream. For example, the particular channel layout may be a 5.1 channel layout, and in this case, the compressed audio signal of the first independent channel group may be a compressed audio signal of five surround channels and one subwoofer channel.

Herein, to increase the number of channels, the conventional 3D audio decoding apparatus further receives a compressed audio signal of other channels (a second independent channel group) that are independent of the first independent channel group. For example, the compressed audio signal of the second independent channel group may be a compressed audio signal of two height channels.

That is, the conventional 3D audio decoding apparatus reconstructs an audio signal of a listener omni-direction 3D audio channel by using the compressed audio signal of the second independent channel group received from the bitstream, separately from the compressed audio signal of the first independent channel group received from the bitstream. Thus, an audio signal of an increased number of channels is reconstructed. Herein, the audio signal of the listener omni-direction 3D audio channel may be an audio signal of a 5.1.2 channel.

On the other hand, a legacy audio decoding apparatus that supports only reproduction of the audio signal of the stereo channel does not properly process the compressed audio signal included in the bitstream.

The conventional 3D audio decoding apparatus supporting reproduction of a 3D audio signal also decompresses (decodes) the compressed audio signals of the first independent channel group and the second independent channel group first to reproduce the audio signal of the stereo channel. Then, the conventional 3D audio decoding apparatus up-mixes the audio signal generated by decompression. However, in order to reproduce the audio signal of the stereo channel, an operation such as up-mixing has to be performed.

Therefore, a scalable channel layout structure capable of processing a compressed audio signal in a legacy audio decoding apparatus is required. In addition, in audio decoding apparatuses 300 and 500 (see FIGS. 3A, 3B, 5A, and 5B) that support reproduction of a 3D audio signal according to various embodiments of the disclosure, a scalable channel layout structure capable of processing a compressed audio signal according to a reproduction-supported 3D audio channel layout is required. Herein, the scalable channel layout structure may mean a layout structure where the number of channels may freely increase from the base channel layout.

The audio decoding apparatuses 300 and 500 according to various embodiments of the disclosure may reconstruct an audio signal of the scalable channel layout structure from the bitstream. With the scalable channel layout structure according to an embodiment of the disclosure, the number of channels may increase from a stereo channel layout 100 to a 3D audio channel layout 110 in front of the listener. Moreover, with the scalable channel layout structure, the number of channels may increase from the 3D audio channel layout 110 in front of the listener to a 3D audio channel layout 120 located omni-directionally around the listener (or a listener omni-direction 3D audio channel layout 120). For example, the 3D audio channel layout 110 in front of the listener may be a 3.1.2 channel layout. The listener omni-direction 3D audio channel layout 120 may be a 5.1.2 or 7.1.2 channel layout. However, the scalable channel layout that may be implemented in the disclosure is not limited thereto.

As the base channel group, the audio signal of the conventional stereo channel may be compressed. The legacy audio decoding apparatus may decompress the compressed audio signal of the base channel group from the bitstream, thus smoothly reproducing the audio signal of the conventional stereo channel.

Additionally, as a dependent channel group, an audio signal of a channel other than the audio signal of the conventional stereo channel out of the multi-channel audio signal may be compressed.

However, in a process of increasing the number of channels, a portion of the audio signal of the channel group may be an audio signal in which signals of some independent channels out of the audio signals of the particular channel layout are mixed.

Accordingly, in the audio decoding apparatuses 300 and 500, a portion of the audio signal of the base channel group and a portion of the audio signal of the dependent channel group may be de-mixed to generate the audio signal of the up-mixed channel included in the particular channel layout.

Meanwhile, one or more dependent channel groups may exist. For example, the audio signal of the channel other than the audio signal of the stereo channel out of the audio signal of the 3D audio channel layout 110 in front of the listener may be compressed as an audio signal of the first dependent channel group.

The audio signal of the channel other than the audio signal of channels reconstructed from the base channel group and the first dependent channel group, out of the audio signal of the listener omni-direction 3D audio channel layout 120, may be compressed as the audio signal of the second dependent channel group.

The audio decoding apparatus 300 and 500 according to an embodiment of the disclosure may support reproduction of the audio signal of the listener omni-direction 3D audio channel layout 120.

Thus, the audio decoding apparatuses 300 and 500 according to an embodiment of the disclosure may reconstruct the audio signal of the listener omni-direction 3D audio channel layout 120, based on the audio signal of the base channel group and the audio signal of the first dependent channel group and the second dependent channel group.

The legacy audio signal processing apparatus may ignore a compressed audio signal of a dependent channel group that may not be reconstructed from the bitstream, and reproduce the audio signal of the stereo channel reconstructed from the bitstream.

Similarly, the audio decoding apparatuses 300 and 500 may process the compressed audio signal of the base channel group and the dependent channel group to reconstruct the audio signal of the supportable channel layout out of the scalable channel layout. The audio decoding apparatuses 300 and 500 may not reconstruct the compressed audio signal regarding a non-supported higher channel layout from the bitstream. Accordingly, the audio signal of the supportable channel layout may be reconstructed from the bitstream, while ignoring the compressed audio signal related to the higher channel layout that is not supported by the audio decoding apparatuses 300 and 500.

In particular, conventional audio encoding and decoding apparatuses compress and decompress an audio signal of an independent channel of a particular channel layout. Thus, compression and decompression of an audio signal of a limited channel layout are possible.

However, by audio encoding apparatuses 200 and 400 (see FIGS. 2A, 2B, and 4A) and the audio decoding apparatus 300 and 500 according to various embodiments of the disclosure, which support a scalable channel layout, transmission and reconstruction of an audio signal of a stereo channel may be possible. With the audio encoding apparatuses 200 and 400 and the audio decoding apparatuses 300 and 500 according to various embodiments of the disclosure, transmission and reconstruction of an audio signal of a 3D channel layout in front of the listener may be possible. Moreover, with the audio encoding apparatuses 200 and 400 and the audio decoding apparatuses 300 and 500 according to an embodiment of the disclosure, an audio signal of a 3D channel layout omni-directionally around the listener may be transmitted and reconstructed.

That is, the audio encoding apparatuses 200 and 400 and the audio decoding apparatuses 300 and 500 according to various embodiments of the disclosure may transmit and reconstruct an audio signal according to a layout of a stereo channel. Moreover, the audio encoding apparatuses 200 and 400 and the audio decoding apparatuses 300 and 500 according to various embodiments of the disclosure may freely convert audio signals of the current channel layout into audio signals of another channel layout. Through mixing/de-mixing between audio signals of channels included in different channel layouts, conversion between channel layouts may be possible. The audio encoding apparatuses 200 and 400 and the audio decoding apparatuses 300 and 500 according to various embodiments of the disclosure may support conversion between various channel layouts and thus transmit and reproduce audio signals of various 3D channel layouts. That is, between a channel layout in front of the listener and a listener omni-direction channel layout or between a stereo channel layout and the channel layout in front of the listener, channel independence is not guaranteed, but free conversion may be possible through mixing/de-mixing of audio signals.

The audio encoding apparatuses 200 and 400 and the audio decoding apparatuses 300 and 500 according to various embodiments of the disclosure support processing of an audio signal of a channel layout in front of the listener and thus transmit and reconstruct an audio signal corresponding to a speaker arranged around the screen, thereby improving a sensation of immersion of the listener.

Detailed operations of the audio encoding apparatuses 200 and 400 and the audio decoding apparatuses 300 and 500 according to various embodiments of the disclosure will be described with reference to FIGS. 2A to 5B.

Figure 1B:
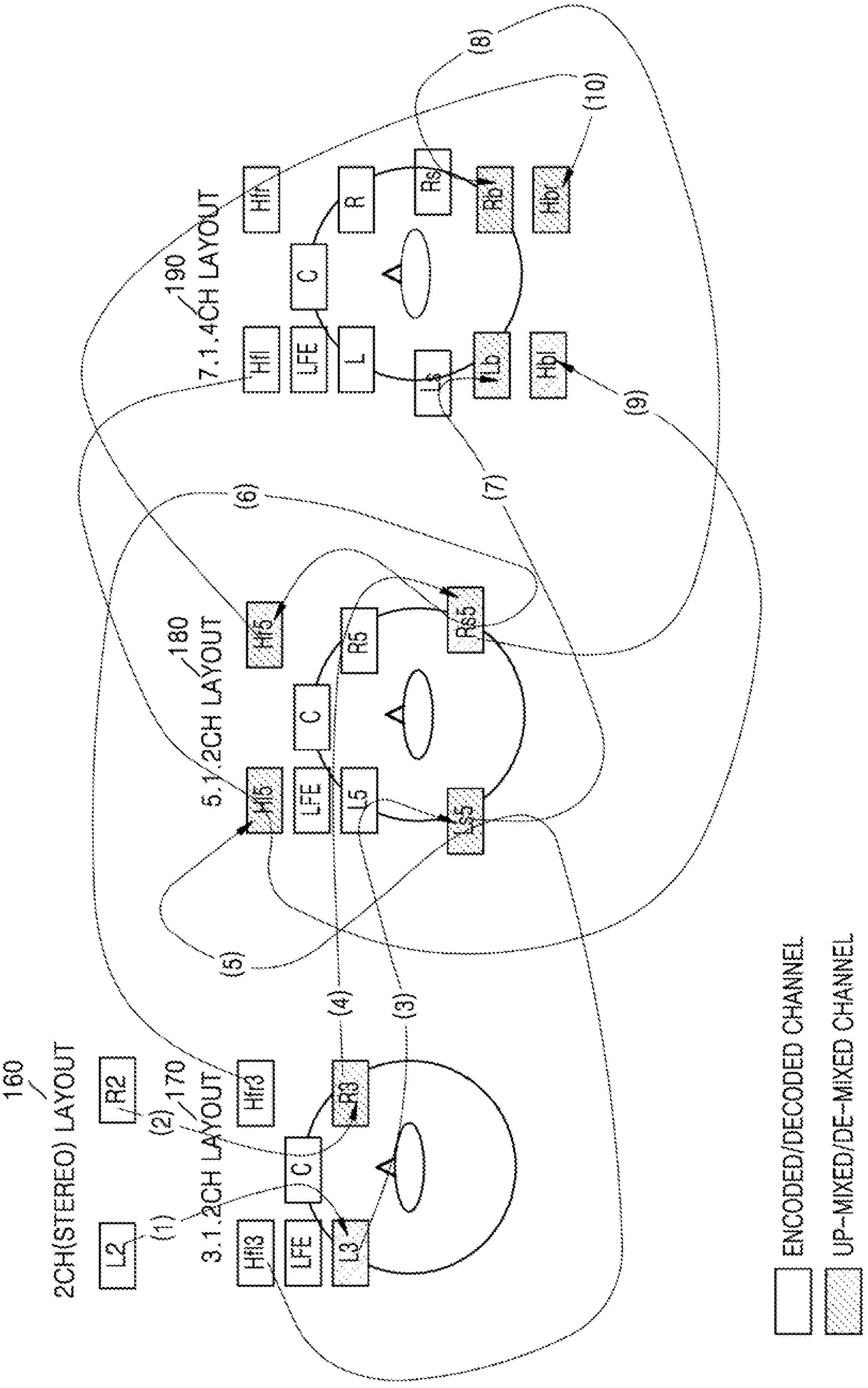
FIG. 1B is a view for describing an example of a detailed scalable audio channel layout structure.

FIG. 1B is a view for describing an example of a detailed scalable audio channel layout structure. In the figure, each of the numbered/directed edges (1) through (10) may represent a de-mixing operation performed by audio decoding apparatuses 300 and 500

Referring to FIG. 1B, to transmit an audio signal of a stereo channel layout 160, the audio encoding apparatuses 200 and 400 may generate a compressed audio signal (A/B signal) of the base channel group by compressing an L2/R2 signal.

In this case, the audio encoding apparatuses 200 and 400 may generate the audio signal of the base channel group by compressing the L2/R2 signal.

Moreover, to transmit an audio signal of a layout 170 of a 3.1.2 channel that is one of 3D audio channels in front of the listener, the audio encoding apparatuses 200 and 400 may generate a compressed audio signal of a dependent channel group by compressing C, LFE, Hfl3, and Hfr3 signals. The audio decoding apparatuses 300 and 500 may reconstruct the L2/R2 signal by decompressing the compressed audio signal of the base channel group. The audio decoding apparatuses 300 and 500 may reconstruct the C, LFE, Hfl3, and Hfr3 signals by decompressing the compressed audio signal of the dependent channel group.

The audio decoding apparatuses 300 and 500 may reconstruct an L3 signal of the 3.1.2 channel layout 170 by de-mixing the L2 signal and the C signal (1). The audio decoding apparatuses 300 and 500 may reconstruct a R3 signal of the 3.1.2 channel layout 170 by de-mixing the R2 signal and the C signal (2).

As a result, the audio decoding apparatuses 300 and 500 may output the L3, R3, C, Lfe, Hfl3, and Hfr3 signals as the audio signal of the 3.1.2 channel layout 170.

Meanwhile, to transmit the audio signal of a listener omni-direction 5.1.2 channel layout 180, the audio encoding apparatuses 200 and 400 may further compress L5 and R5 signals to generate a compressed audio signal of the second dependent channel group.

As described above, the audio decoding apparatuses 300 and 500 may reconstruct the L2/R2 signal by decompressing the compressed audio signal of the base channel group and reconstruct the C, LFE, Hfl3, and Hfr3 signals by decompressing the compressed audio signal of the first dependent channel group. In addition, the audio decoding apparatuses 300 and 500 may reconstruct the L5 and R5 signals by decompressing the compressed audio signal of the second dependent channel group. Moreover, as described above, the audio decoding apparatuses 300 and 500 may reconstruct the L3 and R3 signals by de-mixing some of the decompressed audio signals.

In addition, the audio decoding apparatuses 300 and 500 may reconstruct an Ls5 signal by de-mixing the L3 and L5 signals (3). The audio decoding apparatuses 300 and 500 may reconstruct an Rs5 signal by de-mixing the R3 and R5 signals (4).

The audio decoding apparatuses 300 and 500 may reconstruct an Hl5 signal by de-mixing the Hfl3 and Ls5 signals (5). Hfl3 and Hl5 are front left channels among height channels.

The audio decoding apparatuses 300 and 500 may reconstruct a Hr5 signal by de-mixing the Hfr3 and Rs5 signals (6). Hfr3 and Hr5 are front right channels among height channels.

As a result, the audio decoding apparatuses 300 and 500 may output the Hl5, Hr5, LFE, L, R, C, Ls5, and Rs5 signals as audio signals of the 5.1.2 channel layout 180.

Meanwhile, to transmit an audio signal of a 7.1.4 channel layout 190, the audio encoding apparatuses 200 and 400 may further compress the Hfl, Hfr, Ls, and Rs signals as audio signals of a third dependent channel group.

As described above, the audio decoding apparatuses 300 and 500 may decompress the compressed audio signal of the base channel group, the compressed audio signal of the first dependent channel group, and the compressed audio signal of the second dependent channel group and reconstruct the Hl5, Hr5, LFE, L, R, C, Ls5, and Rs5 signals through de-mixing (1), (2), (3), (4), (5), and (6).

In addition, the audio decoding apparatuses 300 and 500 may reconstruct the Hfl, Hfr, Ls, and Rs signals by decompressing the compressed audio signal of the third dependent channel group. The audio decoding apparatuses 300 and 500 may reconstruct a Lb signal of a 7.1.4 channel layout 190 by (7) de-mixing the Ls5 signal and the Ls signal.

The audio decoding apparatuses 300 and 500 may reconstruct an Rb signal of the 7.1.4 channel layout 190 by (8) de-mixing the Rs5 signal and the Rs signal.

The audio decoding apparatuses 300 and 500 may reconstruct an Hbl signal of the 7.1.4 channel layout 190 by (9) de-mixing the Hfl signal and the Hl5 signal.

The audio decoding apparatuses 300 and 500 may reconstruct an Hbr signal of the 7.1.4 channel layout 190 by (10) de-mixing the Hfr signal and the Hr5 signal.

As a result, the audio decoding apparatuses 300 and 500 may output the Hfl, Hfr, LFE, C, L, R, Ls, Rs, Lb, Rb, Hbl, and Hbr signals as audio signals of the 7.1.4 channel layout 190.

Thus, the audio decoding apparatuses 300 and 500 may reconstruct the audio signal of the 3D audio channel in front of the listener and the audio signal of the listener omni-direction 3D audio channel as well as the audio signal of the conventional stereo channel layout, by supporting a scalable channel layout in which the number of channels is increased by a de-mixing operation.

A scalable channel layout structure described above in detail with reference to FIG. 1B is merely an example, and a channel layout structure may be implemented scalable to include various channel layouts.

Figure 2A:
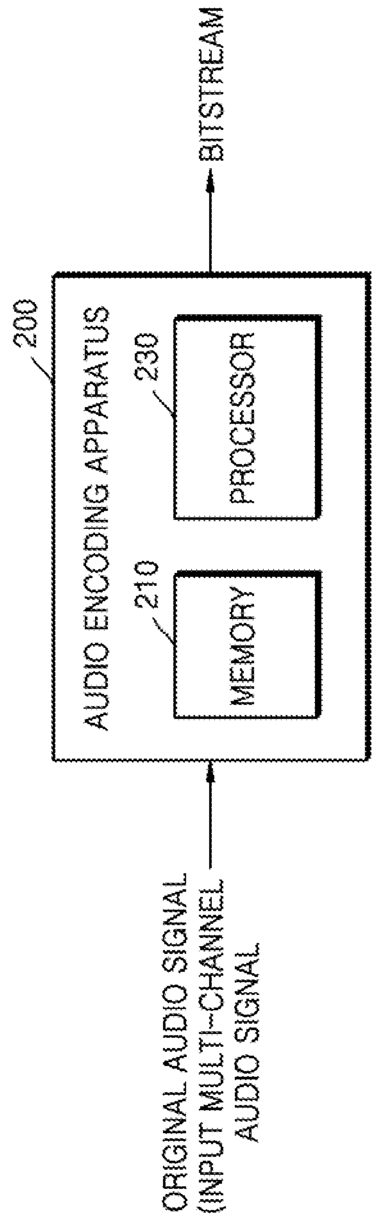
FIG. 2A is a block diagram of an audio encoding apparatus according to an embodiment.

FIG. 2A is a block diagram of an audio encoding apparatus according to an embodiment of the disclosure.

The audio encoding apparatus 200 may include a memory 210 and a processor 230. The audio encoding apparatus 200 may be implemented as an apparatus capable of performing audio processing such as a server, a television (TV), a camera, a cellular phone, a tablet personal computer (PC), a laptop computer, etc.

While the memory 210 and the processor 230 are shown separately in FIG. 2A, the memory 210 and the processor 230 may be implemented through one hardware module (e.g., a chip).

The processor 230 may be implemented as a dedicated processor for audio processing based on a neural network. Alternatively, the processor 230 may be implemented through a combination of a general-purpose processor, such as an application processor (AP), a central processing unit (CPU), or a graphics processing unit (GPU), and software. The dedicated processor may include a memory for implementing an embodiment of the disclosure or a memory processor for using external memory.

The processor 230 may include a plurality of processors. In this case, the processor 230 may be implemented as a combination of dedicated processors, or may be implemented through a combination of software and a plurality of general-purpose processors such as an AP, a CPU, or a GPU.

The memory 210 may store one or more instructions for audio processing. In an embodiment of the disclosure, the memory 210 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 210. The neural network may be implemented by an external device (e.g., a server), and in this case, the audio encoding apparatus 200 may request and receive result information based on the neural network from the external device.

The processor 230 may sequentially process successive frames according to an instruction stored in the memory 210 and obtain successive encoded (compressed) frames. The successive frames may refer to frames that constitute audio.

The processor 230 may perform an audio processing operation with the original audio signal as an input and output a bitstream including a compressed audio signal. In this case, the original audio signal may be a multi-channel audio signal. The compressed audio signal may be a multi-channel audio signal having channels of a number less than or equal to the number of channels of the original audio signal.

In this case, the bitstream may include a base channel group, and furthermore, n dependent channel groups (n is an integer greater than or equal to 1). Thus, according to the number of dependent channel groups, the number of channels may be freely increased.

Figure 2B:
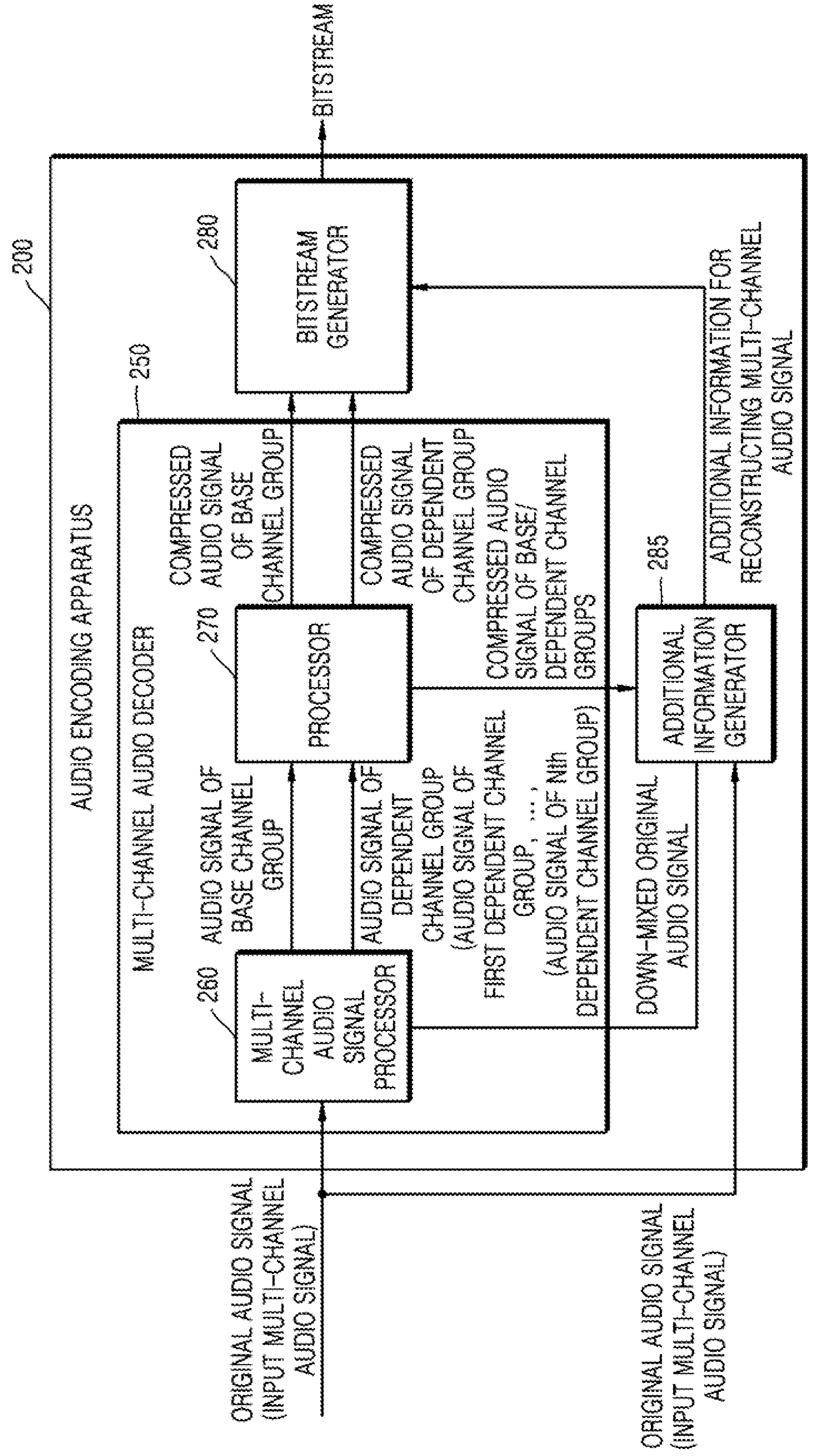
FIG. 2B is a block diagram of an audio encoding apparatus according to an embodiment.

FIG. 2B is a block diagram of an audio encoding apparatus according to an embodiment of the disclosure.

Referring to FIG. 2B, the audio encoding apparatus 200 may include a multi-channel audio encoder 250, a bitstream generator 280, and an additional information generator 285. The multi-channel audio encoder 250 may include a multi-channel audio signal processor 260 and a compressor 270.

Referring back to FIG. 2A, as described above, the audio encoding apparatus 200 may include the memory 210 and the processor 230, and an instruction for implementing the components 250, 260, 270, 280, and 285 of FIG. 2B may be stored in the memory 210 of FIG. 2A. The processor 230 may execute the instruction stored in the memory 210.

The multi-channel audio signal processor 260 may obtain at least one audio signal of a base channel group and at least one audio signal of at least one dependent channel group from the original audio signal. For example, when the original audio signal is an audio signal of a 7.1.4 channel layout, the multi-channel audio signal processor 260 may obtain an audio signal of a 2-channel (stereo channel) as an audio signal of a base channel group in an audio signal of a 7.1.4 channel layout.

The multi-channel audio signal processor 260 may obtain an audio signal of a channel other than an audio signal of a 2-channel, out of an audio signal of a 3.1.2 channel layout, as the audio signal of the first dependent channel group, to reconstruct the audio signal of the 3.1.2 channel layout, which is one of the 3D audio channels in front of the listener. In this case, audio signals of some channels of the first dependent channel group may be de-mixed to generate an audio signal of a de-mixed channel.

The multi-channel audio signal processor 260 may obtain an audio signal of a channel other than an audio signal of the base channel group and an audio signal of the first dependent channel group, out of an audio signal of a 5.1.2 channel layout, as an audio signal of the second dependent channel group, to reconstruct the audio signal of the 5.1.2 channel layout, which is one of the 3D audio channels in front of and behind the listener. In this case, audio signals of some channels of the second dependent channel group may be de-mixed to generate an audio signal of a de-mixed channel.

The multi-channel audio signal processor 260 may obtain an audio signal of a channel other than the audio signal of the first dependent channel group and the audio signal of the second dependent channel group, out of an audio signal of a 7.1.4 channel layout, as an audio signal of the third dependent channel group, to reconstruct the audio signal of the 7.1.4 channel layout, which is one of the listener omni-direction 3D audio channels. Likewise, audio signals of some channels of the third dependent channel group may be de-mixed to obtain an audio signal of a de-mixed channel.

A detailed operation of the multi-channel audio signal processor 260 will be described later with reference to FIG. 2C.

The compressor 270 may compress the audio signal of the base channel group and the audio signal of the dependent channel group. That is, the compressor 270 may compress at least one audio signal of the base channel group to obtain at least one compressed audio signal of the base channel group. Herein, compression may mean compression based on various audio codecs. For example, compression may include transformation and quantization processes.

Herein, the audio signal of the base channel group may be a mono or stereo signal. Alternatively, the audio signal of the base channel group may include an audio signal of a first channel generated by mixing an audio signal L of a left stereo channel with C_1. Here, C_1 may be an audio signal of a center channel (e.g., a center channel audio signal) of the front of the listener, decompressed after having been compressed. In the disclosure, when an audio signal is described using the name ("X_Y"), "X" may represent the name of a channel, and "Y" may represent being decoded, being up-mixed, an error removal factor being applied (i.e., being scaled), or an LFE gain being applied. For example, a decoded signal may be expressed as "X_1", and a signal generated by up-mixing the decoded signal (an up-mixed signal) may be expressed as "X_2". Alternatively, a signal to which the LFE gain is applied to the decoded LFE signal may also be expressed as "X_2". A signal to which the error removal factor is applied (i.e., a scaled signal) to the up-mixed signal may be expressed as "X_3".

The audio signal of the base channel group may include an audio signal of a second channel generated by mixing an audio signal R of a right stereo channel with C_1.

The compressor 270 may obtain (e.g., generate) at least one compressed audio signal of at least one dependent channel group by compressing at least one audio signal of at least one dependent channel group.

The additional information generator 285 may generate additional information based on at least one of the original audio signal, the compressed audio signal of the base channel group, or the compressed audio signal of the dependent channel group. In this case, the additional information may be information related to a multi-channel audio signal and include various pieces of information for reconstructing the multi-channel audio signal.

For example, the additional information may include an audio object signal of a 3D audio channel in front of the listener that indicates at least one of an audio signal, a position, a shape, an area, or a direction of an audio object (sound source). Alternatively, the additional information may include information about the total number of audio streams including a base channel audio stream and a dependent channel audio stream. The additional information may include down-mix gain information. The additional information may include channel mapping table information. The additional information may include volume information. The additional information may include LFE gain information. The additional information may include dynamic range control (DRC) information. The additional information may include channel layout rendering information. The additional information may also include information about the number of coupled audio streams, information indicating a multi-channel layout, information about whether a dialogue exists in an audio signal and a dialogue level, information indicating whether an LFE is output, information about whether an audio object exists on the screen, information about existence or absence of an audio signal of a continuous audio channel (or a scene-based audio signal or an ambisonic audio signal), and information about existence or absence of an audio signal of a discrete audio channel (or an object-based audio signal or a spatial multi-channel audio signal). The additional information may include information about de-mixing including at least one de-mixing weight parameter of a de-mixing matrix for reconstructing a multi-channel audio signal. De-mixing and (down)mixing correspond to each other, such that information about de-mixing may correspond to information about (down)mixing, and the information about de-mixing may include the information about (down)mixing. For example, the information about de-mixing may include at least one (down)mixing weight parameter of a (down)mixing matrix. A de-mixing weight parameter may be obtained based on the (down)mixing weight parameter.

The additional information may be various combinations of the aforementioned pieces of information. In other words, the additional information may include at least one of the aforementioned pieces of information.

When there is an audio signal of a dependent channel corresponding to at least one audio signal of the base channel group, the additional information generator 285 may generate dependent channel audio signal identification information indicating that the audio signal of the dependent channel exists.

The bitstream generator 280 may generate a bitstream including the compressed audio signal of the base channel group and the compressed audio signal of the dependent channel group. The bitstream generator 280 may generate a bitstream further including the additional information generated by the additional information generator 285.

More specifically, the bitstream generator 280 may generate a base channel audio stream and a dependent channel audio stream. The base channel audio stream may include the compressed audio signal of the base channel group, and the dependent channel audio stream may include the compressed audio signal of the dependent channel group.

The bitstream generator 280 may generate a bitstream including the base channel audio stream and a plurality of dependent channel audio streams. The plurality of dependent channel audio streams may include n dependent channel audio streams (where n is an integer greater than 1). In this case, the base channel audio stream may include an audio signal of a mono channel or a compressed audio signal of a stereo channel.

For example, among channels of a first multi-channel layout reconstructed from the base channel audio stream and the first dependent channel audio stream, the number of surround channels may be $S_{n-1}$, the number of subwoofer channels may be $W_{n-1}$, and the number of height channels may be $H_{n-1}$. In a second multi-channel layout reconstructed from the base channel audio stream, the first dependent channel audio stream, and the second dependent channel audio stream, the number of surround channels may be $S_n$, the number of subwoofer channels may be $W_n$, and the number of height channels may be $H_n$.

In this case, $S_{n-1}$ may be less than or equal to $S_n$, $W_{n-1}$ may be less than or equal to $W_n$, and $H_{n-1}$ may be less than or equal to $H_n$. Herein, a case where $S_{n-1}$ is equal to $S_n$, $W_{n-1}$ is equal to $W_n$, and $H_{n-1}$ is equal to $H_n$ may be excluded.

That is, the number of surround channels of the second multi-channel layout needs to be greater than the number of surround channels of the first multi-channel layout. Alternatively or additionally, the number of subwoofer channels of the second multi-channel layout needs to be greater than the number of subwoofer channels of the first multi-channel layout. Alternatively or additionally, the number of height channels of the second multi-channel layout needs to be greater than the number of height channels of the first multi-channel layout.

Moreover, the number of surround channels of the second multi-channel layout may not be less than the number of surround channels of the first multi-channel layout. Likewise, the number of subwoofer channels of the second multi-channel layout may not be less than the number of subwoofer channels of the first multi-channel layout. The number of height channels of the second multi-channel layout may not be less than the number of height channels of the first multi-channel layout.

In addition, the case where the number of surround channels of the second multi-channel layout is equal to the number of surround channels of the first multi-channel layout; the number of subwoofer channels of the second multi-channel layout is equal to the number of subwoofer channels of the first multi-channel layout; and the number of height channels of the second multi-channel layout is equal to the number of height channels of the first multi-channel layout does not exist. That is, all channels of the second multi-channel layout may not be the same as all channels of the first multi-channel layout.

More specifically, for example, when the first multi-channel layout is the 5.1.2 channel layout, the second multi-channel layout may be the 7.1.4 channel layout.

In addition, the bitstream generator 280 may generate metadata including additional information.

As a result, the bitstream generator 280 may generate a bitstream including the base channel audio stream, the dependent channel audio stream, and the metadata.

The bitstream generator 280 may generate a bitstream in a form in which the number of channels may freely increase from the base channel group.

That is, the audio signal of the base channel group may be reconstructed from the base channel audio stream, and the multi-channel audio signal in which the number of channels increases from the base channel group may be reconstructed from the base channel audio stream and the dependent channel audio stream.

Meanwhile, the bitstream generator 280 may generate a file stream having a plurality of audio tracks. The bitstream generator 280 may generate an audio stream of a first audio track including at least one compressed audio signal of the base channel group. The bitstream generator 280 may generate an audio stream of a second audio track including dependent channel audio signal identification information. In this case, the second audio track, which follows the first audio track, may be adjacent to the first audio track.

When there is a dependent channel audio signal corresponding to at least one audio signal of the base channel group, the bitstream generator 280 may generate an audio stream of the second audio track including at least one compressed audio signal of at least one dependent channel group.

Meanwhile, when there is no dependent channel audio signal corresponding to at least one audio signal of the base channel group, the bitstream generator 280 may generate the audio stream of the second audio track including the next audio signal of a base channel group with respect to the audio signal of the first audio track of the base channel group.

Figure 2C:
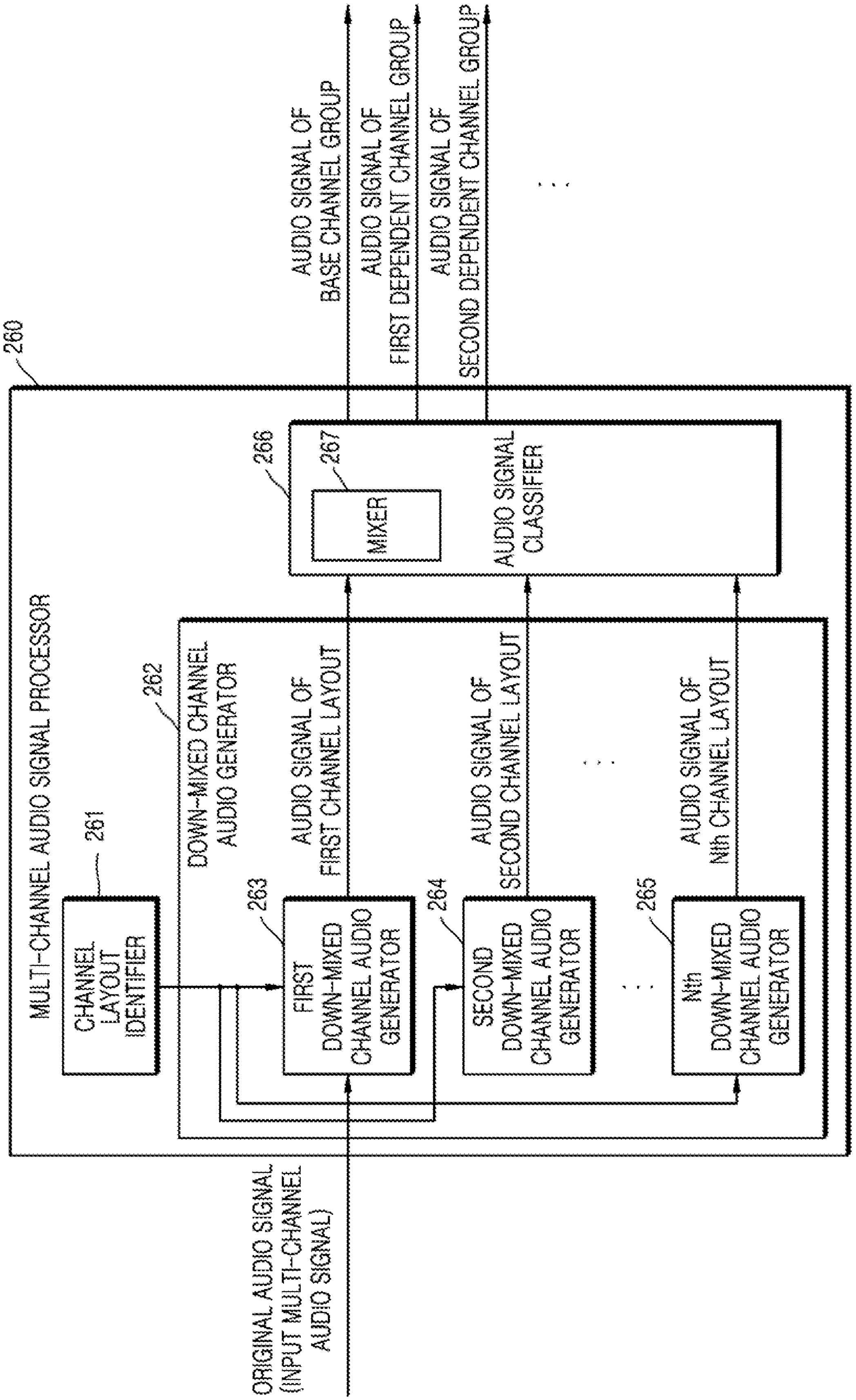
FIG. 2C is a block diagram of a structure of a multi-channel audio signal processor according to an embodiment.

FIG. 2C is a block diagram of a structure of the multi-channel audio signal processor 260 according to an embodiment of the disclosure.

Referring to FIG. 2C, the multi-channel audio signal processor 260 may include a channel layout identifier 261, a down-mixed channel audio generator 262, and an audio signal classifier 266.

The channel layout identifier 261 may identify at least one channel layout from the original audio signal. In this case, the at least one channel layout may include a plurality of hierarchical channel layouts. The channel layout identifier 261 may identify a channel layout of the original audio signal. The channel layout identifier 261 may identify a channel layout that is lower than the channel layout of the original audio signal. For example, when the original audio signal is an audio signal of the 7.1.4 channel layout, the channel layout identifier 261 may identify the 7.1.4 channel layout and identify the 5.1.2 channel layout, the 3.1.2 channel layout, the 2 channel layout, etc., that are lower than the 7.1.4 channel layout. A higher channel layout may mean a layout in which the number of at least one of surround channels/subwoofer channels/height channels in the layout is greater than that of a lower channel layout. Depending on whether the number of surround channels is large or small, a higher/lower channel layout may be determined, and for the same number of surround channels, the higher/lower channel layout may be determined depending on whether the number of subwoofer channels is large or small. For the same number of surround channels and subwoofer channels, the higher/lower channel layout may be determined depending on whether the number of height channels is large or small.

In addition, the identified channel layout may include a target channel layout. The target channel layout may mean the highermost channel layout of an audio signal included in a finally output bitstream. The target channel layout may be a channel layout of the original audio signal or a lower channel layout than the channel layout of the original audio signal.

More specifically, a channel layout identified from the original audio signal may be hierarchically determined from the channel layout of the original audio signal. In this case, the channel layout identifier 261 may identify at least one channel layout among predetermined channel layouts. For example, the channel layout identifier 261 may identify some of predetermined channel layouts, the 7.1.4 channel layout, the 5.1.4 channel layout, the 5.1.2 channel layout, the 3.1.2 channel layout, and the 2 channel layout, from the layout of the original audio signal.

The channel layout identifier 261 may transmit a control signal to a particular down-mixed channel audio generator corresponding to identified at least one channel layout, based on the identified channel layout. The particular down-mixed channel audio generator may be at least one of a first down-mixed channel audio generator 263, a second down-mixed channel audio generator 264, . . . , or an $N^{th}$ down-mixed channel audio generator 265. The down-mixed channel audio generator 262 may generate a down-mixed channel audio from the original audio signal based on the at least one channel layout identified by the channel layout identifier 261. The down-mixed channel audio generator 262 may generate the down-mixed channel audio from the original audio signal by using a down-mixing matrix including at least one down-mixing weight parameter.

For example, when the channel layout of the original audio signal is an $n^{th}$ channel layout in an ascending order among predetermined channel layouts, the down-mixed channel audio generator 262 may generate a down-mixed channel audio of an $(n-1)^{th}$ channel layout immediately lower than the channel layout of the original audio signal from the original audio signal. By repeating this process, the down-mixed channel audio generator 262 may generate down-mixed channel audios of lower channel layouts than the current channel layout.

For example, the down-mixed channel audio generator 262 may include the first down-mixed channel audio generator 263, the second down-mixed channel audio generator 264, . . . , and an $(n-1)^{th}$ down-mixed channel audio generator. $(n-1)$ may be less than or equal to N.

In this case, an $(n-1)^{th}$ down-mixed channel audio generator may generate an audio signal of an $(n-1)^{th}$ channel layout from the original audio signal. In addition, an $(n-2)^{th}$ down-mixed channel audio generator may generate an audio signal of an $(n-2)^{th}$ channel layout from the original audio signal. In this manner, the first down-mixed channel audio generator 263 may generate the audio signal of the first channel layout from the original audio signal. The first channel layout may be the first layout in a hierarchically ordered list, set, or group of predetermined channel layouts. In this case, the audio signal of the first channel layout may be the audio signal of the base channel group.

Meanwhile, each of the down-mixed channel audio generators (e.g., a first down-mixed channel audio generator 263, a second down-mixed channel audio generator 264, . . . , and an $N^{th}$ down-mixed channel audio generator 265) may be connected in a cascaded manner. That is, the down-mixed channel audio generators (e.g., a first down-mixed channel audio generator 263, a second down-mixed channel audio generator 264, . . . , and an $N^{th}$ down-mixed channel audio generator 265) may be connected such that an output of a higher down-mixed channel audio generator becomes an input of the lower down-mixed channel audio generator. For example, the audio signal of the $(n-1)^{th}$ channel layout may be output from the $(n-1)^{th}$ down-mixed channel audio generator with the original audio signal as an input, and the audio signal of the $(n-1)^{th}$ channel layout may be input to the $(n-2)^{th}$ down-mixed channel audio generator and an $(n-2)^{th}$ down-mixed channel audio may be generated from an $(n-2)^{th}$ down-mixed channel audio generator. In this way, the down-mixed channel audio generators (e.g., a first down-mixed channel audio generator 263, a second down-mixed channel audio generator 264, . . . , and an $N^{th}$ down-mixed channel audio generator 265) may be connected to output an audio signal of each channel layout.

The audio signal classifier 266 may obtain an audio signal of a base channel group and an audio signal of a dependent channel group, based on an audio signal of at least one channel layout. In this case, the audio signal classifier 266 may mix an audio signal of at least one channel included in an audio signal of at least one channel layout through a mixer 267. The audio signal classifier 266 may classify the mixed audio signal as at least one of an audio signal of the base channel group or an audio signal of the dependent channel group.

Figure 2D:
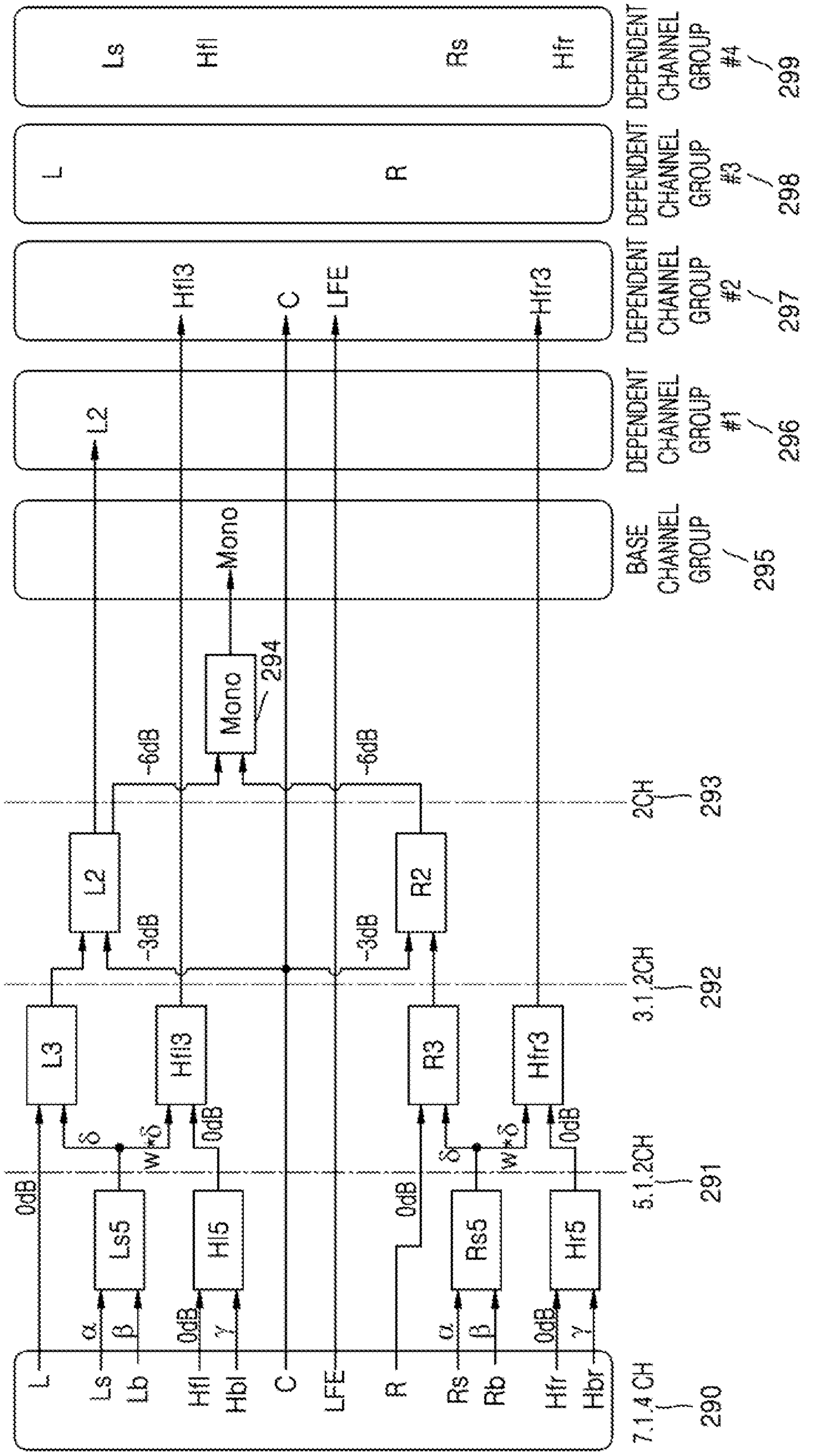
FIG. 2D is a view for describing an example of a detailed operation of an audio signal classifier.

FIG. 2D is a view for describing an example of a detailed operation of an audio signal classifier.

Referring to FIG. 2D, the down-mixed channel audio generator 262 of FIG. 2C may obtain, from the original audio signal of the 7.1.4 channel layout 290, the audio signal of the 5.1.2 channel layout 291, the audio signal of the 3.1.2 channel layout 292, the audio signal of the 2 channel layout 293, and the audio signal of the mono channel layout 294, which are audio signals of lower channel layouts. The down-mixed channel audio generators (e.g., a first down-mixed channel audio generator 263, a second down-mixed channel audio generator 264, . . . , and an $N^{th}$ down-mixed channel audio generator 265) of the down-mixed channel audio generator 262 are connected in a cascaded manner, such that audio signals may be obtained sequentially from the current channel layout to the next lower channel layout.

The audio signal classifier 266 of FIG. 2C may classify the audio signal of the mono channel layout 294 as the audio signal of the base channel group.

The audio signal classifier 266 may classify the audio signal of the L2 channel that is a part of the audio signal of the 2 channel layout 293 as an audio signal of the dependent channel group #1 296. Meanwhile, the audio signal of the L2 channel and the audio signal of the R2 channel are mixed to generate the audio signal of the mono channel layout 294, such that in reverse, the audio decoding apparatuses 300 and 500 may de-mix the audio signal of the mono channel layout 294 and the audio signal of the L2 channel to reconstruct the audio signal of the R2 channel. Thus, the audio signal of the R2 channel may not be classified as an audio signal of a separate channel group. In other words, it may not be necessary to classify the audio signal of the R2 channel as an audio signal of a separate channel group.

The audio signal classifier 266 may classify the audio signal of the Hfl3 channel, the audio signal of the C channel, the audio signal of the LFE channel, and the audio signal of the Hfr3 channel, among the audio signals of the 3.1.2 channel layout 292, as an audio signal of a dependent channel group #2 297. The audio signal of the L2 channel is generated by mixing the audio signal of the L3 channel and the audio signal of the C channel, such that in reverse, the audio decoding apparatuses 300 and 500 may reconstruct the audio signal of the L3 channel of the dependent channel group #2 297 by de-mixing the audio signal of the of the audio signal of the L2 channel and the audio signal of the C channel.

Thus, the audio signal of the L3 channel among the audio signals of the 3.1.2 channel layout 292 may not be classified as an audio signal of a particular channel group.

For the same reason, the R3 channel may not be classified as the audio signal of the particular channel group.

The audio signal classifier 266 may transmit the audio signal of the L channel and the audio signal of the R channel, which are audio signals of some channels of the 5.1.2 channel layout 291, as an audio signal of a dependent channel group #3 298, in order to transmit the audio signal of the 5.1.2 channel layout 291. Meanwhile, the audio signal of one of the Ls5, Hl5, Rs5, and Hr5 channels may be one of the audio signals of the 5.1.2 channel layout 291, but may not be classified as an audio signal of a separate dependent channel group. This is because signals of the Ls5, Hl5, Rs5, and Hr5 channels may not be a channel audio signal in front of the listener, and may be a signal in which audio signals of at least one of audio channels in front of, beside, and behind the listener, among the audio signals of the 7.1.4 channel layout 290, may be mixed. By compressing the audio signal of the audio channel in front of the listener out of the original audio signal, rather than classifying the mixed signal as the audio signal of the dependent channel group and compressing the same, the sound quality of the audio signal of the audio channel in front of the listener may be improved. As a result, the listener may feel that the sound quality of the reproduced audio signal is improved.

However, according to circumstances, Ls5 or Hl5 instead of L may be classified as the audio signal of the dependent channel group #3 298, and Rs5 or Hr5 instead of R may be classified as the audio signal of the dependent channel group #3 298.

The audio signal classifier 266 may classify the audio signal of the Ls, Hfl, Rs, or Hfr channel among the audio signals of the 7.1.4 channel layout 290 as an audio signal of a dependent channel group #4 299. In this case, Lb, Hbl, Rb, and Hbr may not be classified as the audio signal of the dependent channel group #4 299. By compressing the audio signal of the side audio channel close to the front of the listener rather than classifying the audio signal of the audio channel behind the listener among the audio signals of the 7.1.4 channel layout 290 as the audio signal of the channel group and compressing the same, the sound quality of the audio signal of the side audio channel close to the front of the listener may be improved. Thus, the listener may feel that the sound quality of the reproduced audio signal is improved. However, according to circumstances, Lb in place of Ls, Hbl in place of Hfl, Rb in place of Rs, and Hbr in place of Hfr may be classified as the audio signal of the dependent channel group #4 299.

As a result, the down-mixed channel audio generator 262 of FIG. 2C may generate an audio signal (a down-mixed channel audio) of a plurality of lower layouts based on a plurality of lower channel layouts identified from the original audio signal layout. The audio signal classifier 266 of FIG. 2C may classify the audio signal of the base channel group and the audio signals of the dependent channel groups #1, #2, #3, and #4. The classified audio signal of the channel may classify a part of the audio signal of the independent channel out of the audio signal of each channel as the audio signal of the channel group according to each channel layout. The audio decoding apparatuses 300 and 500 may reconstruct the audio signal that is not classified by the audio signal classifier 266 through de-mixing. Meanwhile, when the audio signal of the left channel with respect to the listener is classified as the audio signal of the particular channel group, the audio signal of the right channel corresponding to the left channel may be classified as the audio signal of the corresponding channel group. That is, the audio signals of the coupled channels may be classified as audio signals of one channel group.

When the audio signal of the stereo channel layout is classified as the audio signal of the base channel group, the audio signals of the coupled channels all may be classified as audio signals of one channel group. However, as described above with reference to FIG. 2D, when the audio signal of the mono channel layout is classified as the audio signal of the base channel group, exceptionally, one of audio signals of the stereo channel may be classified as the audio signal of the dependent channel group #1. However, a method of classifying an audio signal of a channel group may be various without being limited to the description made with reference to FIG. 2D. That is, when the classified audio signal of the channel group is de-mixed and an audio signal of a channel, which is not classified as an audio signal of a channel group, may be reconstructed from the de-mixed audio signal, then the audio signal of the channel group may be classified in various forms.

Figure 3A:
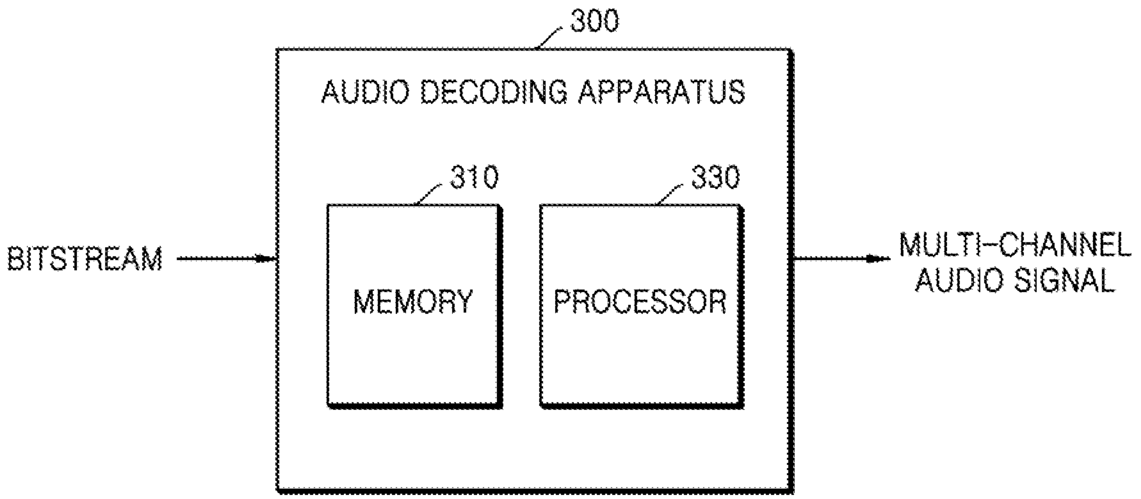
FIG. 3A is a block diagram of a structure of a multi-channel audio decoding apparatus according to an embodiment.

FIG. 3A is a block diagram of a structure of a multi-channel audio decoding apparatus according to an embodiment of the disclosure.

The audio decoding apparatus 300 may include a memory 310 and a processor 330. The audio decoding apparatus 300 may be implemented as an apparatus capable of audio processing, such as a server, a TV, a camera, a mobile phone, a computer, a digital broadcasting terminal, a tablet PC, a laptop computer, etc.

Although the memory 310 and the processor 330 are separately illustrated in FIG. 3A, the memory 310 and the processor 330 may be implemented through one hardware module (for example, a chip).

The processor 330 may be implemented as a dedicated processor for neural network-based audio processing. Alternatively, the processor 330 may be implemented through a combination of a general-purpose processor, such as an AP, a CPU, or a GPU, and software. The dedicated processor may include a memory for implementing an embodiment of the disclosure or a memory processor for using an external memory.

The processor 330 may include a plurality of processors. In this case, the processor 330 may be implemented as a combination of dedicated processors, or may be implemented through a combination of software and a plurality of general-purpose processors such as an AP, a CPU, or a GPU.

The memory 310 may store one or more instructions for audio processing. According to an embodiment of the disclosure, the memory 310 may store a neural network. When the neural network is implemented in the form of a dedicated hardware chip for AI or is implemented as a part of an existing general-purpose processor (for example, a CPU or an AP) or a graphic dedicated processor (for example, a GPU), the neural network may not be stored in the memory 310. The neural network may be implemented as an external apparatus (for example, a server). In this case, the audio decoding apparatus 300 may request neural network-based result information from the external apparatus and receive the neural network-based result information from the external apparatus.

The processor 330 may sequentially process successive frames according to an instruction stored in the memory 310 to obtain successive reconstructed frames. The successive frames may refer to frames that constitute audio.

The processor 330 may output a multi-channel audio signal by performing an audio processing operation on an input bitstream. The bitstream may be implemented in a scalable form to increase the number of channels from the base channel group. For example, the processor 330 may obtain the compressed audio signal of the base channel group from the bitstream, and may reconstruct the audio signal of the base channel group (for example, the stereo channel audio signal) by decompressing the compressed audio signal of the base channel group. Additionally, the processor 330 may reconstruct the audio signal of the dependent channel group by decompressing the compressed audio signal of the dependent channel group from the bitstream. The processor 330 may reconstruct a multi-channel audio signal based on the audio signal of the base channel group and the audio signal of the dependent channel group.

Meanwhile, the processor 330 may reconstruct the audio signal of the first dependent channel group by decompressing the compressed audio signal of the first dependent channel group from the bitstream. The processor 330 may reconstruct the audio signal of the second dependent channel group by decompressing the compressed audio signal of the second dependent channel group.

The processor 330 may reconstruct a multi-channel audio signal of an increased number of channels, based on the audio signal of the base channel group and the respective audio signals of the first and second dependent channel groups. Likewise, the processor 330 may decompress compressed audio signals of n dependent channel groups (where n is an integer greater than 2), and may reconstruct a multi-channel audio signal of a further increased number of channels, based on the audio signal of the base channel group and the respective audio signals of the n dependent channel groups.

Figure 3B:
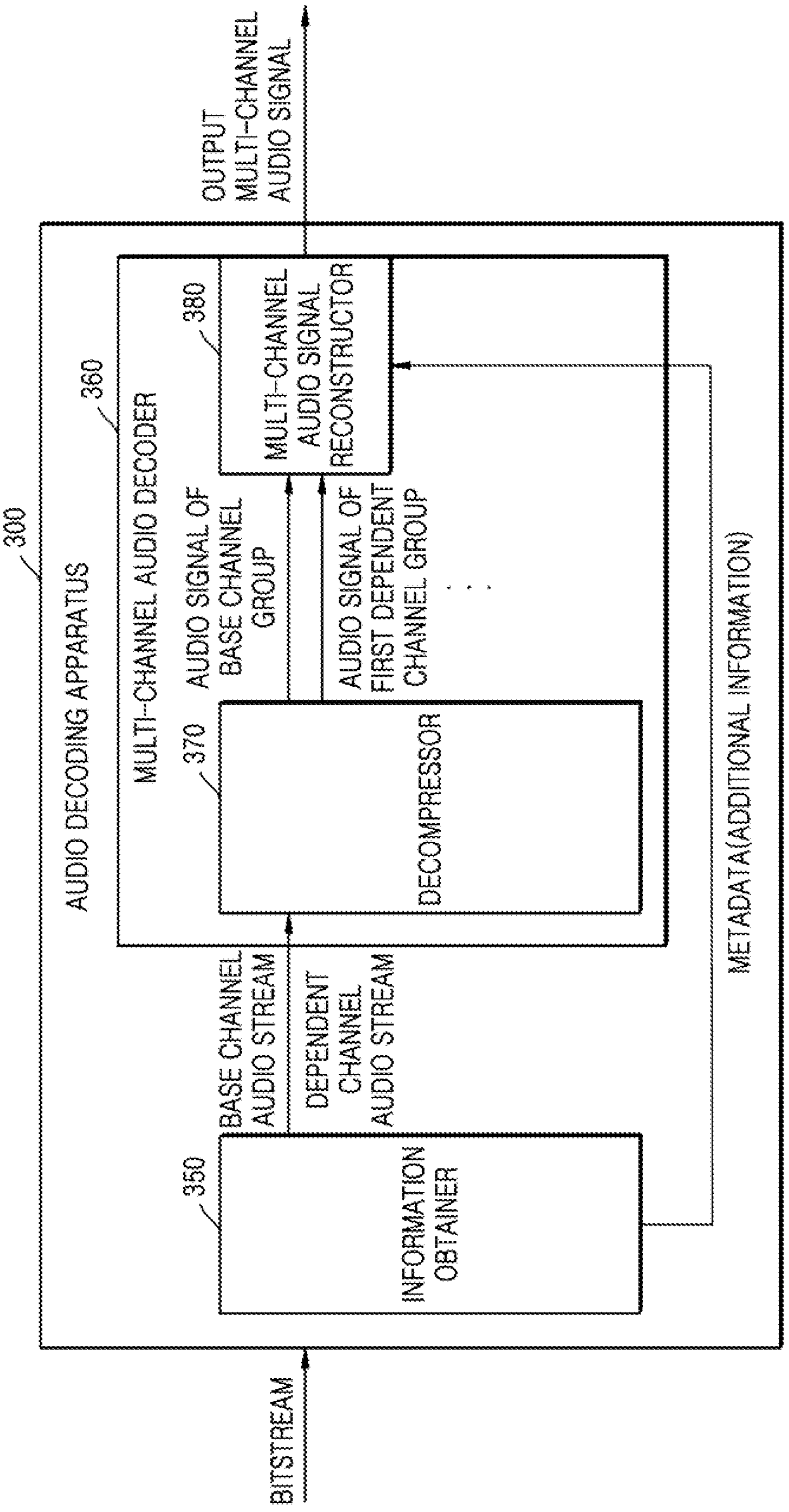
FIG. 3B is a block diagram of a structure of a multi-channel audio decoding apparatus according to an embodiment.

FIG. 3B is a block diagram of a structure of a multi-channel audio decoding apparatus according to an embodiment of the disclosure.

Referring to FIG. 3B, the audio decoding apparatus 300 may include an information obtainer 350 and a multi-channel audio decoder 360. The multi-channel audio decoder 360 may include a decompressor 370 and a multi-channel audio signal reconstructor 380.

The audio decoding apparatus 300 may include the memory 310 and the processor 330 of FIG. 3A, and an instruction for implementing the components 350, 360, 370, and 380 of FIG. 3B may be stored in the memory 310. The processor 330 may execute the instruction stored in the memory 310.

The information obtainer 350 may obtain the compressed audio signal of the base channel group from the bitstream. That is, the information obtainer 350 may classify a base channel audio stream including at least one compressed audio signal of the base channel group from the bitstream.

The information obtainer 350 may also obtain at least one compressed audio signal of at least one dependent channel group from the bitstream. That is, the information obtainer 350 may classify at least one dependent channel audio stream including at least one compressed audio signal of the dependent channel group from the bitstream.

Meanwhile, the bitstream may include a base channel audio stream and a plurality of dependent channel streams. The plurality of dependent channel audio streams may include a first dependent channel audio stream and a second dependent channel audio stream.

In this case, limitation of channels of a multi-channel first audio signal reconstructed through the base channel audio stream and the first dependent channel audio stream and a multi-channel second audio signal reconstructed through the base channel audio stream, the first dependent channel audio stream, and the second dependent channel audio stream will be described.

For example, among the channels of the first multi-channel layout reconstructed from the base channel audio stream and the first dependent channel audio stream, the number of surround channels may be $S_{n-1}$, the number of subwoofer channels may be $W_{n-1}$, and the number of height channels may be $H_{n-1}$. In the second multi-channel layout reconstructed from the base channel audio stream, the first dependent channel audio stream, and the second dependent channel audio stream, the number of surround channels may be $S_n$, the number of subwoofer channels may be $W_n$, and the number of height channels may be $H_n$. In this case, $S_{n-1}$ may be less than or equal to $S_n$, $W_{n-1}$ may be less than or equal to $W_n$, and $H_{n-1}$ may be less than or equal to $H_n$. Herein, a case where $S_{n-1}$ is equal to $S_n$, $W_{n-1}$ is equal to $W_n$, and $H_{n-1}$ is equal to $H_n$ may be excluded.

That is, the number of surround channels of the second multi-channel layout needs to be greater than the number of surround channels of the first multi-channel layout. Alternatively or additionally, the number of subwoofer channels of the second multi-channel layout needs to be greater than the number of subwoofer channels of the first multi-channel layout. Alternatively or additionally, the number of height channels of the second multi-channel layout needs to be greater than the number of height channels of the first multi-channel layout.

Moreover, the number of surround channels of the second multi-channel layout may not be less than the number of surround channels of the first multi-channel layout. Likewise, the number of subwoofer channels of the second multi-channel layout may not be less than the number of subwoofer channels of the first multi-channel layout. The number of height channels of the second multi-channel layout may not be less than the number of height channels of the first multi-channel layout.

In addition, the case where the number of surround channels of the second multi-channel layout is equal to the number of surround channels of the first multi-channel layout and the number of subwoofer channels of the second multi-channel layout is equal to the number of subwoofer channels of the first multi-channel layout and the number of height channels of the second multi-channel layout is equal to the number of height channels of the first multi-channel layout does not exist. That is, all channels of the second multi-channel layout may not be the same as all channels of the first multi-channel layout.

More specifically, for example, when the first multi-channel layout is the 5.1.2 channel layout, the second multi-channel layout may be the 7.1.4 channel layout.

Meanwhile, the bitstream may include a file stream having a plurality of audio tracks including a first audio track and a second audio track. A process in which the information obtainer 350 obtains at least one compressed audio signal of at least one dependent channel group according to additional information included in an audio track will be described below.

The information obtainer 350 may obtain at least one compressed audio signal of the base channel group from the first audio track.

The information obtainer 350 may obtain dependent channel audio signal identification information from a second audio track that is adjacent to the first audio track.

When the dependent channel audio signal identification information indicates that the dependent channel audio signal exists in the second audio track, the information obtainer 350 may obtain at least one audio signal of at least one dependent channel group from the second audio track.

When the dependent channel audio signal identification information indicates that the dependent channel audio signal does not exist in the second audio track, the information obtainer 350 may obtain the next audio signal of the base channel group from the second audio track.

The information obtainer 350 may obtain additional information related to reconstruction of multi-channel audio from the bitstream. That is, the information obtainer 350 may classify metadata including the additional information from the bitstream and obtain the additional information from the classified metadata.

The decompressor 370 may reconstruct the audio signal of the base channel group by decompressing at least one compressed audio signal of the base channel group.

The decompressor 370 may reconstruct at least one audio signal of the at least one dependent channel group by decompressing at least one compressed audio signal of the at least one dependent channel group.

In this case, the decompressor 370 may include separate first to $n^{th}$ decompressors for decoding compressed audio signals of the respective channel groups (n channel groups). In this case, the first decompressor to $n^{th}$ decompressor may operate in parallel with each other.

The multi-channel audio signal reconstructor 380 may reconstruct a multi-channel audio signal, based on at least one audio signal of the base channel group and at least one audio signal of the at least one dependent channel group.

For example, when the audio signal of the base channel group is an audio signal of a stereo channel, the multi-channel audio signal reconstructor 380 may reconstruct an audio signal of a 3D audio channel in front of the listener, based on the audio signal of the base channel group and the audio signal of the first dependent channel group. For example, the 3D audio channel in front of the listener may be a 3.1.2 channel.

Alternatively, the multi-channel audio signal reconstructor 380 may reconstruct an audio signal of a listener omni-direction audio channel, based on the audio signal of the base channel group, the audio signal of the first dependent channel group, and the audio signal of the second dependent channel group. For example, the listener omni-direction 3D audio channel may be the 5.1.2 channel or the 7.1.4 channel.

The multi-channel audio signal reconstructor 380 may reconstruct a multi-channel audio signal, based on not only the audio signal of the base channel group and the audio signal of the dependent channel group, but also the additional information. In this case, the additional information may be additional information for reconstructing the multi-channel audio signal. The multi-channel audio signal reconstructor 380 may output the reconstructed at least one multi-channel audio signal.

The multi-channel audio signal reconstructor 380 according to an embodiment of the disclosure may generate a first audio signal of a 3D audio channel in front of the listener from at least one audio signal of the base channel group and at least one audio signal of the at least one dependent channel group. The multi-channel audio signal reconstructor 380 may reconstruct a multi-channel audio signal including a second audio signal of a 3D audio channel in front of the listener, based on the first audio signal and the audio object signal of the 3D audio channel in front of the listener. In this case, the audio object signal may indicate at least one of an audio signal, a shape, an area, a position, or a direction of an audio object (e.g., a sound source), and may be obtained from the information obtainer 350.

A detailed operation of the multi-channel audio signal reconstructor 380 will now be described with reference to FIG. 3C.

Figure 3C:
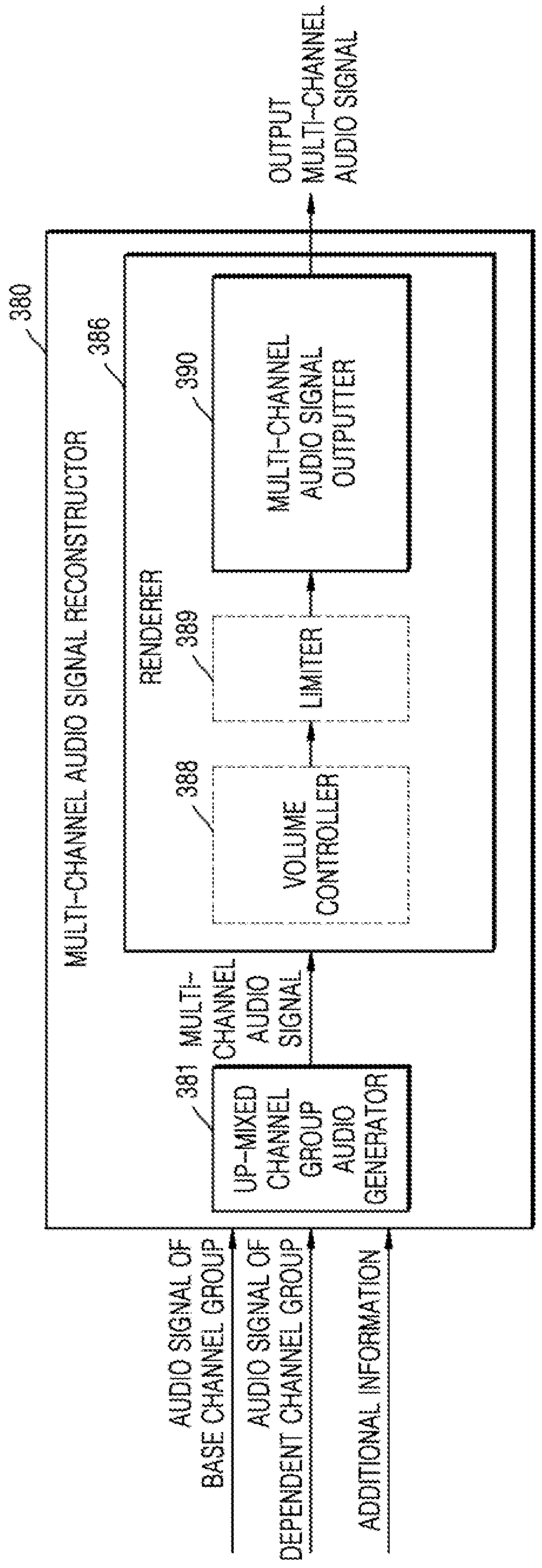
FIG. 3C is a block diagram of a structure of a multi-channel audio signal reconstructor according to an embodiment.

FIG. 3C is a block diagram of a structure of a multi-channel audio signal reconstructor 380 according to an embodiment of the disclosure.

Referring to FIG. 3C, the multi-channel audio signal reconstructor 380 may include an up-mixed channel group audio generator 381 and a renderer 386.

The up-mixed channel group audio generator 381 may generate an audio signal of an up-mixed channel group based on the audio signal of the base channel group and the audio signal of the dependent channel group. In this case, the audio signal of the up-mixed channel group may be a multi-channel audio signal. In this case, additionally, further based on the additional information (e.g., information about a dynamic de-mixing weight parameter), the multi-channel audio signal may be generated.

The up-mixed channel group audio generator 381 may generate an audio signal of an up-mixed channel by de-mixing the audio signal of the base channel group and some of the audio signals of the dependent channel group. For example, by de-mixing the audio signals L and R of the base channel group and a part of the audio signals of the dependent channel group, C, the audio signals L3 and R3 of the de-mixed channel (or the up-mixed channel) may be generated.

The up-mixed channel group audio generator 381 may generate an audio signal of some channel of the multi-channel audio signal, by bypassing a de-mixing operation with respect to some of the audio signals of the dependent channel group. For example, the up-mixed channel group audio generator 381 may generate audio signals of the C, LFE, Hfl3, and Hfr3 channels of the multi-channel audio signal, by bypassing the de-mixing operation with respect to the audio signals of the C, LFE, Hfl3, and Hfr3 channels that are some audio signals of the dependent channel group.

As a result, the up-mixed channel group audio generator 381 may generate the audio signal of the up-mixed channel group based on the audio signal of the up-mixed channel generated through de-mixing and the audio signal of the dependent channel group in which the de-mixing operation is bypassed. For example, the up-mixed channel group audio generator 381 may generate the audio signals of the L3, R3, C, LFE, Hfl3, and Hfr3 channels, which are audio signals of the 3.1.2 channel, based on the audio signals of the L3 and R3 channels, which are audio signals of the de-mixed channels, and the audio signals of the C, LFE, Hfl3, and Hfr3 channels, which are audio signals of the dependent channel group.

A detailed operation of the up-mixed channel group audio generator 381 will be described later with reference to FIG. 3D.

The renderer 386 may include a volume controller 388 and a limiter 389. The multi-channel audio signal input to the renderer 386 may be a multi-channel audio signal of at least one channel layout. The multi-channel audio signal input to the renderer 386 may be a pulse-code modulation (PCM) signal.

Meanwhile, a volume (loudness) of an audio signal of each channel may be measured based on ITU-R BS.1770, which may be signaled through the received additional information about a bitstream.

The volume controller 388 may control the volume of the audio signal of each channel to a target volume (for example, −24 LKFS), based on volume information signaled through the bitstream.

Meanwhile, a true peak may be measured based on ITU-R BS.1770.

The limiter 389 may limit a true peak level of the audio signal (e.g., to −1 dBTP) after volume control.

While post-processing components 388 and 389 included in the renderer 386 have been described so far, at least one component may be omitted and the order of each component may be changed according to circumstances, without being limited thereto.

A multi-channel audio signal outputter 390 may receive a post-processed multi-channel audio signal and may output at least one multi-channel audio signal. For example, the multi-channel audio signal outputter 390 may output an audio signal of each channel of a multi-channel audio signal to an audio output device corresponding to each channel, with a post-processed multi-channel audio signal as an input, according to a target channel layout. The audio output device may include various types of speakers.

Figure 3D:
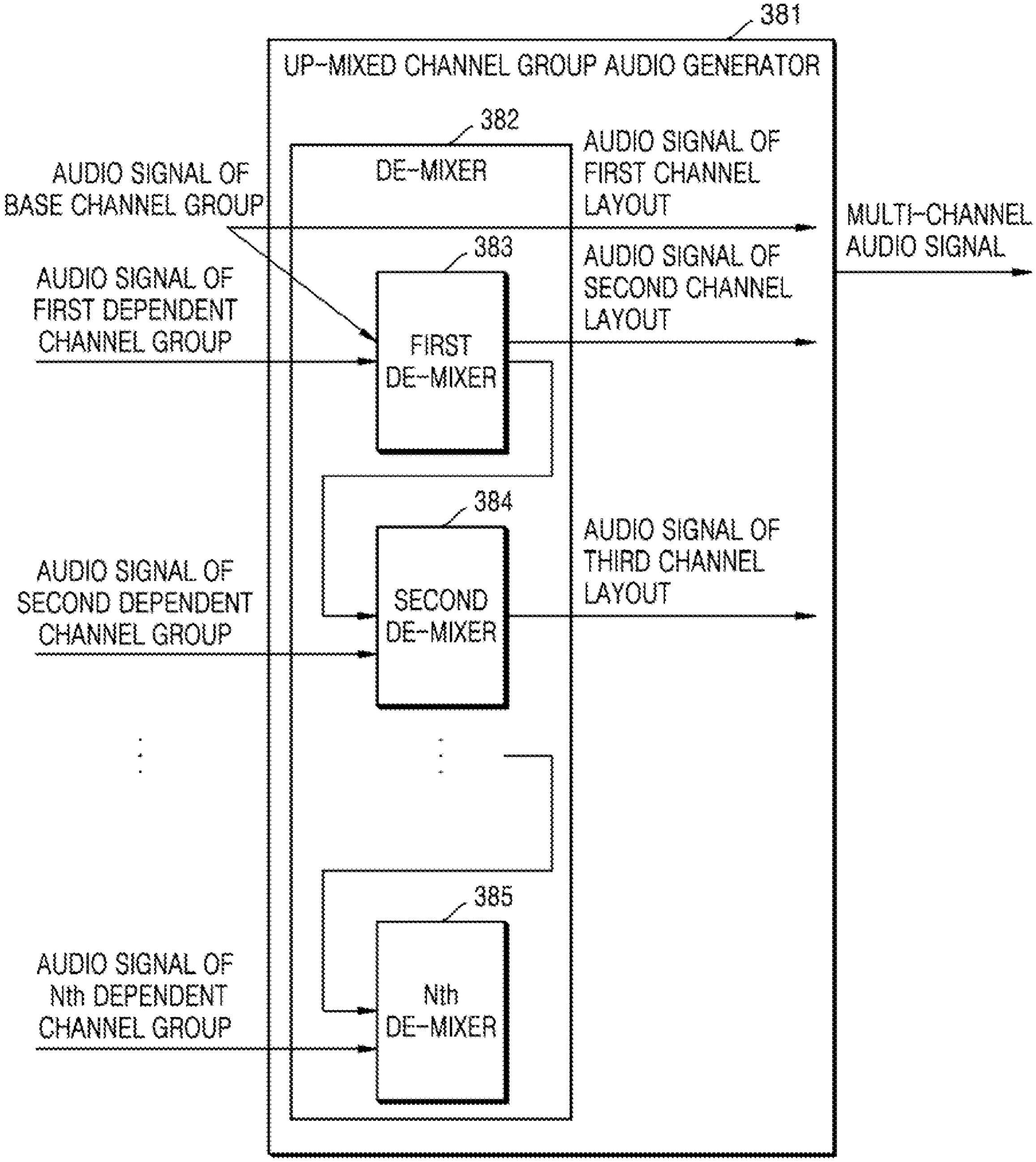
FIG. 3D is a block diagram of a structure of an up-mixed channel group audio generator according to an embodiment.

FIG. 3D is a block diagram of a structure of an up-mixed channel group audio generator according to an embodiment of the disclosure.

Referring to FIG. 3D, the up-mixed channel group audio generator 381 may include a de-mixer 382. The de-mixer 382 may include a first de-mixer 383, and a second de-mixer 384 through to an $N^{th}$ de-mixer 385.

The de-mixer 382 may obtain an audio signal of a new channel (an up-mixed channel or a de-mixed channel) from the audio signal of the base channel group and audio signals of some of channels (decoded channels) of the audio signals of the dependent channel group. That is, the de-mixer 382 may obtain an audio signal of one up-mixed channel from at least one audio signal where several channels are mixed. The de-mixer 382 may output an audio signal of a particular layout including the audio signal of the up-mixed channel and the audio signal of the decoded channel.

For example, the de-mixing operation may be bypassed in the de-mixer 382 such that the audio signal of the base channel group may be output as the audio signal of the first channel layout.

The first de-mixer 383 may de-mix audio signals of some channels with the audio signal of the base channel group and the audio signal of the first dependent channel group as inputs. In this case, the audio signal of the de-mixed channel (or the up-mixed channel) may be generated. The first de-mixer 383 may generate the audio signal of the independent channel by bypassing a mixing operation with respect to the audio signals of the other channels. The first de-mixer 383 may output an audio signal of a second channel layout, which is a signal including the audio signal of the up-mixed channel and the audio signal of the independent channel.

The second de-mixer 384 may generate the audio signal of the de-mixed channel (or the up-mixed channel) by de-mixing audio signals of some channels among the audio signals of the second channel layout and the audio signal of the second dependent channel. The second de-mixer 384 may generate the audio signal of the independent channel by bypassing the mixing operation with respect to the audio signals of the other channels. The second de-mixer 384 may output an audio signal of a third channel layout, which includes the audio signal of the up-mixed channel and the audio signal of the independent channel.

An $n^{th}$ de-mixer may output an audio signal of an $n^{th}$ channel layout, based on an audio signal of an $(n-1)^{th}$ channel layout and an audio signal of an $(n-1)^{th}$ dependent channel group, similarly with an operation of the second de-mixer 384. n may be less than or equal to N.

The $N^{th}$ de-mixer 385 may output an audio signal of an $N^{th}$ channel layout, based on an audio signal of an $(N-1)^{th}$ channel layout and an audio signal of an $(N-1)^{th}$ dependent channel group.

Although it is shown that an audio signal of a lower channel layout is directly input to the respective de-mixers 383, and 384 through to 385, an audio signal of a channel layout output through the renderer 386 of FIG. 3C may instead be input to each of the de-mixers 383, and 384 through to 385. That is, the post-processed audio signal of the lower channel layout may be input to each of the de-mixers 383, and 384 through to 385.

With reference to FIG. 3D, it is described that the de-mixers 383, 384 and 385 may be connected in a cascaded manner to output an audio signal of each channel layout.

However, without connecting the de-mixers 383, 384, and 385 in a cascaded manner, an audio signal of a particular layout may be output from the audio signal of the base channel group and the audio signal of the at least one dependent channel group.

Meanwhile, the audio signal generated by mixing signals of several channels in the audio encoding apparatuses 200 and 400 may have a lowered level by using a down-mix gain for preventing clipping. The audio decoding apparatuses 300 and 500 may match the level of the audio signal to the level of the original audio signal based on a corresponding down-mix gain for the signal generated by mixing.

Meanwhile, an operation based on the above-described down-mix gain may be performed for each channel or channel group. The audio encoding apparatuses 200 and 400 may signal information about a down-mix gain through additional information about a bitstream for each channel or each channel group. Thus, the audio decoding apparatuses 300 and 500 may obtain the information about the down-mix gain from the additional information about the bitstream for each channel or each channel group, and perform the above-described operation based on the down-mix gain.

Meanwhile, the de-mixer 382 may perform the de-mixing operation based on a dynamic de-mixing weight parameter of a de-mixing matrix (corresponding to a down-mixing weight parameter of a down-mixing matrix). In this case, the audio encoding apparatuses 200 and 400 may signal the dynamic de-mixing weight parameter or the dynamic down-mixing weight parameter corresponding thereto through the additional information about the bitstream. Some de-mixing weight parameters may not be signaled and have a fixed value.

Thus, the audio decoding apparatuses 300 and 500 may obtain information about the dynamic de-mixing weight parameter (or information about the dynamic down-mixing weight parameter) from the additional information about the bitstream, and perform the de-mixing operation based on the obtained information about the dynamic de-mixing weight parameter (or the information about the dynamic down-mixing weight parameter).

Figure 4A:
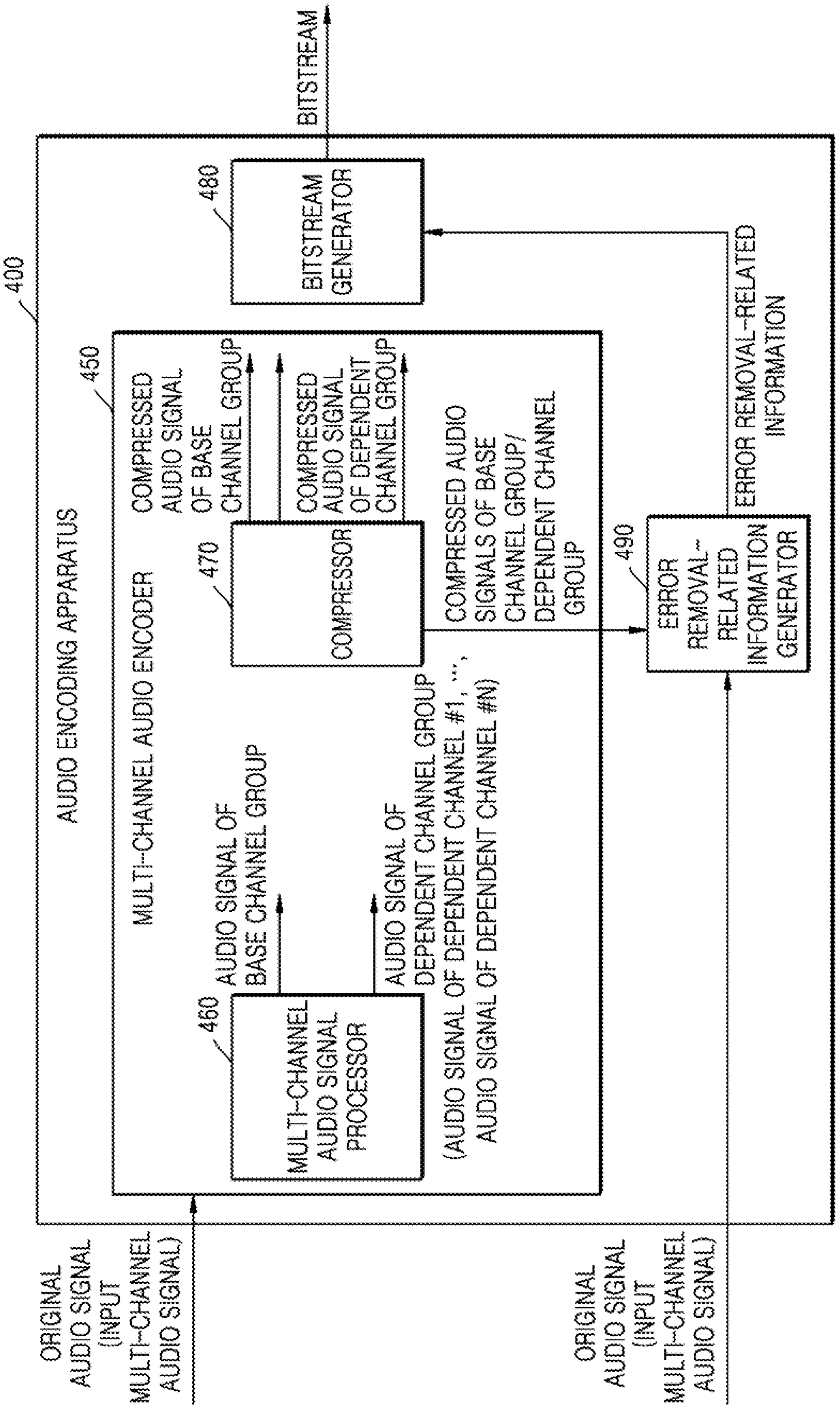
FIG. 4A is a block diagram of an audio encoding apparatus according to embodiment.

FIG. 4A is a block diagram of an audio encoding apparatus according to an embodiment of the disclosure.

Referring to FIG. 4A, the audio encoding apparatus 400 may include a multi-channel audio encoder 450, a bitstream generator 480, and an error removal-related information generator 490. The multi-channel audio encoder 450 may include a multi-channel audio signal processor 460 and a compressor 470.

The components 450, 460, 470, 480, and 490 of FIG. 4A may be implemented by the memory 210 and the processor 230 of FIG. 2A.

Operations of the multi-channel audio encoder 450, the multi-channel audio signal processor 460, the compressor 470, and the bitstream generator 480 of FIG. 4A correspond to the operations of the multi-channel audio encoder 250, the multi-channel audio signal processor 260, the compressor 270, and the bitstream generator 280, respectively, and thus a detailed description thereof will be replaced with the description of FIG. 2B.

The error removal-related information generator 490 may be included in the additional information generator 285 of FIG. 2B, but may also exist separately, without being limited thereto.

The error removal-related information generator 490 may determine an error removal factor (e.g., a scaling factor) based on a first power value and a second power value. In this case, the first power value may be an energy value of one channel of the original audio signal or an audio signal of one channel obtained by down-mixing from the original audio signal. The second power value may be a power value of an audio signal of an up-mixed channel as one of audio signals of an up-mixed channel group. The audio signal of the up-mixed channel group may be an audio signal obtained by de-mixing a base channel reconstructed signal and a dependent channel reconstructed signal.

The error removal-related information generator 490 may determine an error removal factor for each channel.

The error removal-related information generator 490 may generate information related to error removal (or error removal-related information) including information about the determined error removal factor. The bitstream generator 480 may generate a bitstream further including the error removal-related information. A detailed operation of the error removal-related information generator 490 will now be described with reference to FIG. 4B.

Figure 4B:
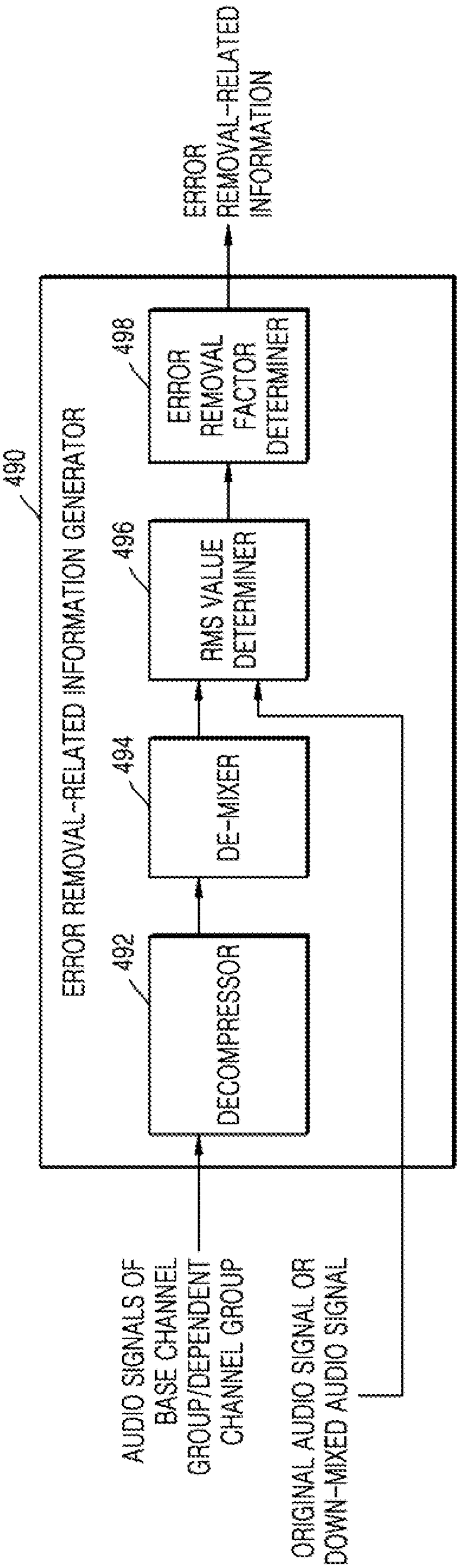
FIG. 4B is a block diagram of a structure of an error removal-related information generator according to an embodiment.

FIG. 4B is a block diagram of a structure of an error removal-related information generator 490 according to an embodiment of the disclosure.

Referring to FIG. 4B, the error removal-related information generator 490 may include a decompressor 492, a de-mixer 494, a root mean square (RMS) value determiner 496, and an error removal factor determiner 498.

The decompressor 492 may generate the base channel reconstructed signal by decompressing the compressed audio signal of the base channel group. In addition, the decompressor 492 may generate the dependent channel reconstructed signal by decompressing the compressed audio signal of the dependent channel group.

The de-mixer 494 may de-mix the base channel reconstructed signal and the dependent channel reconstructed signal to generate the audio signal of the up-mixed channel group. More specifically, the de-mixer 494 may generate an audio signal of an up-mixed channel (or a de-mixed channel) by de-mixing audio signals of some channels among audio signals of the base channel group and the dependent channel group. The de-mixer 494 may bypass a de-mixing operation with respect to some audio signals among the audio signals of the base channel group and the dependent channel group.

The de-mixer 494 may obtain an audio signal of an up-mixed channel group including the audio signal of the up-mixed channel and the audio signal for which the de-mixing operation is bypassed.

The RMS value determiner 496 may determine an RMS value of a first audio signal of one up-mixed channel of the up-mixed channel group. The RMS value determiner 496 may determine an RMS value of a second audio signal of one channel of the original audio signal or an RMS value of a second audio signal of one channel of an audio signal down-mixed from the original audio signal. In this case, the channel of the first audio signal and the channel of the second audio signal may indicate the same channel in a channel layout.

The error removal factor determiner 498 may determine an error removal factor based on the RMS value of the first audio signal and the RMS value of the second audio signal. For example, a value generated by dividing the RMS value of the first audio signal by the RMS value of the second audio signal may be obtained as a value of the error removal factor. The error removal factor determiner 498 may generate information about the determined error removal factor. The error removal factor determiner 498 may output the error removal-related information including the information about the error removal factor.

Figure 5A:
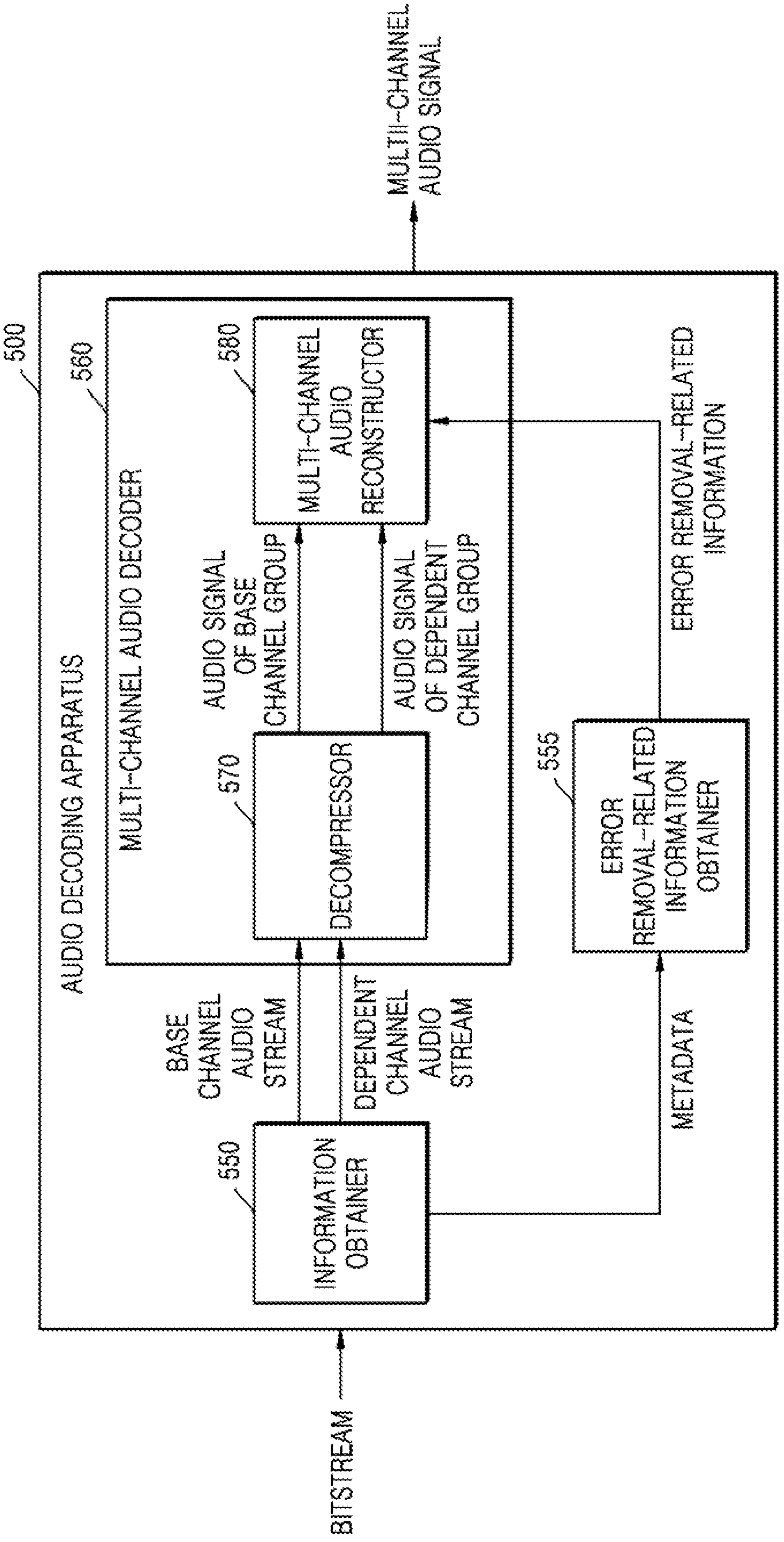
FIG. 5A is a block diagram of a structure of an audio decoding apparatus according to an embodiment.

FIG. 5A is a block diagram of a structure of an audio decoding apparatus according to an embodiment of the disclosure.

Referring to FIG. 5A, the audio decoding apparatus 500 may include an information obtainer 550, a multi-channel audio decoder 560, a decompressor 570, a multi-channel audio signal reconstructor 580, and an error removal-related information obtainer 555. The components 550, 555, 560, 570, and 580 of FIG. 5A may be implemented by the memory 310 and the processor 330 of FIG. 3A.

An instruction for implementing the components 550, 555, 560, 570, and 580 of FIG. 5A may be stored in the memory 310 of FIG. 3A. The processor 330 may execute the instruction stored in the memory 310.

Operations of the information obtainer 550, the decompressor 570, and the multi-channel audio signal reconstructor 580 of FIG. 5A respectively include the operations of the information obtainer 350, the decompressor 370, and the multi-channel audio signal reconstructor 380 of FIG. 3B, and thus a redundant description will be replaced with the description made with reference to FIG. 3B. Hereinafter, a description that is not redundant to the description of FIG. 3B will be provided.

The information obtainer 550 may obtain metadata from the bitstream.

The error removal-related information obtainer 555 may obtain the error removal-related information from the metadata included in the bitstream. Herein, the information about the error removal factor included in the error removal-related information may be an error removal factor of an audio signal of one up-mixed channel of an up-mixed channel group. The error removal-related information obtainer 555 may be included in the information obtainer 550.

The multi-channel audio signal reconstructor 580 may generate an audio signal of the up-mixed channel group based on at least one audio signal of the base channel and at least one audio signal of at least one dependent channel group. The audio signal of the up-mixed channel group may be a multi-channel audio signal. The multi-channel audio signal reconstructor 580 may reconstruct the audio signal of the one up-mixed channel by applying the error removal factor to the audio signal of the one up-mixed channel included in the up-mixed channel group.

The multi-channel audio signal reconstructor 580 may output the multi-channel audio signal including the reconstructed audio signal of the one up-mixed channel.

Figure 5B:
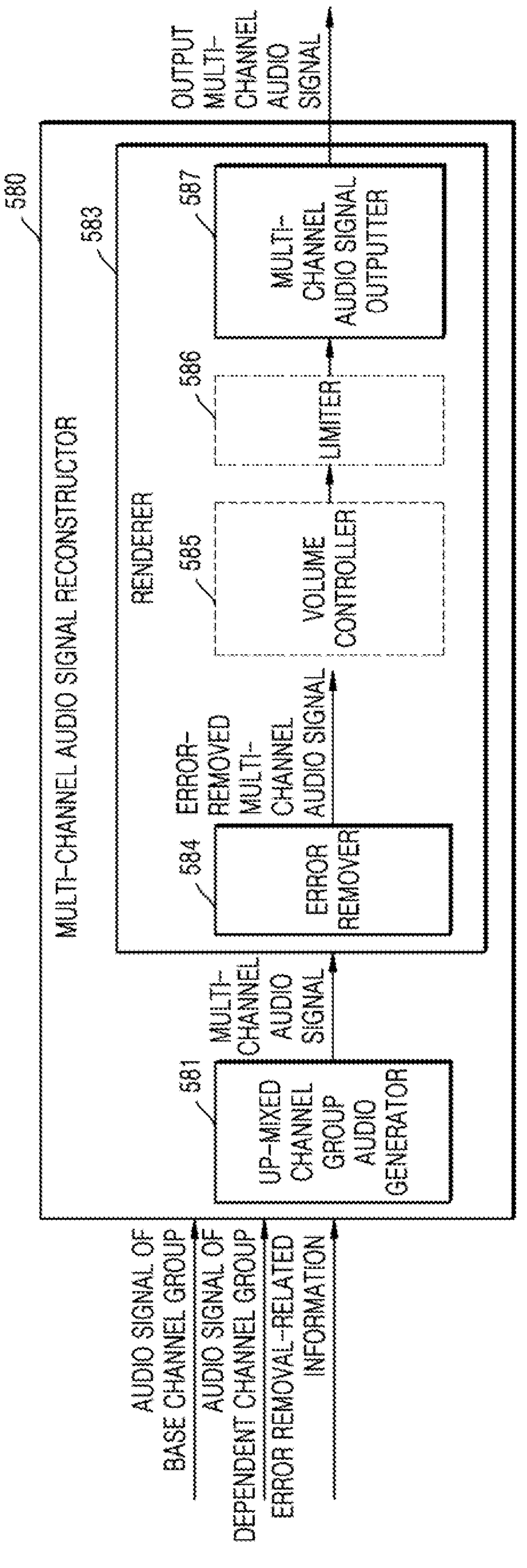
FIG. 5B is a block diagram of a structure of a multi-channel audio signal reconstructor according to an embodiment.

FIG. 5B is a block diagram of a structure of a multi-channel audio signal reconstructor according to an embodiment of the disclosure.

The multi-channel audio signal reconstructor 580 may include an up-mixed channel group audio generator 581 and a renderer 583. The renderer 583 may include an error remover 584, a volume controller 585, a limiter 586, and a multi-channel audio signal outputter 587.

The up-mixed channel group audio generator 581, the error remover 584, the volume controller 585, the limiter 586, and the multi-channel audio signal outputter 587 of FIG. 5B may include operations of the up-mixed channel group audio generator 381, the volume controller 388, the limiter 389, and the multi-channel audio signal outputter 390 of FIG. 3C, and thus a redundant description will be replaced with the description made with reference to FIG. 3C. Hereinafter, a part that is not redundant to FIG. 3C will be described.

The error remover 584 may reconstruct the error-removed audio signal of the first channel based on the audio signal of a first up-mixed channel of the up-mixed channel group of the multi-channel audio signal and the error removal factor of the first up-mixed channel. In this case, the error removal factor may be a value based on an RMS value of the original audio signal or an audio signal of the first channel of the audio signal down-mixed from the original audio signal and an RMS value of an audio signal of the first up-mixed channel of the up-mixed channel group. The first channel and the first up-mixed channel may indicate the same channel of a channel layout. The error remover 584 may remove an error caused by encoding by causing the RMS value of the audio signal of the first up-mixed channel of the current up-mixed channel group to be the RMS value of the original audio signal or the audio signal of the first channel of the audio signal down-mixed from the original audio signal.

Meanwhile, the error removal factor may differ between adjacent audio frames. In this case, in an end section of a previous frame and an initial section of a next frame, an audio signal may bounce due to discontinuous factors for error removal.

Thus, the error remover 584 may determine the error removal factor used in a frame boundary adjacent section by performing smoothing on the error removal factor. The frame boundary adjacent section may mean the end section of the previous frame with respect to the boundary and the first section of the next frame with respect to the boundary. Each section may include a predetermined number of samples.

Here, smoothing may refer to an operation of converting a discontinuous error removal factor between adjacent audio frames into a continuous error removal factor in a frame boundary section.

The multi-channel audio signal outputter 587 may output the multi-channel audio signal including the error-removed audio signal of one channel.

Meanwhile, at least one component of the post-processed components 585 and 586 included in the renderer 583 may be omitted, and the order of the post-processed components 584, 585, and 586 including the error remover 584 may be changed depending on circumstances.

As described above, the audio decoding apparatuses 200 and 400 may generate a bitstream. The audio encoding apparatuses 200 and 400 may transmit the generated bitstream.

In this case, the bitstream may be generated in the form of a file stream. The audio decoding apparatuses 300 and 500 may receive the bitstream. The audio decoding apparatuses 300 and 500 may reconstruct the multi-channel audio signal based on the information obtained from the received bitstream. In this case, the bitstream may be included in a predetermined file container. For example, the file container may be a Moving Picture Experts Group (MPEG)-4 media container for compressing various pieces of multimedia digital data, such as an MPEG-4 Part 14 (MP4), etc.

FIG. 6A is a view for describing a transmission order and a rule of an audio stream in each channel group by the audio encoding apparatuses 200 and 400 according to an embodiment of the disclosure.

In a scalable format, transmission order and rule of an audio stream in each channel group may be as described below.

The audio encoding apparatuses 200 and 400 may first transmit a coupled stream and then transmit a non-coupled stream.

The audio encoding apparatuses 200 and 400 may first transmit a coupled stream for a surround channel and then transmit a coupled stream for a height channel.

The audio encoding apparatuses 200 and 400 may first transmit a coupled stream for a front channel and then transmit a coupled stream for a side or back channel.

For non-coupled stream transmission, the audio encoding apparatuses 200 and 400 may first transmit a stream for a center channel, and then transmit a stream for the LFE channel and another channel. Herein, the other channel may exist when the base channel group includes a mono channel signal. In this case, the other channel may be one of a left channel L2 or a right channel R2 of a stereo channel.

The audio encoding apparatuses 200 and 400 may compress audio signals of coupled channels into one pair. The audio encoding apparatuses 200 and 400 may first transmit a coupled stream including the audio signals compressed into one pair. For example, the coupled channels may mean left-right symmetric channels such as UR, Ls/Rs, Lb/Rb, Hfl/Hfr, Hbl/Hbr channels, etc.

Hereinbelow, according to the above-described transmission order and rule of streams in each channel group, a stream configuration of each channel group in a bitstream 610 of Case 1 will be described.

Referring to FIG. 6A, for example, the audio encoding apparatuses 200 and 400 may compress L1 and R1 signals that are 2-channel audio signals, and the compressed L1 and R1 signals may be included in a C1 bitstream of a base channel group (BCG).

Next to the base channel group, the audio encoding apparatuses 200 and 400 may compress a 4-channel audio signal into an audio signal of a dependent channel group #1.

The audio encoding apparatuses 200 and 400 may compress the Hfl3 signal and the Hfr3 signal, and the compressed Hfl3 signal and Hfr3 signal may be included in a C2 bitstream of bitstreams of the dependent channel group #1.

The audio encoding apparatuses 200 and 400 may compress the C signal, and the compressed C signal may be included in the M1 bitstream of the bitstreams of the dependent channel group #1.

The audio encoding apparatuses 200 and 400 may compress the LFE signal, and the compressed LFE signal may be included in the M2 bitstream of the bitstreams of the dependent channel group #1.

The audio decoding apparatuses 300 and 500 may reconstruct the audio signal of the 3.1.2 channel layout, based on compressed audio signals of the base channel group and the dependent channel group #1.

Next to the dependent channel group #1, the audio encoding apparatuses 200 and 400 may compress a 6-channel audio signal into an audio signal of the dependent channel group #2.

The audio encoding apparatuses 200 and 400 may first compress the L signal and the R signal, and the compressed L signal and R signal may be included in a C3 bitstream of bitstreams of the dependent channel group #2.

Next to the C3 bitstream, the audio encoding apparatuses 200 and 400 may compress the Ls signal and the Rs signal, and the compressed Ls and Rs signals may be included in a C4 bitstream of the bitstreams of the dependent channel group #2.

Next to a C4 bitstream, the audio encoding apparatuses 200 and 400 may compress the Hfl signal and the Hfr signal, and the compressed Hfl and Hfr signals may be included in a C5 bitstream of the bitstreams of the dependent channel group #2.

The audio decoding apparatuses 300 and 500 may reconstruct the audio signal of the 7.1.4 channel layout, based on compressed audio signals of the base channel group, the dependent channel group #1, and the dependent channel group #2.

Hereinbelow, according to the above-described transmission order and rule of streams in each channel group, a stream configuration of each channel group in a bitstream 620 of Case 2 will be described.

The audio encoding apparatuses 200 and 400 may compress the L2 signal and the R2 signal which are 2-channel audio signals, and the compressed L2 and R2 signals may be included in the C1 bitstream of the bitstreams of the base channel group.

Next to the base channel group, the audio encoding apparatuses 200 and 400 may compress a 6-channel audio signal into an audio signal of the dependent channel group #1.

The audio encoding apparatuses 200 and 400 may first compress the L signal and the R signal, and the compressed L signal and R signal may be included in the C2 bitstream of the bitstreams of the dependent channel group #1.

The audio encoding apparatuses 200 and 400 may compress the Ls signal and the Rs signal, and the compressed Ls signal and Rs signal may be included in the C3 bitstream of the bitstreams of the dependent channel group #1.

The audio encoding apparatuses 200 and 400 may compress the C signal, and the compressed C signal may be included in the M1 bitstream of the bitstreams of the dependent channel group #1.

The audio encoding apparatuses 200 and 400 may compress the LFE signal, and the compressed LFE signal may be included in the M2 bitstream of the bitstreams of the dependent channel group #1.

The audio encoding apparatuses 200 and 400 may reconstruct the audio signal of the 7.1.0 channel layout, based on the compressed audio signals of the base channel group and the dependent channel group #1.

Next to the dependent channel group #1, the audio encoding apparatuses 200 and 400 may compress the 4-channel audio signal into the audio signal of the dependent channel group #2.

The audio encoding apparatuses 200 and 400 may compress the Hfl signal and the Hfr signal, and the compressed Hfl signal and Hfr signal may be included in the C4 bitstream of the bitstreams of the dependent channel group #2.

The audio encoding apparatuses 200 and 400 may compress the Hbl signal and the Hbr signal, and the compressed Hfl signal and Hfr signal may be included in the C5 bitstream of the bitstreams of the dependent channel group #2.

The audio decoding apparatuses 300 and 500 may reconstruct the audio signal of the 7.1.4 channel layout, based on compressed audio signals of the base channel group, the dependent channel group #1, and the dependent channel group #2.

Hereinbelow, according to the above-described transmission order and rule of streams in each channel group, a stream configuration of each channel group in a bitstream 630 of Case 3 will be described.

The audio encoding apparatuses 200 and 400 may compress the L2 signal and the R2 signal which are 2-channel audio signals, and the compressed L2 and R2 signals may be included in the C1 bitstream of the bitstreams of the base channel group.

Next to the base channel group, the audio encoding apparatuses 200 and 400 may compress a 10-channel audio signal into the audio signal of the dependent channel group #1.

The audio encoding apparatuses 200 and 400 may first compress the L signal and the R signal, and the compressed L signal and R signal may be included in the C2 bitstream of the bitstreams of the dependent channel group #1.

The audio encoding apparatuses 200 and 400 may compress the Ls signal and the Rs signal, and the compressed Ls signal and Rs signal may be included in the C3 bitstream of the bitstreams of the dependent channel group #1.

The audio encoding apparatuses 200 and 400 may compress the Hfl signal and the Hfr signal, and the compressed Hfl signal and Hfr signal may be included in the C4 bitstream of the bitstreams of the dependent channel group #1.

The audio encoding apparatuses 200 and 400 may compress the Hbl signal and the Hbr signal, and the compressed Hfl signal and Hfr signal may be included in the C5 bitstream of the bitstreams of the dependent channel group #1.

The audio encoding apparatuses 200 and 400 may compress the C signal, and the compressed C signal may be included in the M1 bitstream of the bitstreams of the dependent channel group #1.

The audio encoding apparatuses 200 and 400 may compress the LFE signal, and the compressed LFE signal may be included in the M2 bitstream of the bitstreams of the dependent channel group #1.

The audio encoding apparatuses 200 and 400 may reconstruct the audio signal of the 7.1.4 channel layout, based on the compressed audio signals of the base channel group and the dependent channel group #1.

Meanwhile, the audio decoding apparatuses 300 and 500 may perform de-mixing in a stepwise manner, by using at least one up-mixing unit. De-mixing may be performed based on audio signals of channels included in at least one channel group.

For example, a 1.x to 2.x up-mixing unit (first up-mixing unit) may de-mix an audio signal of a right channel from an audio signal of a mono channel that is a mixed right channel.

Alternatively, a 2.x to 3.x up-mixing unit (second up-mixing unit) may de-mix an audio signal of a center channel from audio signals of the L2 and R2 channels corresponding to a mixed center channel. Alternatively, the 2.x to 3.x up-mixing unit (second up-mixing unit) may de-mix an audio signal of an L3 channel and an audio signal of an R3 channel from audio signals of the L2 and R2 channels of the mixed L3 and R3 channels and the audio signal of the C channel.

A 3.x to 5.x up-mixing unit (third up-mixing unit) may de-mix audio signals of the Ls5 channel and the Rs5 channel from the audio signals of the L3, R3, L(5), and R(5) channels that correspond to an Ls5/Rs5 mixed channel.

A 5.x to 7.x up-mixing unit (fourth up-mixing unit) may de-mix an audio signal of a Lb channel and an audio signal of an Rb channel from audio signals of the Ls5, Ls7, and Rs7 channels that correspond to the mixed Lb/Rb channel.

An x.x.2(FH) to x.x.2(H) up-mixing unit (fourth up-mixing unit) may de-mix audio signals of the Hl channel and the Hr channel from the audio signals of the Hfl3, Hfr3, L3, L5, R3, and R5 channels that correspond to the mixed Ls/Rs channel.

An x.x.2(H) to x.x.4 up-mixing unit (fifth up-mixing unit) may de-mix audio signals of the Hbl channel and the Hbr channel from the audio signals of the Hl, Hr, Hfl, and Hfr channels that correspond to the mixed Hbl/Hbr channel.

For example, the audio decoding apparatuses 300 and 500 may perform de-mixing to the 3.2.1 channel layout by using the first up-mixing unit.

The audio decoding apparatuses 300 and 500 may perform de-mixing to the 7.1.4 channel layout by using the second up-mixing unit and the third mixing unit for the surround channel and the fourth up-mixing unit and the fifth up-mixing unit for the height channel.

Alternatively, the audio decoding apparatuses 300 and 500 may perform de-mixing to the 7.1.0 channel layout by using the first mixing unit, the second mixing unit, and the third mixing unit. The audio decoding apparatuses 300 and 500 may not perform de-mixing to the 7.1.4 channel layout from the 7.1.0 channel layout.

Alternatively, the audio decoding apparatuses 300 and 500 may perform de-mixing to the 7.1.4 channel layout by using the first mixing unit, the second mixing unit, and the third mixing unit. The audio decoding apparatuses 300 and 500 may not perform de-mixing on the height channel.

Hereinafter, rules for generating a channel group by the audio encoding apparatuses 200 and 400 will be described. For a channel layout CLi (i is an integer from 0 to n, and Cli indicates Si, Wi, and Hi) for a scalable format, Si+Wi+Hi may mean the number of channels for a channel group #i. The number of channels for the channel group #i may be greater than the number of channels for a channel group #i−1.

The channel group #i may include as many original channels of Cli (display channels) as possible. The original channels may follow a priority described below.

When $H_{i-1}$ is 0, the priority of the height channel may be higher than those of other channels. The priorities of the center channel and the LFE channel may precede other channels.

The priority of the height front channel may precede the priorities of the side channel and the height back channel.

The priority of the side channel may precede the priority of the back channel. Moreover, the priority of the left channel may precede the priority of the right channel.

For example, when n is 4, CL0 is a stereo channel, CL1 is a 3.1.2 channel, CL2 is a 5.1.2 channel, and CL3 is a 7.1.4 channel, the channel group may be generated as described below.

The audio encoding apparatuses 200 and 400 may generate the base channel group including the A(L2) and B(R2) signals. The audio encoding apparatuses 200 and 400 may generate the dependent channel group #1 including the Q1(Hfl3), Q2(Hfr3), T(=C), and P(=LFE) signals. The audio encoding apparatuses 200 and 400 may generate the dependent channel group #2 including the S1(=L) and S2(=R) signals.

The audio encoding apparatuses 200 and 400 may generate the dependent channel group #3 including the V1(Hfl), V2(Hfr), U1(Ls), and U2(Rs) signals.

Meanwhile, the audio decoding apparatuses 300 and 500 may reconstruct the audio signal of the 7.1.4 channel from the decompressed audio signals by using a down-mixing matrix. In this case, the down-mixing matrix may include, for example, a down-mixing weight parameter as in Table 2 provided below.

TABLE 2

| | L | R | C | LFE | Ls | Rs | Lb | Rb | Hfl | Hfr | Hbl | Hbr |
|---|---|---|---|---|---|---|---|---|---|---|---|---|
| A(L2/L3) | 1 | | cw | | δ*α | | δ*β | | | | | |
| B(L2/L3) | | 1 | cw | | | δ*α | | δ*β | | | | |
| T(C) | | | 1 | | | | | | | | | |
| P(LFE) | | | | 1 | | | | | | | | |
| Q1(Hfl3) | | | | | w*δ*α | | w*δ*β | | 1 | | γ | |
| Q2(Hfr3) | | | | | | w*δ*α | | w*δ*β | | 1 | | γ |
| S1(L) | 1 | | | | | | | | | | | |
| S2(R) | | 1 | | | | | | | | | | |
| U1(Ls7) | | | | | 1 | | | | | | | |
| U2(Rs7) | | | | | | 1 | | | | | | |
| V1(Hfl3) | | | | | | | | | 1 | | | |
| V2(Hfr3) | | | | | | | | | | 1 | | |

Herein, cw indicates a center weight that may be 0 when the channel layout of the base channel group is the 3.1.2 channel layout and may be 1 when the channel layout of the base channel group is the 2-channel layout. w may indicate a surround-to-height mixing weight. α, β, γ, and δ may indicate down-mixing weight parameters and may be variable. The audio encoding apparatuses 200 and 400 may generate a bitstream including down-mixing weight parameter information such as α, β, γ, δ, and w, and the audio decoding apparatuses 300 and 500 may obtain the down-mixing weight parameter information from the bitstream.

On the other hand, the weight parameter information about the down-mixing matrix (or the de-mixing matrix) may be in the form of an index. For example, the weight parameter information about the down-mixing matrix (or the de-mixing matrix) may be index information indicating one down-mixing (or de-mixing) weight parameter set among a plurality of down-mixing (or de-mixing) weight parameter sets, and at least one down-mixing (or de-mixing) weight parameter corresponding to one down-mixing (or de-mixing) weight parameter set may exist in the form of a lookup table (LUT). For example, the weight parameter information about the down-mixing (or de-mixing) matrix may be information indicating one down-mixing (or de-mixing) weight parameter set among a plurality of down-mixing (or de-mixing) weight parameter sets, and at least one of α, β, γ, δ, or w may be predefined in the LUT corresponding to the one down-mixing (or de-mixing) weight parameter set. Thus, the audio decoding apparatuses 300 and 500 may obtain α, β, γ, δ, and w corresponding to one down-mixing (de-mixing) weight parameter set.

A matrix for down-mixing from a first channel layout to a second channel layout may include a plurality of matrices. For example, the matrix may include a first matrix for down-mixing from the first channel layout to a third channel layout and a second matrix for down-mixing from the third channel layout to the second channel layout.

More specifically, for example, a matrix for down-mixing from an audio signal of the 7.1.4 channel layout to an audio signal of the 3.1.2 channel layout may include a first matrix for down-mixing from the audio signal of the 7.1.4 channel layout to the audio signal of the 5.1.4 channel layout and a second matrix for down-mixing from the audio signal of the 5.1.4 channel layout to the audio signal of the 3.1.2 channel layout.

Tables 3 and 4 show the first matrix and the second matrix for down-mixing from the audio signal of the 7.1.4 channel layout to the audio signal of the 3.1.2 channel layout based on a content-based down-mixing parameter and a surround-to-height-based weight.

TABLE 3

First matrix (7.1 to 5.1 down-mixing matrices)

| first matrix | L | R | C | LFE | Ls | Rs | Lb | Rb |
|---|---|---|---|---|---|---|---|---|
| Ls5 | | | | | α | | β | |
| Rs5 | | | | | | α | | β |

TABLE 4

Second matrix (5.1.4 to 3.1.2 down-mixing matrices)

| second matrix | L | R | C | LFE | Ls5 | Rs5 | Hfl | Hfr | Hbl | Hbr |
|---|---|---|---|---|---|---|---|---|---|---|
| L3 | 1 | 0 | 0 | 0 | γ | 0 | 0 | 0 | 0 | 0 |
| R3 | 0 | 1 | 0 | 0 | 0 | γ | 0 | 0 | 0 | 0 |
| C | 0 | 0 | 1 | 0 | 0 | 0 | 0 | 0 | 0 | 0 |
| LFE | 0 | 0 | 0 | 1 | 0 | 0 | 0 | 0 | 0 | 0 |
| Hfl3 | 0 | 0 | 0 | 0 | γ*w | 0 | 0 | 0 | δ | 0 |
| Hfr3 | 0 | 0 | 0 | 0 | 0 | γ*w | 0 | 0 | 0 | δ |

Herein, α, β, γ, or δ indicates one of down-mixing parameters, and w indicates a surround-to-height weight.

For up-mixing (or de-mixing) from a 5.x channel to a 7.x channel, the de-mixing weight parameters α and β may be used.

For up-mixing from an x.x.2(H) channel to an x.x.4 channel, the de-mixing weight parameter γ may be used.

For up-mixing from a 3.x channel to a 5.x channel, the de-mixing weight parameter δ may be used.

For up-mixing from an x.x.2(FH) channel to an x.x.2(H) channel, the de-mixing weight parameters w and δ may be used.

For up-mixing from a 2.x channel to a 3.x channel, a de-mixing weight parameter of −3 dB may be used. That is, the de-mixing weight parameter may be a fixed value and may not be signaled.

Further, for up-mixing to the 1.x channel and the 2.x channel, a de-mixing weight parameter of −6 dB may be used. That is, the de-mixing weight parameter may be a fixed value and may not be signaled.

Meanwhile, the de-mixing weight parameter used for de-mixing may be a parameter included in one of a plurality of types. For example, the de-mixing weight parameters α, β, γ, and δ of Type 1 may be 0 dB, 0 dB, −3 dB, and −3 dB. The de-mixing weight parameters α, β, γ, and δ of Type 2 may be −3 dB, −3 dB, −3 dB, and −3 dB. The de-mixing weight parameters α, β, γ, and δ of Type 3 may be 0 dB, −1.25 dB, −1.25 dB, and −1.25 dB. Type 1 may be a type indicating a case where an audio signal is a general audio signal, Type 2 may be a type (a dialogue type) indicating a case where a dialogue is included in an audio signal, and Type 3 may be a type (a sound effect type) indicating a case where a sound effect exists in the audio signal.

The audio encoding apparatuses 200 and 400 may analyze an audio signal and determine one of a plurality of types according to the analyzed audio signal. The audio encoding apparatuses 200 and 400 may perform down-mixing with respect to the original audio by using a de-mixing weight parameter of the determined type to generate an audio signal of a lower channel layout.

The audio encoding apparatuses 200 and 400 may generate a bitstream including index information indicating one of the plurality of types. The audio decoding apparatuses 300 and 500 may obtain the index information from the bitstream and identify one of the plurality of types based on the obtained index information. The audio decoding apparatuses 300 and 500 may up-mix an audio signal of a decompressed channel group by using a de-mixing weight parameter of the identified type to reconstruct an audio signal of a particular channel layout.

Alternatively, the audio signal generated according to down-mixing may be expressed as Equation 1 provided below. That is, down-mixing may be performed based on an operation using an equation in the form of a first-degree polynomial, and each down-mixed audio signal may be generated.

$$Ls5=\alpha\times Ls7+\beta\times Lb7$$

$$Rs5=\alpha\times Rs7+\beta\times Rb7$$

$$L3=L5+\delta\times Ls5$$

$$R3=R5+\delta\times Rs5$$

$$L2=L3+p_2\times C$$

$$R2=R3+p_2\times C$$

$$\text{Mono}=p_1\times(L2+R2)$$

$$Hl=Hfl+\gamma\times Hbl$$

$$Hr=Hfr+\gamma\times Hbr$$

$$Hfl3=Hl\times w'\times\delta\times Ls5$$

$$Hfr3=Hr\times w'\times\delta\times Rs5 \quad \text{[Equation 1]}$$

Herein, $p_1$ may be about 0.5 (i.e., −6 dB), and $p_2$ may be about 0.707 (i.e., −3 dB). α and β may be values used for down-mixing the number of surround channels from 7 channels to 5 channels. For example, α or β may be one (i.e., 0 dB), 0.866 (i.e., −1.25 dB), or 0.707 (i.e., −3 dB). γ may be a value used to down-mix the number of height channels from 4 channels to 2 channels. For example, γ may be one of 0.866 or 0.707. δ may be a value used to down-mix the number of surround channels from 5 channels to 3 channels. δ may be one of 0.866 or 0.707. w' may be a value used for down-mixing from H2 (e.g., a height channel of the 5.1.2 channel layout or the 7.1.2 channel layout) to Hf2 (the height channel of the 3.1.2 channel layout).

Likewise, an audio signal generated by de-mixing may be expressed as in Equation 2. That is, de-mixing may be performed in a stepwise manner (an operation process of each equation corresponds to one de-mixing process) based on an operation using an equation in the form of a first-degree polynomial, without being limited to an operation using a de-mixing matrix, and each de-mixed audio signal may be generated.

$$R2=\frac{1}{p_1}\times\text{Mono}-L2 \quad \text{[Equation 2]}$$

$$L3=L2-p_2\times C$$

$$R3=R2-p_2\times C$$

$$Ls5=\frac{1}{\delta}\times(L3-L5)$$

$$Rs5=\frac{1}{\delta}\times(R3-R5)$$

$$Lb7=\frac{1}{\beta}\times(Ls5-\alpha\times Ls7)$$

$$Rb7=\frac{1}{\beta}\times(Rs5-\alpha\times Rs7)$$

$$Hl=Hfl3-w'\times(L3-L5)$$

$$Hr=Hfr3-w'\times(R3-R5)$$

$$Hbl=\frac{1}{\gamma}\times(Hl-Hfl)$$

$$Hbr=\frac{1}{\gamma}\times(Hr-Hfr)$$

w' may be a value used for down-mixing from H2 (e.g., the height channel of the 5.1.2 channel layout or the 7.1.2 channel layout) to Hf2 (the height channel of the 3.1.2 channel layout) or for de-mixing from Hf2 (the height channel of the 3.1.2 channel layout) to the H2 (e.g., the height channel of the 5.1.2 channel layout or the 7.1.2 channel layout).

A value of $sum_w$ and w' corresponding thereto may be updated according to w. w may be about −1 or 1, and may be transmitted for each frame.

For example, an initial value of $sum_w$ may be 0, and when w is 1 for each frame, the value of $sum_w$ may increase by 1, and when w is −1 for each frame, the value of $sum_w$ may decrease by 1. When the value of $sum_w$ increases or decreases by 1, the value of $sum_w$ may be maintained as 0 or 10 when the value is out of a range of 0-10. Table 5 showing a relationship between w' and $sum_w$ may be as below. That is, w' may be gradually updated for each frame and thus may be used for de-mixing from Hf2 to H2.

TABLE 5

| $sum_w$ | 0 | 1 | 2 | 3 | 4 | 5 |
|---|---|---|---|---|---|---|
| w' | 0 | 0.0179 | 0.0391 | 0.0658 | 0.1038 | 0.25 |
| $sum_w$ | 6 | 7 | 8 | 9 | 10 | |
| w' | 0.3962 | w'' | 0.4609 | 0.4821 | 0.5 | |

Without being limited thereto, de-mixing may be performed by integrating a plurality of de-mixing processes. For example, a signal of an Ls5 channel or an Rs5 channel de-mixed from 2 surround channels of L2 and R2 may be expressed as Equation 3 that arranges second to fifth equations of Equation 2.

$$Ls5 = \frac{1}{\delta} \times (L2 - p_2 \times C - L5)$$ [Equation 3]

$$Rs5 = \frac{1}{\delta} \times (R2 - p_2 \times C - R5)$$

A signal of an Hl channel or an Hr channel de-mixed from the 2 surround channels of L2 and R2 may be expressed as Equation 4 that arranges the second and third equations and eighth and ninth equations of Equation 2.

$$Hl = Hfl3 - w \times (L2 - p_2 \times C - L5)$$

$$Hr = Hfr3 - w \times (R2 - p_2 \times C - R5)$$ [Equation 4]

Figure 6B:
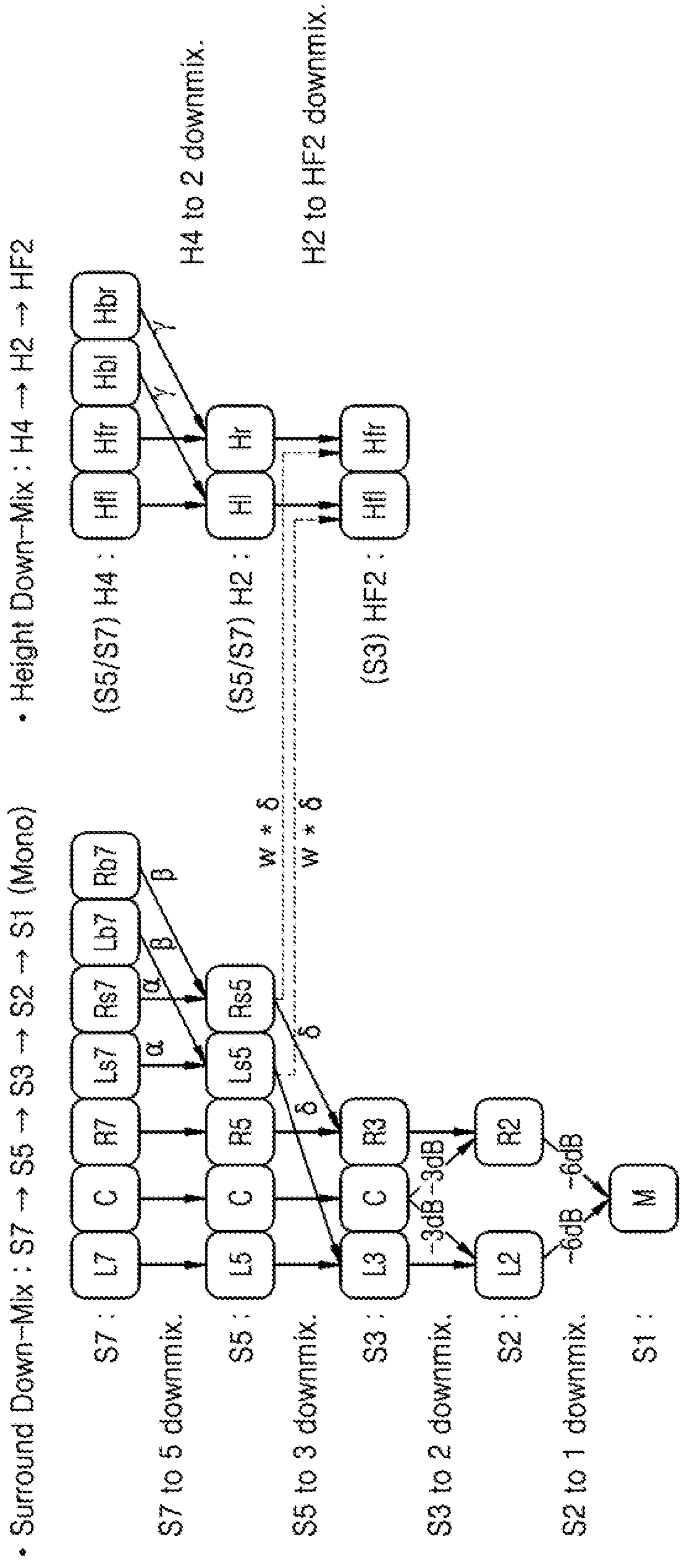
FIGS. 6B and 6C illustrate an example of a mechanism for stepwise down-mixing according to an embodiment.
Figure 6C:
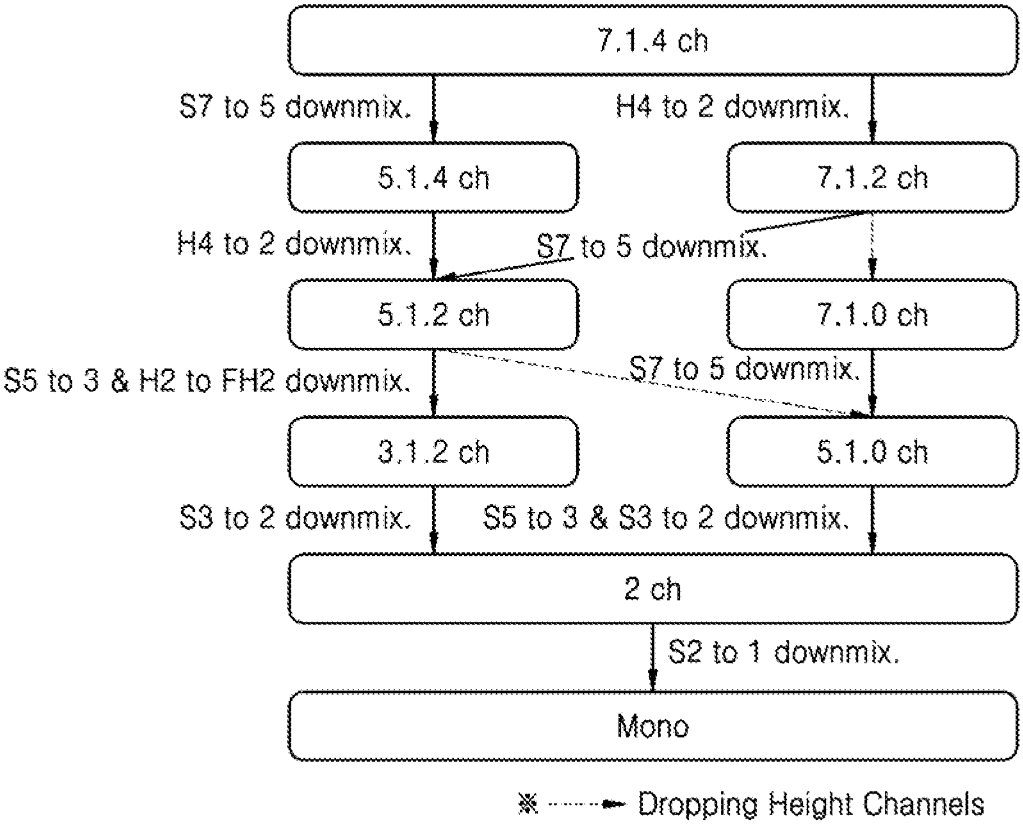

FIGS. 6B and 6C illustrate an example of a mechanism for stepwise down-mixing according to an embodiment. The stepwise down-mixing for the surround channel and the height channel may have a mechanism as shown, e.g., in FIGS. 6B and 6C.

Down-mixing-related information (or de-mixing-related information) may be index information indicating one of a plurality of modes based on combinations of preset 5 down-mixing weight parameters (or de-mixing weight parameters). For example, as shown in Table 6, down-mixing weight parameters corresponding to a plurality of modes may be previously determined.

TABLE 6

| Mode | Down-mixing weight parameter (α, β, γ, δ, w) (or de-mixing weight parameter) |
|---|---|
| 1 | (1, 1, 0.707, 0.707, −1) |
| 2 | (0.707, 0.707, 0.707, 0.707, −1) |
| 3 | (1, 0.866, 0.866, 0.866, −1) |
| 4 | (1, 1, 0.707, 0.707, 1) |
| 5 | (0.707, 0.707, 0.707, 0.707, 1) |
| 6 | (1, 0.866, 0.866, 0.866, 1) |

Hereinbelow, an audio encoding process and audio decoding process for performing down-mixing or de-mixing based on an audio scene type will be described with reference to FIGS. 7A to 18D. In addition, an audio encoding process and audio decoding process for performing down-mixing or de-mixing based on energy analysis of an audio signal of a height channel (e.g., a height channel audio signal) or the like will be described.

Hereinbelow, embodiments of the disclosure according to the technical spirit of the disclosure will be sequentially described in detail.

Figure 7A:
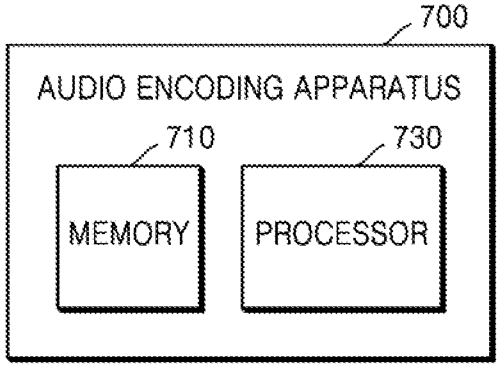
FIG. 7A is a block diagram of an audio encoding apparatus according to an embodiment.

FIG. 7A is a block diagram of an audio encoding apparatus according to an embodiment of the disclosure.

An audio encoding apparatus 700 may include a memory 710 and a processor 730. The audio encoding apparatus 700 may be implemented as an apparatus capable of performing audio processing such as a server, a TV, a camera, a cellular phone, a tablet PC, a laptop computer, etc.

While the memory 710 and the processor 730 are shown separately in FIG. 7A, the memory 710 and the processor 730 may be implemented through one hardware module (e.g., a chip).

The processor 730 may be implemented as a dedicated processor for audio processing based on a neural network. Alternatively, the processor 730 may be implemented through a combination of a general-purpose processor, such as an AP, a CPU, or a GPU, and software. The dedicated processor may include a memory for implementing an embodiment of the disclosure or a memory processor for using external memory.

The processor 730 may include a plurality of processors. In this case, the processor 330 may be implemented as a combination of dedicated processors, or may be implemented through a combination of software and a plurality of general-purpose processors such as an AP, a CPU, or a GPU.

The memory 710 may store one or more instructions for audio processing. In an embodiment of the disclosure, the memory 710 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 710. The neural network may be implemented by an external device (e.g., a server), and in this case, the audio encoding apparatus 700 may request and receive result information based on the neural network from the external device.

The processor 730 may sequentially process successive frames according to an instruction stored in the memory 710 and obtain successive encoded (compressed) frames. The successive frames may refer to frames that constitute audio.

The processor 730 may perform an audio processing operation with the original audio signal as an input and output a bitstream including a compressed audio signal. In this case, the original audio signal may be a multi-channel audio signal. The compressed audio signal may be a multi-channel audio signal having channels of a number less than or equal to the number of channels of the original audio signal. In this case, the bitstream may include a compressed audio signal of a base channel group, and furthermore, compressed audio signals of n dependent channel groups (n is an integer greater than or equal to 1). Thus, according to the number of dependent channel groups, the number of channels may be freely increased.

Figure 7B:
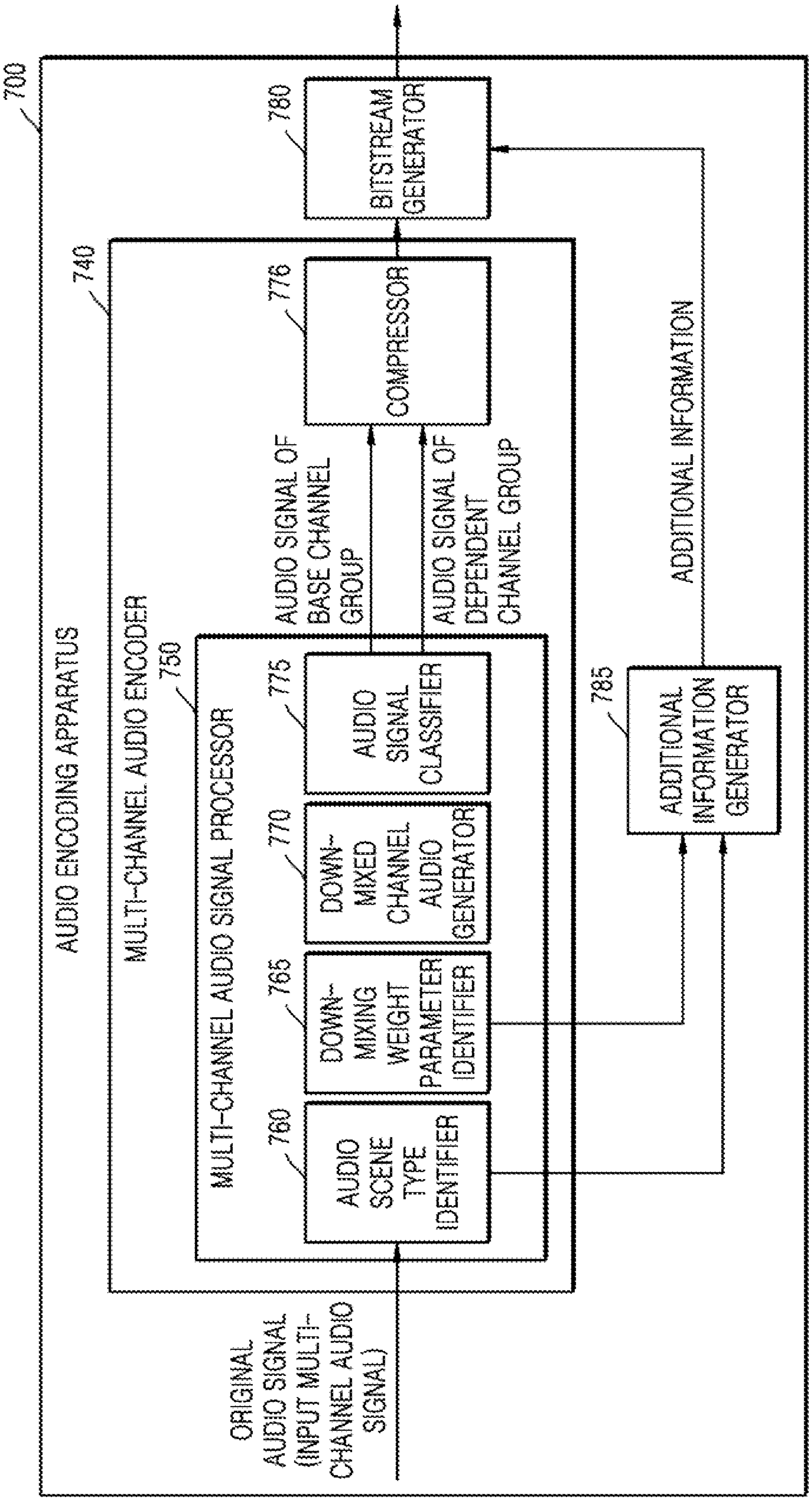
FIG. 7B is a block diagram of an audio encoding apparatus according to an embodiment.

FIG. 7B is a block diagram of an audio encoding apparatus according to an embodiment of the disclosure.

Referring to FIG. 2B, the audio encoding apparatus 700 may include a multi-channel audio encoder 740, a bitstream generator 780, and an additional information generator 785. The multi-channel audio encoder 740 may include a multi-channel audio signal processor 750 and a compressor 776.

Referring back to FIG. 7A, as described above, the audio encoding apparatus 700 may include the memory 710 and the processor 730, and an instruction for implementing the components 740, 750, 760, 765, 770, 775, 776, 780, and 785 of FIG. 1B may be stored in the memory 710 of FIG. 7A. The processor 730 may execute the instruction stored in the memory 710.

The multi-channel audio signal processor 750 may obtain (e.g., generate) at least one audio signal of a base channel group and at least one audio signal of at least one dependent channel group from the original audio signal.

The multi-channel audio signal processor 750 may include an audio scene type identifier 760, a down-mixing weight parameter identifier 765, a down-mixed channel audio generator 770, and an audio signal classifier 775.

The audio scene type identifier 760 may identify an audio scene type of the original audio signal. The audio scene type may be identified for each frame.

The audio scene type identifier 760 may down-sample the original audio signal and identify the audio scene type based on the down-sampled original audio signal.

The audio scene type identifier 760 may obtain an audio signal of a center channel from the original audio signal. The audio scene type identifier 760 may identify a dialogue type from the obtained audio signal of the center channel. In this case, the audio scene type identifier 760 may identify the dialogue type by using a first neural network for identifying the dialogue type. More specifically, when a probability value of the dialogue type identified by using the first neural network is greater than a predetermined first probability value for a first dialogue type, the audio scene type identifier 760 may identify the first dialogue type as the dialogue type.

When the probability of the dialogue type identified by using the first neural network is less than or equal to the predetermined first probability value for the first dialogue type, the audio scene type identifier 760 may identify a default type (e.g., a default dialogue type) as the dialogue type.

The audio scene type identifier 760 may identify a type of sound effect from the original audio signal based on an audio signal of a front channel (e.g., a front channel audio signal) and an audio signal of a side channel (e.g., a side channel audio signal).

The audio scene type identifier 760 may identify the type of sound effect by using a second neural network for identifying the sound effect type. More specifically, when a probability value of the sound effect type identified by using the second neural network is greater than a predetermined second probability value for a first sound effect type, the audio scene type identifier 760 may identify the sound effect type as the first sound effect type.

When the probability value of the sound effect type identified by using the second neural network is less than or equal to the predetermined second probability value for the first sound effect type, the audio scene type identifier 760 may identify the sound effect type as a default type (e.g., a default sound effect type).

The audio scene type identifier 760 may identify the audio scene type based on at least one of the identified dialogue type or the identified sound effect type. In other words, the audio scene type identifier 760 may identify one audio scene type among a plurality of audio scene types. A process for identifying an audio scene type will be described in detail below, with reference to FIG. 5.

The down-mixing weight parameter identifier 765 may identify a down-mix profile corresponding to an audio scene type. The down-mixing weight parameter identifier 765 may obtain a down-mixing weight parameter for (down)mixing from a first audio signal of at least one first channel to a second audio signal of a second channel according to the down-mix profile. A particular down-mixing weight parameter corresponding to a particular audio scene type may be previously determined.

The down-mixed channel audio generator 770 may down-mix the original audio signal based on the obtained down-mixing weight parameter. The down-mixed channel audio generator 770 may generate an audio signal of a predetermined channel layout as a result of the down-mixing.

The audio signal classifier 775 may generate at least one audio signal of a base channel group and at least one audio signal of a dependent channel group based on the audio signal of the predetermined channel layout.

The compressor 776 may compress the audio signal of the base channel group and the audio signal of the dependent channel group. That is, the compressor 776 may compress at least one audio signal of the base channel group to obtain at least one compressed audio signal of the base channel group. Herein, compression may mean compression based on various audio codecs. For example, compression may include transformation and quantization processes.

The compressor 776 may obtain at least one compressed audio signal of at least one dependent channel group by compressing at least one audio signal of at least one dependent channel group.

The additional information generator 785 may generate additional information including information about an audio scene type.

The bitstream generator 780 may generate a bitstream including the compressed audio signal of the base channel group and the compressed audio signal of the dependent channel group.

The bitstream generator 780 may generate a bitstream further including the additional information generated by the additional information generator 785.

More specifically, the bitstream generator 780 may generate a base audio stream and an auxiliary audio stream. The base audio stream may include the compressed audio signal of the base channel group, and the auxiliary audio stream may include the compressed audio signal of the dependent channel group.

In addition, the bitstream generator 780 may generate metadata including additional information. As a result, the bitstream generator 780 may generate a bitstream including the base audio stream, the auxiliary audio stream, and the metadata.

Figure 8:
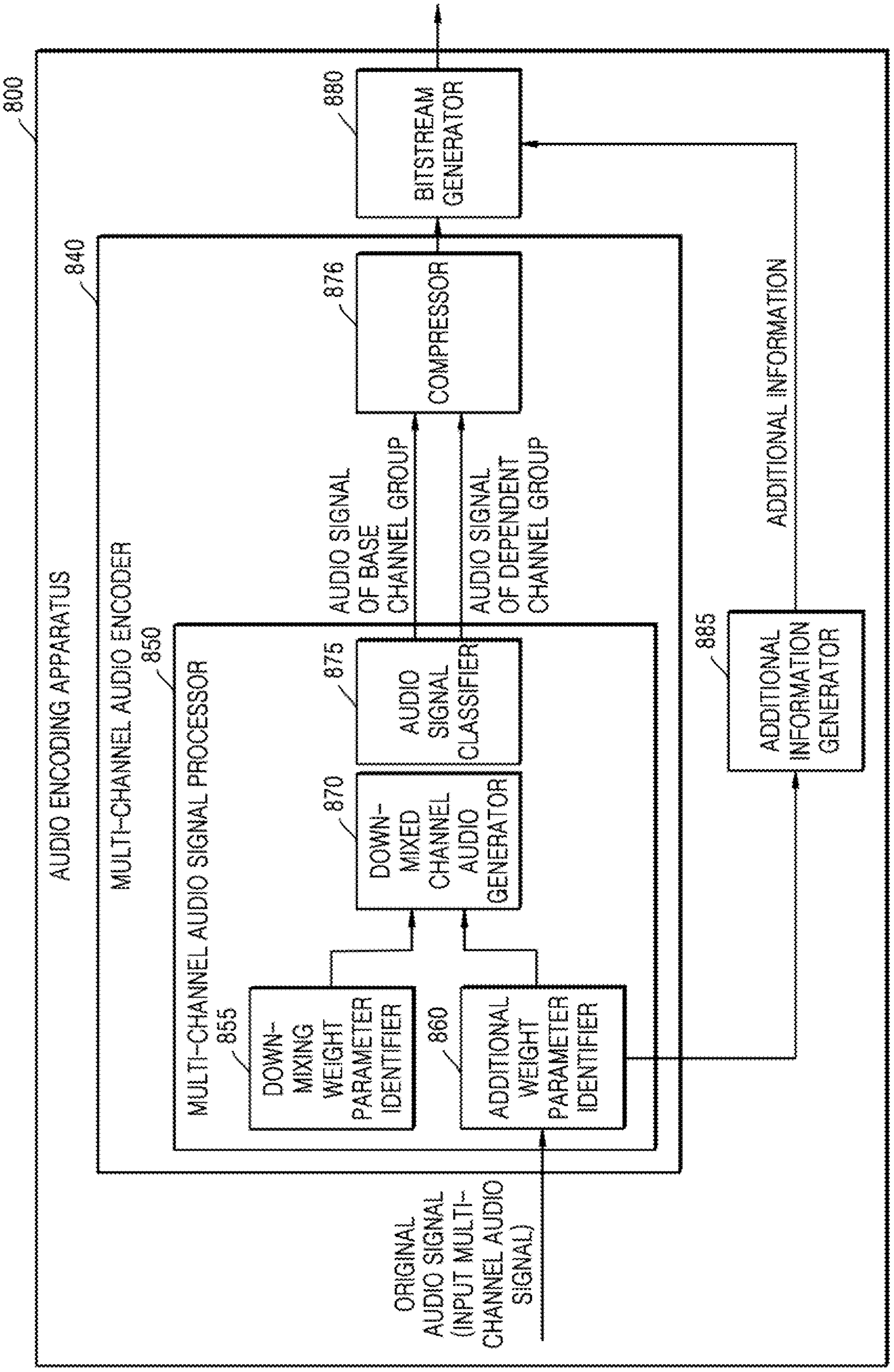
FIG. 8 is a block diagram of an audio encoding apparatus according to an embodiment.

FIG. 8 is a block diagram of an audio encoding apparatus according to an embodiment of the disclosure.

Referring to FIG. 8, an audio encoding apparatus 800 may include a multi-channel audio encoder 840, a bitstream generator 880, and an additional information generator 885.

A multi-channel audio signal processor 850 may include a down-mixing weight parameter identifier 855, an additional weight parameter identifier 860, a down-mixed channel audio generator 870, and an audio signal classifier 875.

The down-mixing weight parameter identifier 855 may identify a down-mixing weight parameter.

As in a down-mixing weight parameter identifier 765 described with reference to FIG. 7B, the down-mixing weight parameter identifier 855 may identify the down-mixing weight parameter based on an audio scene type. However, the example is not limited thereto, and the down-mixing weight parameter may be identified in various ways.

The additional weight parameter identifier 860 may identify an energy value of an audio signal of a height channel from the original audio signal. The additional weight parameter identifier 860 may identify an energy value of an audio signal of a surround channel from the original audio signal. Meanwhile, the additional weight parameter identifier 860 may determine a range of an additional weight or values of additional weight candidates (e.g., a first weight and an eighth weight) according to an audio scene type.

The additional weight parameter identifier 860 may identify an additional weight parameter for mixing from a surround channel to a height channel based on the identified energy value of the audio signal of the height channel and the identified energy value of the surround channel. The energy value of the surround channel may be a value of a moving average of a total power with respect to the surround channel. More specifically, the energy value of the surround channel may be a root mean square energy (RMSE) value based on a long-term time window. The energy value of the height channel may be a short-term time power value with respect to the height channel. More specifically, the energy value of the height channel may be an RMSE value based on a short-term time window. When the energy value of the height channel is greater than a predetermined first value or when a ratio of the energy value of the height channel to the energy value of the surround channel is greater than a predetermined second value, the additional weight parameter identifier 860 may identify the additional weight parameter as the first value. For example, the first value may be 0.

When the energy value of the height channel is less than or equal to the predetermined first value or when the ratio of the energy value of the height channel to the energy value of the surround channel is less than or equal to the predetermined second value, the additional weight parameter identifier 860 may identify the additional weight parameter as the second value. The second value may be 1, but is not limited thereto, and may be a value greater than the first value, such as 0.5.

The additional weight parameter identifier 860 may identify a weight level for at least one time section of the original audio signal based on a weight target ratio within the audio content of the audio signal. For example, when a target ratio of level 1 is 30%, a target ratio of level 2 is 60%, and a target ratio of level 3 is 10%, the additional weight parameter identifier 860 may identify the weight level for the at least one time section in accordance with the target ratios. In other words, the additional weight parameter identifier 860 may identify level 0 in the case of a time section of the early part of the content, identify level 1 in the case of a time section of the middle part of the content, and identify level 2 in the case of a time section of the latter part of the content. In this case, additional weight parameters corresponding to the respective levels may be identified. When a weight corresponding to each of the levels is a constant, a weight discontinuity may occur in a boundary section between the time sections.

The additional weight parameter identifier 860 may determine different weights in the boundary section between the time sections. More specifically, for a weight of a boundary section between a first time section and a second time section, the additional weight parameter identifier 860 may identify a value between a weight of the remaining section excluding the boundary section from the first time section and a weight of the remaining section excluding the boundary section from the second time section. In order to minimize the weight discontinuity in the boundary section, the additional weight parameter identifier 860 may identify a value between weights adjacent to the outside of the boundary section as the weight of the boundary section. For example, in a boundary section between the early part (level 0) and the middle part (level 1), a value of a level may be increased (e.g., increased by 0.1) for each sub-section, and a weight corresponding to the level (e.g., an output of a function based on the level) may be determined. In this case, a weight corresponding to a level between levels 0 and 1 may be a value between the weight of level 0 and the weight of level 1. As a result, the weight discontinuity may be minimized.

The down-mixed channel audio generator 870 may down-mix the original audio signal according to a predetermined channel layout, based on the obtained down-mixing weight parameter and the additional weight parameters. The down-mixed channel audio generator 870 may generate an audio signal of the predetermined channel layout as a result of the down-mixing.

The down-mixed channel audio generator 870 may generate an audio signal of the height channel based on the down-mixing weight parameter and additional weight parameter for mixing from the surround channel to the height channel. In this case, a final weight parameter for mixing from the surround channel to the height channel may be expressed as a result obtained by multiplying the down-mixing weight parameter by the additional weight parameter.

The additional information generator 885 may generate additional information including the additional weight parameter.

Figure 9A:
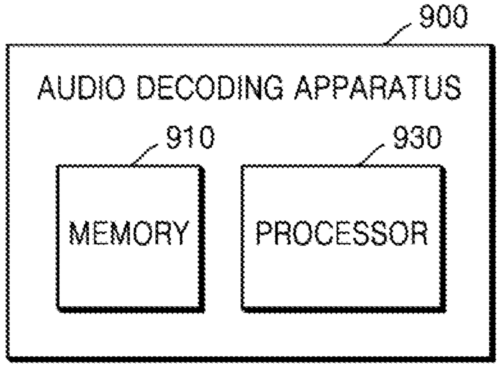
FIG. 9A is a block diagram of a structure of a multi-channel audio decoding apparatus according to an embodiment.

FIG. 9A is a block diagram of a structure of a multi-channel audio decoding apparatus according to an embodiment of the disclosure.

An audio decoding apparatus 900 may include a memory 910 and a processor 930. The audio decoding apparatus 900 may be implemented as a device capable of audio processing, such as a server, a TV, a camera, a mobile phone, a tablet PC, a laptop, and the like.

While the memory 910 and the processor 930 are shown separately in FIG. 9A, the memory 910 and the processor 930 may be implemented through one hardware module (e.g., a chip).

The processor 930 may be implemented as a dedicated processor for audio processing based on a neural network. Alternatively, the processor 930 may be implemented through a combination of a general-purpose processor, such as an AP, a CPU, or a GPU, and software. The dedicated processor may include a memory for implementing an embodiment of the disclosure or a memory processor for using external memory.

The processor 930 may include a plurality of processors. In this case, the processor 330 may be implemented as a combination of dedicated processors, or may be implemented through a combination of software and a plurality of general-purpose processors such as an AP, a CPU, or a GPU.

The memory 910 may store one or more instructions for audio processing. In an embodiment of the disclosure, the memory 910 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 910. The neural network may be implemented as an external apparatus (for example, a server). In this case, the audio decoding apparatus 900 may request neural network-based result information from the external apparatus and receive the neural network-based result information from the external apparatus.

The processor 930 may sequentially process successive frames according to an instruction stored in the memory 910 to obtain successive reconstructed frames. The successive frames may refer to frames that constitute audio.

The processor 930 may output a multi-channel audio signal by performing an audio processing operation on an input bitstream. The bitstream may be implemented in a scalable form to increase the number of channels from the base channel group. For example, the processor 930 may obtain a compressed audio signal of a base channel group from the bitstream, and may reconstruct an audio signal of the base channel group (for example, a stereo channel audio signal) by decompressing the compressed audio signal of the base channel group. Additionally, the processor 930 may reconstruct an audio signal of a dependent channel group by decompressing a compressed audio signal of the dependent channel group from the bitstream. The processor 930 may reconstruct a multi-channel audio signal based on the audio signal of the base channel group and the audio signal of the dependent channel group.

Meanwhile, the processor 930 may reconstruct an audio signal of a first dependent channel group by decompressing a compressed audio signal of the first dependent channel group from the bitstream. The processor 930 may reconstruct an audio signal of the second dependent channel group by decompressing a compressed audio signal of the second dependent channel group.

The processor 930 may reconstruct a multi-channel audio signal of an increased number of channels, based on the audio signal of the base channel group and the respective audio signals of the first and second dependent channel groups. Likewise, the processor 330 may decompress compressed audio signals of n dependent channel groups (where n is an integer greater than 2), and may reconstruct a multi-channel audio signal of a further increased number of channels based on the audio signal of the base channel group and the respective audio signals of the base channel group and the n dependent channel groups.

Figure 9B:
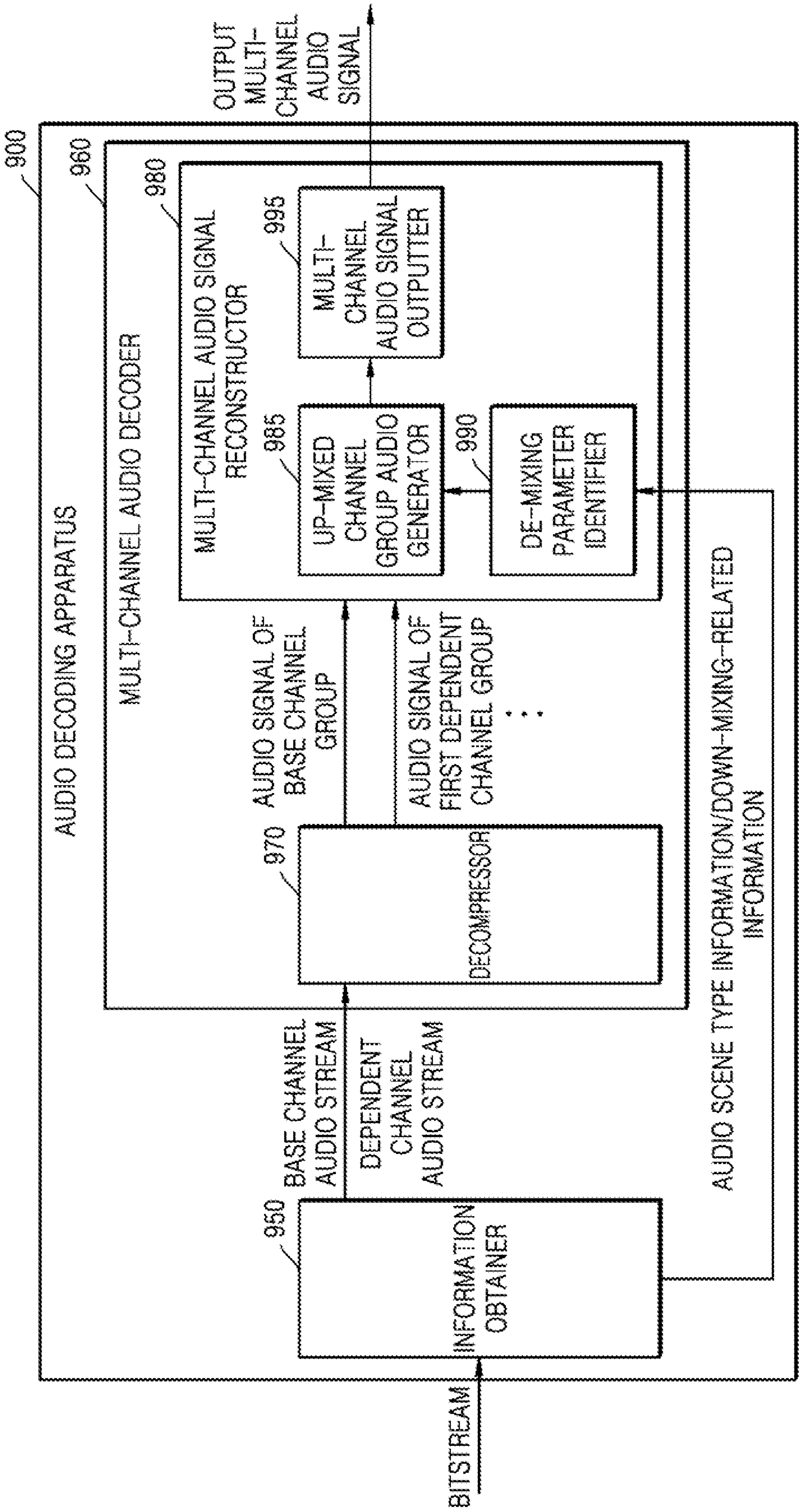
FIG. 9B is a block diagram of an audio decoding apparatus according to an embodiment.

FIG. 9B is a block diagram of a structure of an audio decoding apparatus according to an embodiment of the disclosure.

Referring to FIG. 9B, the audio decoding apparatus 900 includes an information obtainer 950 and a multi-channel audio decoder 960. The multi-channel audio decoder 960 includes a decompressor 970 and a multi-channel audio signal reconstructor 980.

The audio decoding apparatus 900 may include the memory 910 and the processor 930 of FIG. 9A, and an instruction for implementing each of the components 950, 960, 970, 980, 985, 990, and 995 of FIG. 9B may be stored in the memory 910. The processor 930 may execute the instruction stored in the memory 910.

The information obtainer 950 may obtain a base audio stream and at least one auxiliary audio stream from a bitstream. The base audio stream may include at least one compressed audio signal of the base channel group. The auxiliary audio stream may obtain at least one compressed audio signal of at least one dependent channel group.

The information obtainer 950 may obtain metadata from the bitstream. The metadata may include additional information. For example, the metadata may be information about an audio scene type for an original audio signal. The information about the audio scene type may be index information indicating one of audio scene content types. The information about the audio scene content type may be obtained for each frame, but may be periodically obtained for various data units. Alternatively, the information about the audio scene type may be non-periodically obtained every time when the scene is changed.

The decompressor 970 may obtain an audio signal of the base channel group included in the base audio stream by decompressing at least one compressed audio signal of the base channel group. The decompressor 970 may obtain at least one audio signal of the at least one dependent channel group included in the auxiliary audio stream from at least one compressed audio signal of the at least one dependent channel group.

The de-mixing parameter identifier 990 may identify a de-mixing weight parameter based on the information about the audio scene content type. That is, the de-mixing parameter identifier 990 may identify a de-mixing weight parameter corresponding to the audio scene content type. That is, the de-mixing parameter identifier 990 may identify one audio scene content type from among a plurality of audio scene content types based on index information about an audio scene type, and identify a de-mixing weight parameter corresponding to the identified audio scene content type. De-mixing weight parameters respectively corresponding to the plurality of audio scene content types may be determined previously and stored.

The up-mixed channel group audio generator 985 may generate an up-mixed channel group audio signal by de-mixing at least one audio signal of the base channel group and at least one audio signal of at least one dependent channel group. In this case, the up-mixed channel group audio signal may be a multi-channel audio signal.

The multi-channel audio signal outputter 995 may output at least one up-mixed channel group audio signal.

Figure 10:
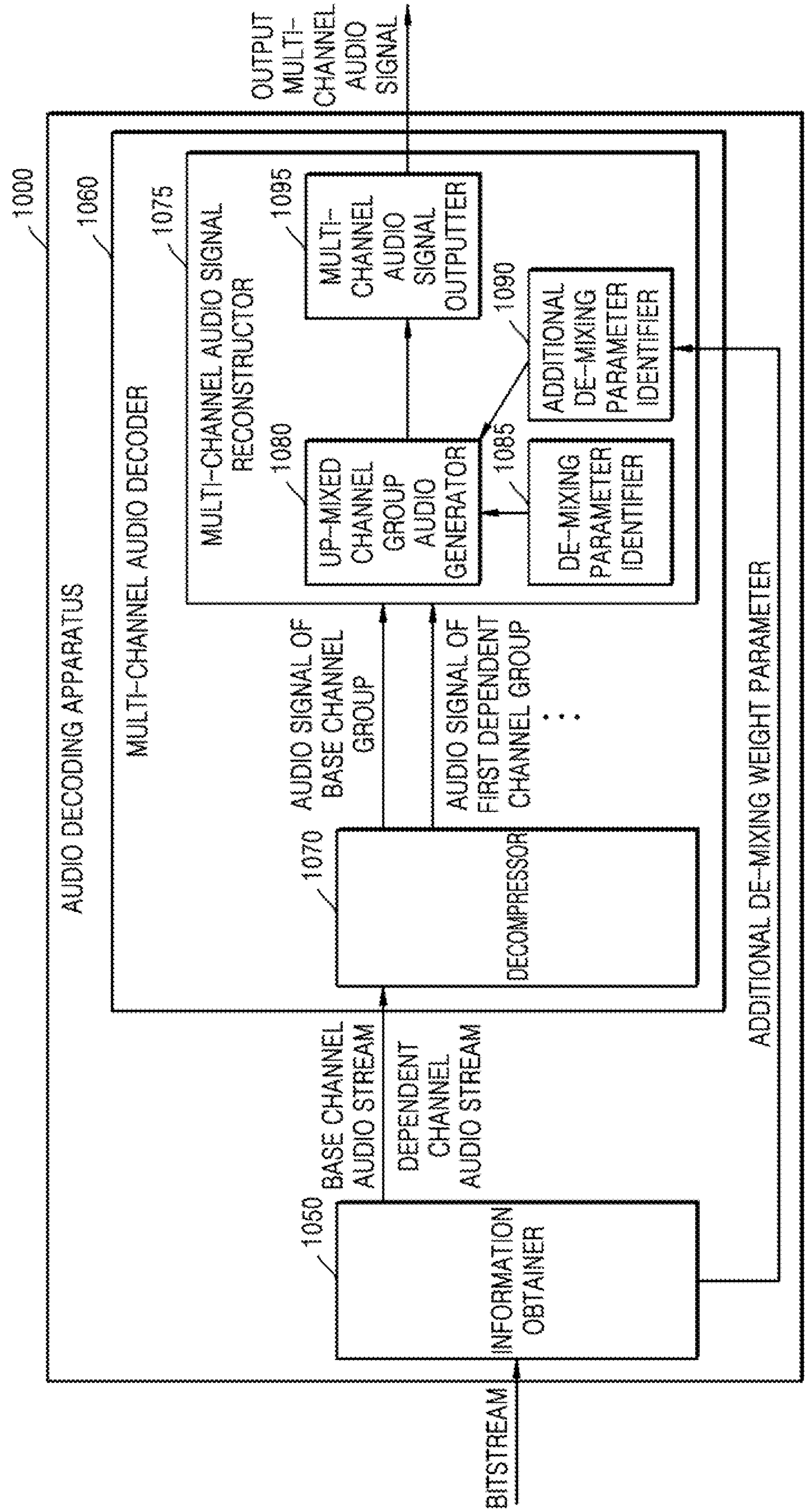
FIG. 10 is a block diagram of an audio decoding apparatus according to an embodiment.

FIG. 10 is a block diagram of a structure of an audio decoding apparatus according to an embodiment of the disclosure.

An audio decoding apparatus 1000 may include information obtainer 1050 and a multi-channel audio decoder 1060. The multi-channel audio decoder 1060 may include a decompressor 1070 and a multi-channel audio signal reconstructor 1075.

The information obtainer 1050, the decompressor 1070, and the multi-channel audio signal outputter 1095 of FIG. 10 may perform various operations of the information obtainer 950, the decompressor 970, and the multi-channel audio signal outputter 995 described above with reference to FIG. 9. Thus, the description of operations overlapping those of FIG. 9 will be omitted.

The information obtainer 1050 may obtain, from a bitstream, additional information including information about an additional de-mixing weight parameter.

An additional de-mixing parameter identifier 1090 may identify the additional de-mixing weight parameter based on the information about the additional de-mixing weight parameter. The additional de-mixing weight parameter may be a de-mixing weight parameter corresponding to a weight parameter for mixing from a surround channel to a height channel. That is, the additional de-mixing parameter identifier 1090 may identify a weight parameter for de-mixing from the height channel to the surround channel. However, the disclosure is not limited thereto, and the additional de-mixing parameter identifier 1090 may identify a range of the additional de-mixing weight parameter or a value of an additional de-mixing weight parameter candidate based on information about an audio scene type obtained from the bitstream. The additional de-mixing parameter identifier 1090 may identify the additional de-mixing weight parameter based on the range of the additional de-mixing weight parameter or the value of the additional de-mixing weight parameter candidate. In this case, the information about the additional de-mixing weight parameter may be used.

An up-mixed channel group audio generator 1080 may perform de-mixing on an audio signal according to the de-mixing weight parameter and the additional de-mixing weight parameter. The de-mixing may be performed on an audio signal of the base channel group and an audio signal of the dependent channel group. For example, the up-mixed channel group audio generator 1080 may perform de-mixing from the height channel to the surround channel according to the de-mixing weight parameter from the height channel to the surround channel and the additional weight parameter. In a case of de-mixing to the other channel, the up-mixed channel group audio generator 1080 may perform the de-mixing according to the de-mixing weight parameter without the additional weight parameter.

Figure 11:
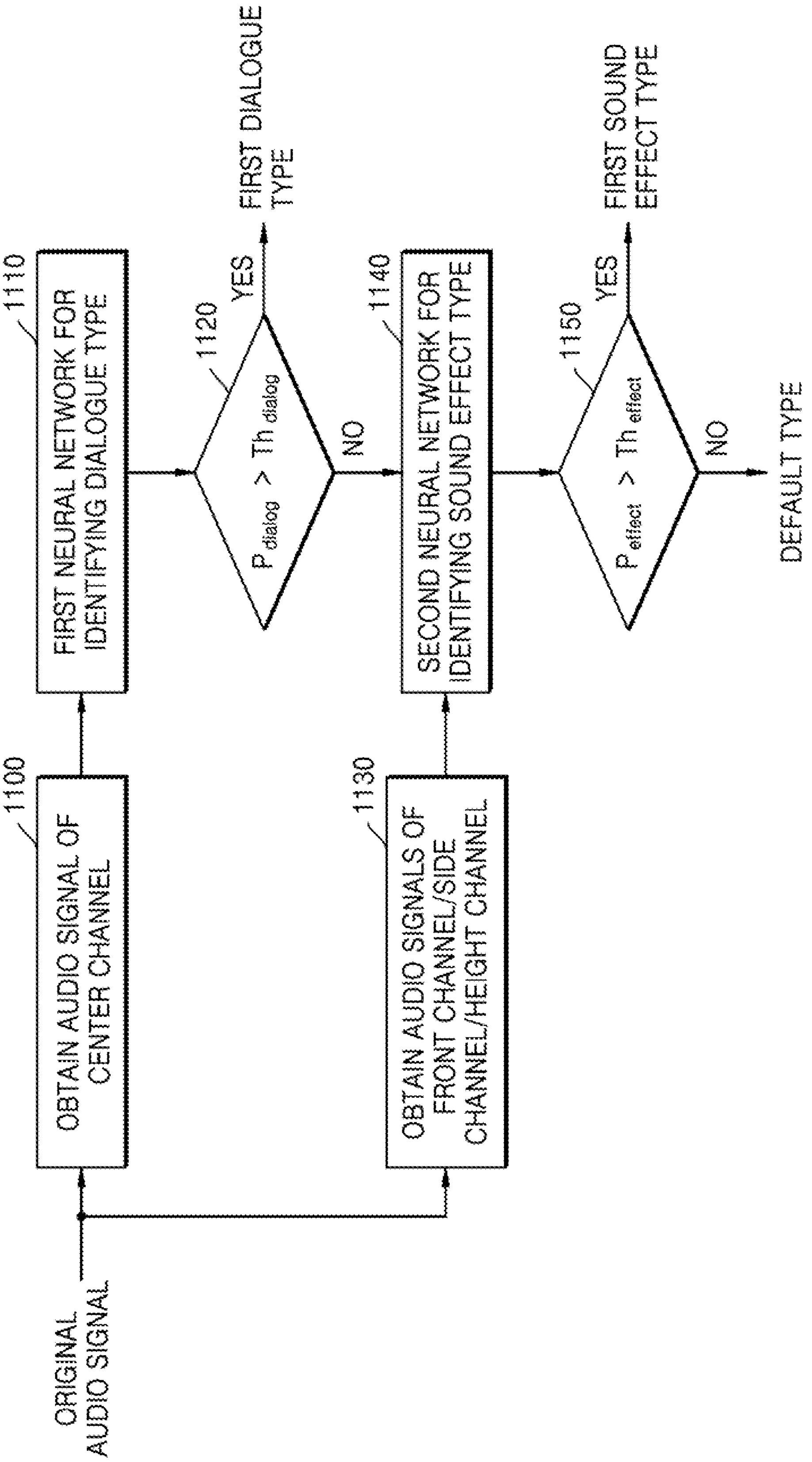
FIG. 11 is a view for describing, in detail, a process of identifying a type of audio scene content by an audio encoding apparatus, according to an embodiment.

FIG. 11 is a view for describing, in detail, a process for identifying an audio scene content type by an audio encoding apparatus 700, according to an embodiment of the disclosure.

Referring to FIG. 11, the audio encoding apparatus 700 may obtain (step 1100) an audio signal of a center channel from an original audio signal.

The audio encoding apparatus 700 may calculate a probability value of a class of at least one dialogue type by using a first neural network (step 1110) for identifying a dialogue type. The first neural network 1110 may identify an audio signal of the center channel as an input.

The audio encoding apparatus 700 may identify (step 1120) whether a probability value, $P_{dialog}$, of a class of a first dialogue type is greater than a threshold value, $Th_{dialog}$, of the first dialogue type.

When the probability value, $P_{dialog}$, of the first dialogue type class is greater than the threshold value, $Th_{dialog}$, of the first dialogue type class, the audio encoding apparatus 700 may identify the first dialogue type as the dialogue type.

When the probability value, $P_{dialog}$, of the class of the first dialogue type is less than or equal to the threshold value, $Th_{dialog}$, of the first dialogue type class, the audio encoding apparatus 700 may identify a sound effect type. However, the disclosure is not limited thereto, and the audio encoding apparatus 700 may compare probability values of the respective classes with threshold values of the respective classes and identify at least one dialogue type, for a plurality of dialogue type classes. In this case, according to priority, one dialogue type may be identified, or a dialogue type of the highest probability value may be identified. When a dialogue does not correspond to any of the plurality of dialogue types (that is, when the dialogue is of a default type), the audio encoding apparatus 700 may then identify a sound effect type.

Hereinbelow, a process in which the audio encoding apparatus 700 identifies a sound effect type will be described.

The audio encoding apparatus 700 may obtain (step 1130) an audio signal of a front channel and an audio signal of a side channel from the original audio signal.

The audio encoding apparatus 700 may calculate a probability value of a class of at least one sound effect type by using a second neural network (step 1140) for identifying a sound effect type. The second neural network 1140 may receive the audio signal of the front channel and the audio signal of the side channel as an input. The sound effect may be included in audio content such as games or movies, and may be a sound which is directional or moves in a space.

The audio encoding apparatus 700 may identify (step 1150) whether a probability value, $P_{effect}$, of a class of a first sound effect type is greater than a threshold value, $Th_{effect}$, of the first sound effect type.

When the probability value, $P_{effect}$, of the class of the first sound effect type is greater than the threshold value, $Th_{effect}$, of the first sound effect type, the audio encoding apparatus 700 may identify the first sound effect type as the sound effect type.

When the probability value, $P_{effect}$, of the class of the first sound effect type is less than or equal to the threshold value, $Th_{effect}$, of the first sound effect type, the audio encoding apparatus 700 may identify a default type. However, the disclosure is not limited thereto, and the audio encoding apparatus 700 may compare probability values of the respective classes with threshold values of the respective classes and identify at least one sound effect type for a plurality of sound effect type classes (e.g., a class of the first sound effect type, a class of a second effect type, . . . , and a class of an $n^{th}$ sound effect type).

In this case, according to priority, one sound effect type may be identified, or a sound effect type of the highest probability value may be identified. When the sound effect does not correspond to any of the plurality of sound effect types, the audio encoding apparatus 700 may identify a default type.

However, the disclosure is not limited thereto, and various audio scene types, such as a music type and a sport/crowd type, in addition to the dialogue type and the sound effect type, may be identified. The music type may be a type of audio scene that has a balanced sound between audio channels. The sport/crowd type may be a type of audio scene which shows an atmosphere in which many people are cheering, or has a clear commentary sound. Herein, the default type may be a type identified when no particular audio scene type is identified. The various audio scene types may be identified by using a separate neural network. A neural network for identifying each audio scene type may be separately trained.

In FIG. 11, a dialogue type is first identified, and then, a sound effect type is identified. However, the disclosure is not limited thereto, and the sound effect type may be first identified, and then, the dialogue type may be identified. When another audio scene type exists, types of the respective audio scene types may be identified according to priorities among the audio scene types.

Figure 12:
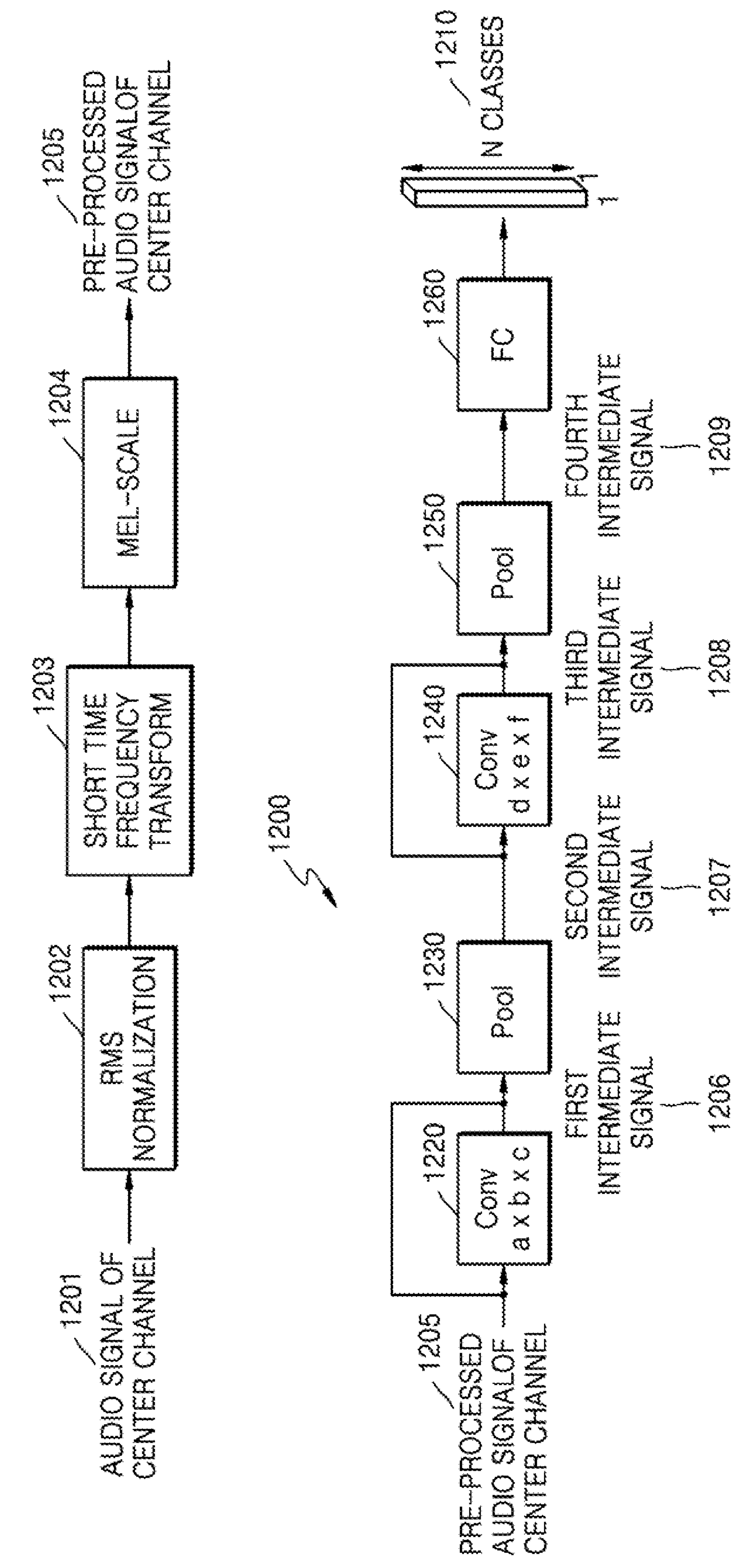
FIG. 12 is a view for describing a first deep neural network (DNN) for identifying a dialogue type, according to an embodiment.

FIG. 12 is a view for describing a first deep neural network (DNN) 1200 for identifying a dialogue type, according to an embodiment of the disclosure.

The first DNN 1200 may include at least one convolutional layer, a pooling layer, and a fully-connected layer. The convolutional layer obtains feature data by processing input data by using a filter having a predefined size. Parameters of the filter of the convolutional layer may be optimized through a training process to be described below. The pooling layer may be a layer for selecting and outputting only feature values of some samples from among feature values of all samples of the feature data, to reduce a size of input data. The pooling layer may include a max pooling layer and an average pooling layer. The fully-connected layer, in which each neuron of one layer is connected to every neuron of the next layer, is a layer for classifying features.

Referring to FIG. 12, a pre-processing (steps 1202-1204) is performed on an audio signal 1201 of a center channel, and then, the pre-processed audio signal 1205 of the center channel is input to the first DNN 1200.

First, an RMS normalization (step 1202) is performed on the audio signal 1201 of the center channel. Because energy differs for each sound source, energy values of an audio signal may be normalized according to a particular standard. When the number of samples is N, the audio signal 1201 of the center channel may be a one-dimensional signal of N×1 size. For example, the audio signal 1201 of the center channel may be a one-dimensional signal of 8640×1 size. To reduce an amount of calculation, the audio signal 1201 of the center channel may be down-sampled, and then, the RMS normalization (step 1202) may be performed thereon.

Next, a short time frequency transform (step 1203) is performed on the audio signal on which the RMS normalization is performed. A one-dimensional input signal in units of time is output as a two-dimensional signal in units of time and frequency. The two-dimensional signal in units of time and frequency may be a two-dimensional signal of X×Y×1 size. For example, the audio signal of the center channel on which the short time frequency transform is performed may be a two-dimensional signal of 68×127×1 size.

An output signal obtained by performing a short time frequency transform is a complex number signal (a+jb)

having a real number part and an imaginary number part. Because it is difficult to use the complex number as it is, an absolute value (root($a^2$+$b^2$)) of the complex number signal may be used.

A Mel-scale (step 1204) is performed on the two-dimensional signal in units of time and frequency. The Mel-scale, which is a scale that considers characteristics of humans being cognitively sensitive to changes in low-frequency signals and relatively less sensitive to changes to high-frequency signals, refers to an operation of rescaling the data on a frequency axis so that data of a signal that humans perceive as cognitively more sensitive is more precisely emphasized. As a result, the output two-dimensional signal may be a two-dimensional signal of X×Y"×1 size with reduced frequency-axis data. For example, the Mel-scaled audio signal of the center channel may be a two-dimensional signal of 68×68×1 size.

Referring to FIG. 12, a pre-processing is performed on the audio signal 1201 of the center channel, and then, the pre-processed audio signal is input to the first DNN 1200.

Referring to FIG. 12, the pre-processed signal 1205 of the center channel is input to the first DNN 1200. The pre-processed audio signal 1205 of the center channel includes samples that are divided by time and frequency. That is, the pre-processed audio signal 1205 of the center channel may be two-dimensional data of the samples. Each of the samples of the pre-processed audio signal 1205 of the center channel has a feature value of a specific frequency at a specific time.

A first convolutional layer 1220, which includes c filters of a×b size, processes the pre-processed audio signal 1205 of the center channel. For example, as a result of the processing of the first convolutional layer 1220, a first intermediate signal 1206 of (68, 68, c) size may be obtained. In this case, the first convolutional layer 1220 may include a plurality of convolutional layers, and an input of a first layer and an output of a second layer may be connected to each other for training. The first layer and the second layer may be the same layer. However, the disclosure is not limited thereto, and the second layer may be a subsequent layer of the first layer. When the second layer is a subsequent layer of the first layer, an activation function of the first layer may be Rectified Linear Unit (ReLU).

Pooling may be performed on the first intermediate signal 1206 by using a first pooling layer 1230. For example, as a result of the processing by the pooling layer 1230, a second intermediate layer 1207 of (34, 34, c) size may be obtained.

A second convolutional layer 1240 processes a signal input with f filters of d×e size. As a result of the processing by the second convolutional layer 1240, a third intermediate layer 1208 of (17, 17, f) size may be obtained.

Pooling may be performed on the third intermediate layer 1208 by using a second pooling layer 1250. For example, as a result of the processing of the pooling layer 1250, a fourth intermediate layer 1209 of (9, 9, f) size may be obtained.

A first fully-connected layer 1260 may output a one-dimensional feature signal by classifying input feature signals. As a result of the processing by the first fully-connected layer 1260, an audio feature signal 1210 of (1, 1, N) size may be obtained. Here, N may mean the number of classes. The classes may correspond to the respective dialogue types.

The first DNN 1200 according to an embodiment of the disclosure obtains an audio feature signal 1210 (e.g., a probability signal) from the audio signal, 1201, of the center channel.

In FIG. 12, the first DNN 1200 includes two convolutional layers, two pooling layers, and one fully-connected layer. However, this is only an example, and the number of convolutional layers, the number of pooling layers, and the number of fully-connected layers included in the first DNN 1200 may be variously modified, as long as the audio feature signal 1210 of N classes may be obtained from the audio signal 1201 of the center channel. Likewise, the number and size of filters used in each convolutional layer may be variously modified, and the connection and method of connection of each layer may also be variously modified.

Figure 13:
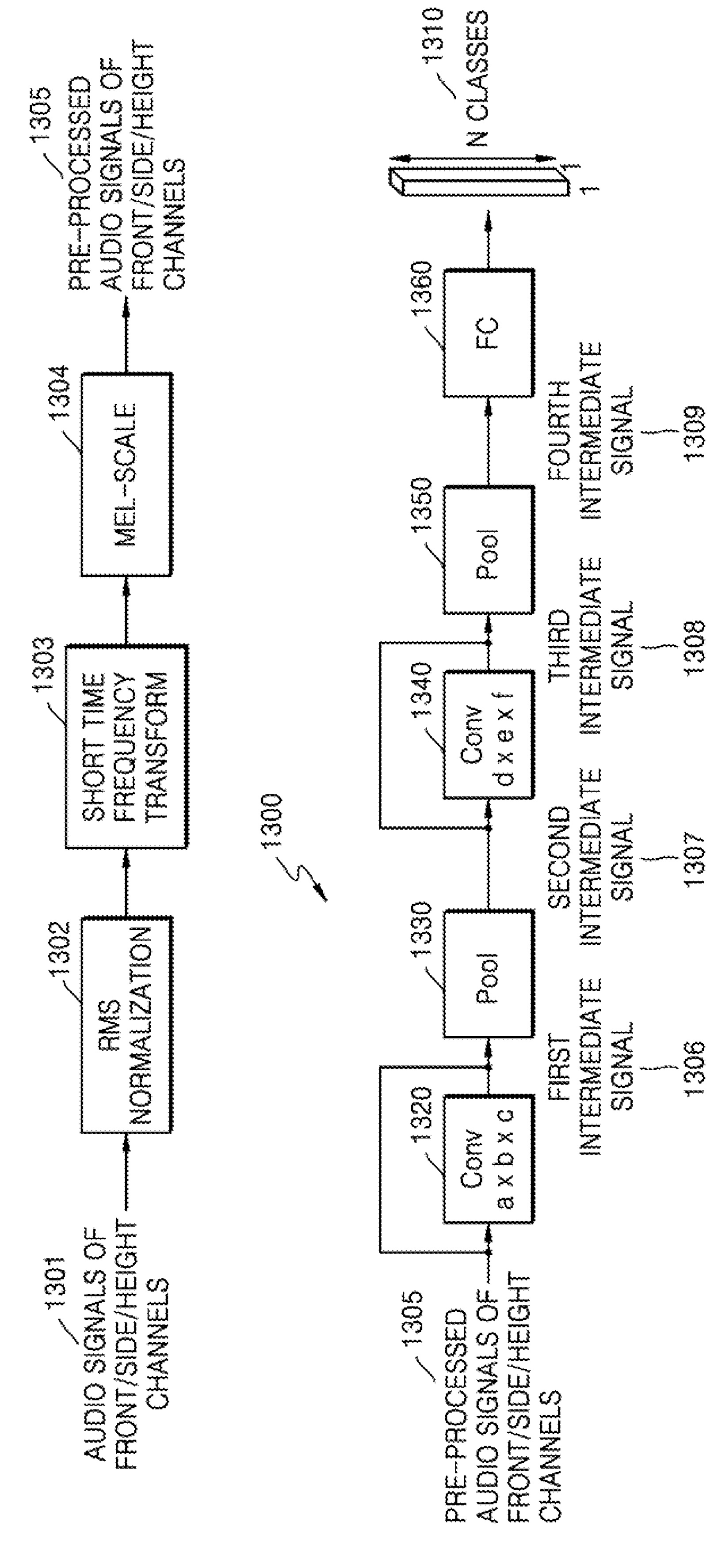
FIG. 13 is a view for describing a second DNN for identifying a type of sound effect, according to an embodiment.

FIG. 13 is a view for describing a second DNN 1300 for identifying a sound effect type, according to an embodiment of the disclosure.

The second DNN 1300 may include at least one convolutional layer, a pooling layer, and a fully-connected layer. The convolutional layer obtains feature data by processing input data with a filter of predefined size. Parameters of the filter of the convolutional layer may be optimized through a training process to be described below. The pooling layer, which is a layer for selecting and outputting feature values of only some samples from among feature values of all samples of the feature data, to reduce a size of input data, may include a max pooling layer and an average pooling layer. The fully-connected layer, in which each neuron of one layer is connected to each neuron of the next layer, is a layer for classifying features.

Referring to FIG. 13, a pre-processing (steps 1302-1304) is performed on an audio signal 1301 of front/side/height channels, and then, the pre-processed audio signal is input to the second DNN 1300. A pre-processing process for the audio signal 1301 of the front/side/height channels is similar to that of FIG. 12, and thus, detailed descriptions thereof will be omitted.

Referring to FIG. 13, the pre-processed audio signal 1305 of the front/side/height channels is input to the second DNN 1300. The pre-processed audio signal 1301 of the front/side/height channels includes samples divided by channel, time, and frequency. That is, the pre-processed audio signal 1305 of the front/side/height channel may be three-dimensional data of the samples. Each of the samples of the pre-processed audio signal 1305 of the front/side/height channels has a feature value of a specific frequency at a specific time.

A first convolutional layer 1320 includes c filters of a×b size and processes the pre-processed audio signal 1305 of the center channel. For example, as a result of the processing by the first convolutional layer 1320, a first intermediate signal 1306 of (68, 68, c) size may be obtained. In this case, the first convolutional layer 1320 may include a plurality of convolutional layers, and an input of a first layer and an output of a second layer may be connected to each other for training. The first layer and the second layer may be the same layer, but are not limited thereto, and the second layer may be a subsequent layer of the first layer. When the second layer is a subsequent layer of the first layer, an activation function of the first layer may be Rectified Linear Unit (ReLU).

Pooling may be performed on the first intermediate signal 1306 by using a first pooling layer 1330. For example, as a result of the processing by the pooling layer 1330, a second intermediate layer 1307 of (34, 34, c) size may be obtained.

A second convolutional layer 1340 processes a signal which is input with f filters of d×e size. As a result of the processing by the second convolutional layer 1340, a third intermediate layer 1308 of (17, 17, f) size may be obtained.

Pooling may be performed on the third intermediate layer 1308 by using a second pooling layer 1350. For example, as a result of the processing by the pooling layer 1350, a fourth intermediate layer 1309 of (9, 9, f) size may be obtained.

A first fully-connected layer 1360 may output a one-dimensional feature signal by classifying feature signals that are input. As a result of the processing by the first fully-connected layer 1360, an audio feature signal 1310 of (1, 1, N) size may be obtained. Here, N may mean the number of classes. The classes may correspond to the respective sound effect types.

The second DNN 1300 according to an embodiment of the disclosure obtains an audio feature signal 1310 (e.g., a probability signal) from the audio signal 1301 of the front/side/height channels.

In FIG. 13, the second DNN 1300 includes two convolutional layers, two pooling layers, and one fully-connected layer. However, this is only an example, and the number of convolutional layers, the number of pooling layers, the number of fully-connected layers included in the second DNN 1300 may be variously modified, as long as the audio feature signal 1310 of N classes may be obtained from the audio signal 1301 of the front/side/height channels. Likewise, the number and size of filters used in each convolutional layer may be variously modified, and the connection and method of connection between each layer may also be variously modified.

Figure 14:
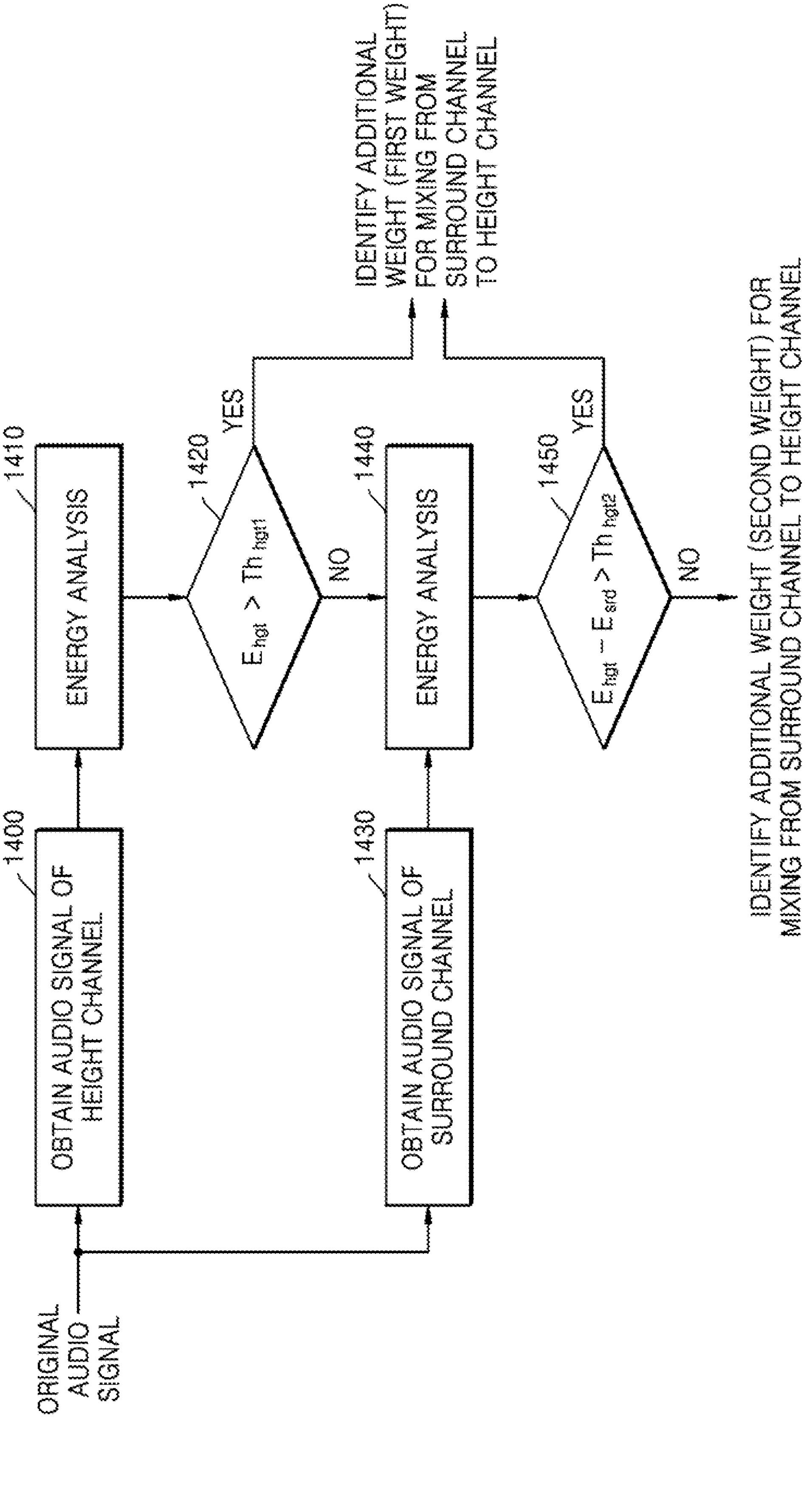
FIG. 14 is a view for describing, in detail, a process of identifying, by an audio encoding apparatus, an additional de-mixing parameter weight for mixing from a surround channel to a height channel, according to an embodiment.

FIG. 14 is a view for describing, in detail, a process for identifying an additional de-mixing parameter weight for mixing from a surround channel to a height channel by an audio encoding apparatus 800, according to an embodiment of the disclosure.

Referring to FIG. 14, the audio encoding apparatus 800 may obtain (step 1400) an audio signal of a height channel from an original audio signal. The audio encoding apparatus 800 may perform energy analysis (step 1410) on the audio signal of the height channel.

The energy analysis (step 1410) may be performed by using a neural network for energy analysis. In this case, an additional weight (a first weight) for mixing from the surround channel to the height channel may be identified by using the neural network for energy analysis, based on the audio signal of the height channel.

The audio encoding apparatus 800 may identify (step 1420) whether a power value $E_{hgt}$ of the audio signal of the height channel is greater than a threshold value $Th_{hgt1}$. In this case, the power value is an RMS value of the signal and may be a power value for a short period of time (an average power value for a short-term time window).

When it is identified that $E_{hgt}$ is greater than the threshold value $Th_{hgt1}$, the audio encoding apparatus 800 may identify an additional weight (a first weight) for mixing from the surround channel to the height channel. For example, the first weight may be 0, but is not limited thereto, and the first weight may be a value less than 1.

When the power value, $E_{hgt}$, of the audio signal of the height channel is less than or equal to the threshold value $Th_{hgt1}$, the audio encoding apparatus 800 may perform energy analysis (step 1440) on the audio signal of the surround channel. The energy analysis (step 1440) may be performed by using a neural network for energy analysis.

In this case, an additional weight (a first weight or a second weight) for mixing from the surround channel to the height channel may be identified by using the neural network for energy analysis, based on the audio signal of the height channel and the audio signal of the surround channel.

The audio encoding apparatus 800 may obtain (step 1430) the audio signal of the surround channel from an original audio signal. The audio encoding apparatus 800 may perform energy analysis (step 1440) on the audio signal of the surround channel.

The audio encoding apparatus 800 may identify (step 1450) whether a difference between the power value, $E_{hgt}$, of the audio signal of the height channel and the power value, $E_{srd}$, of the audio signal of the surround channel is greater than a threshold value $Th_{hgt2}$. In this case, the power value $E_{srd}$, which is an RMS value, may be a moving average value of a total power (an average power value for a long-term time window).

When the difference between the power value, $E_{hgt}$, of the audio signal of the height channel and the power value, $E_{srd}$, of the audio signal of the surround channel is greater than the threshold value $Th_{hgt2}$, the audio encoding apparatus 800 may identify an additional weight (the first weight) for mixing from the surround channel to the height channel.

When the difference between the power value, $E_{hgt}$, of the audio signal of the height channel and the power value, $E_{srd}$, of the audio signal of the surround channel is less than or equal to the threshold value $Th_{hgt2}$, the audio encoding apparatus 800 may identify an additional weight (a second weight) for mixing from the surround channel to the height channel. In this case, the second weight has a value greater than 0, and may have a value greater than the first weight. For example, the second weight may be one of 0.5, 0.75, and 1.

Above, the audio encoding apparatus 800 performs an operation of comparing the difference between the power value, $E_{hgt}$ of the audio signal of the height channel and the power value, $E_{srd}$, of the audio signal of the surround channel with the threshold value $Th_{hgt2}$. However, the disclosure is not limited thereto, and the operation may be replaced with an operation of comparing a ratio of the power value, $E_{hgt}$, of the audio signal of the height channel to the power value, $E_{srd}$, of the audio signal of the surround channel with the threshold value.

Figure 15:
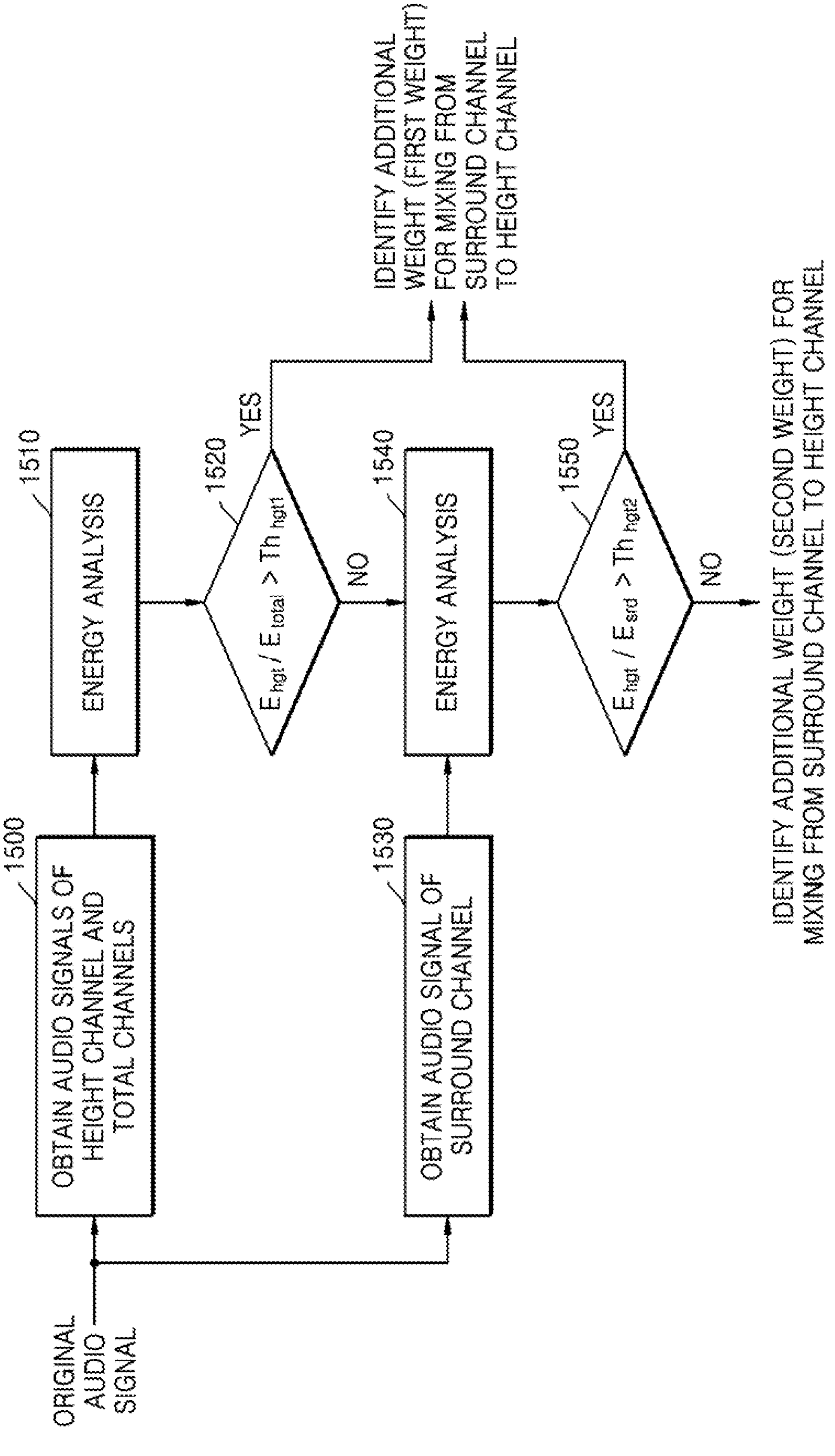
FIG. 15 is a view for describing, in detail, a process for identifying, by an audio encoding apparatus, an additional de-mixing parameter weight for mixing from a surround channel to a height channel, according to an embodiment.

FIG. 15 is a view for describing, in detail, a process for identifying, by an audio encoding apparatus 800, an additional de-mixing parameter weight for mixing from a surround channel to a height channel, according to an embodiment of the disclosure.

Referring to FIG. 15, the audio encoding apparatus 800 may obtain (step 1500) an audio signal of the height channel and an audio signal of total channels, from an original audio signal.

The audio encoding apparatus 800 may obtain a power value $E_{hgt}$ by performing energy analysis (step 1510) on the audio signal of the height channel. In addition, the audio encoding apparatus 800 may obtain a power value $E_{total}$ by performing the energy analysis (step 1510) on an audio signal of the total channels. Herein, the power value $E_{hgt}$ may be an average power value (an RMS value) for a short-term time window, and $E_{total}$ may be an average power value (an RMS value) for a long-term time window.

The audio encoding apparatus 800 may identify (step 1520) whether a ratio ($E_{hgt}/E_{total}$) of the power value, $E_{hgt}$, of the audio signal of the height channel to the power value, $E_{total}$, of the audio signal of the total channels is greater than the threshold value $Th_{hgt1}$.

When it is identified that the ratio ($E_{hgt}$ $E_{total}$) of the power value, $E_{hgt}$, of the audio signal of the height channel to the power value, $E_{total}$, of the audio signal of the total channels is greater than the threshold value $Th_{hgt1}$, the audio encoding apparatus 800 may identify an additional weight (a first weight) for mixing from the surround channel to the height channel. For example, the first weight may be 0, but is not limited thereto, and may be less than 1.

When it is identified that the ratio ($E_{hgt}$ $E_{total}$) of the power value, $E_{hgt}$, of the audio signal of the height channel to the power value, $E_{total}$, of the audio signal of the total channels is less than or equal to the threshold value $Th_{hgt1}$, the audio encoding apparatus 800 may perform energy analysis (step 1540) on the audio signal of the surround channel. The energy analysis 1540 may be performed by using a neural network for energy analysis.

The audio encoding apparatus 800 may obtain (step 1530) an audio signal of the surround channel from an original audio signal. The audio encoding apparatus 800 may perform energy analysis (step 1540) on the audio signal of the surround channel.

The audio encoding apparatus 800 may identify (step 1550) whether a ratio ($E_{hgt}$ $E_{srd}$) of the power value, $E_{hgt}$, of the audio signal of the height channel to the power value, $E_{srd}$, of the audio signal of the surround channel is greater than the threshold value $Th_{hgt2}$. In this case, the power value $E_{srd}$ is an RMS value and may be a moving average value of a total power (an average value for a long-term time window).

When the ratio ($E_{hgt}/E_{srd}$) of the power value, $E_{hgt}$, of the audio signal of the height channel to the power value, $E_{srd}$, of the audio signal of the surround channel is greater than the threshold value $Th_{hgt2}$, the audio encoding apparatus 800 may identify an additional weight (a first weight) for mixing from the surround channel to the height channel.

When the ratio ($E_{hgt}/E_{srd}$) of the power value, $E_{hgt}$, of the audio signal of the height channel to the power value, $E_{srd}$, of the audio signal of the surround channel is less than or equal to the threshold value $Th_{hgt2}$, the audio encoding apparatus 800 may identify an additional weight (a second weight) for mixing from the surround channel to the height channel. In this case, the second weight may be greater than 0, and may be greater than the first weight.

Above, the audio encoding apparatus 800 performs an operation of comparing the ratio of the power value, $E_{hgt}$, of the audio signal of the height channel to the power value, $E_{total}$, of the audio signal of the total channels with the threshold value $Th_{hgt1}$, and an operation of comparing the power value, $E_{hgt}$, of the audio signal of the height channel to the power value, $E_{srd}$, of the audio signal of the surround channel with the threshold value $Th_{hgt2}$. However, the disclosure is not limited thereto, and the operations may be replaced with an operation of comparing a difference in power value, instead of a ratio of power values, with a threshold value.

Figure 16:
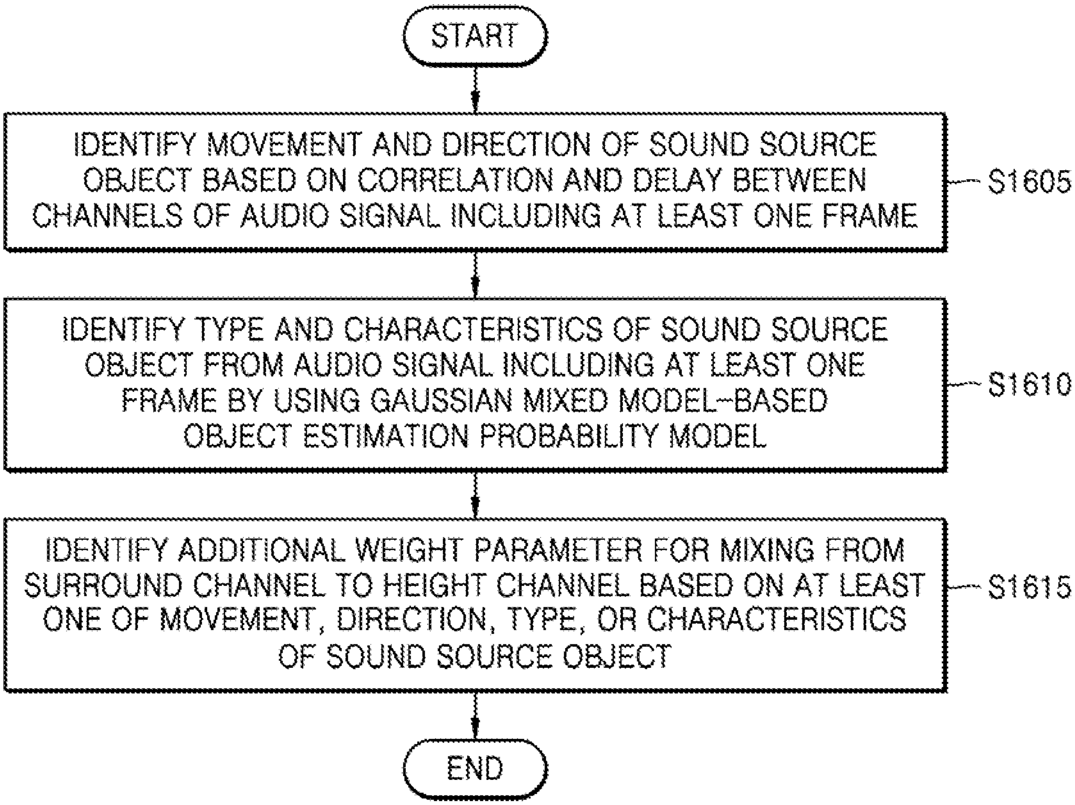
FIG. 16 is a flowchart of an audio processing method according to an embodiment.

FIG. 16 is a flowchart of a method of processing audio, according to an embodiment of the disclosure.

In operation S1605, the audio encoding apparatus 800 may identify a movement and direction of a sound source object based on a correlation and delay between channels of an audio signal including at least one frame.

In operation S1610, the audio encoding apparatus 800 may identify a type and characteristics of the sound source object by using a Gaussian mixed model-based object estimation probability model from the audio signal including the at least one frame.

In operation S1615, the audio encoding apparatus 800 may identify an additional weight parameter for mixing from a surround channel to a height channel based on at least one of the movement, direction, type, or characteristics of the sound source object.

Figure 17A:
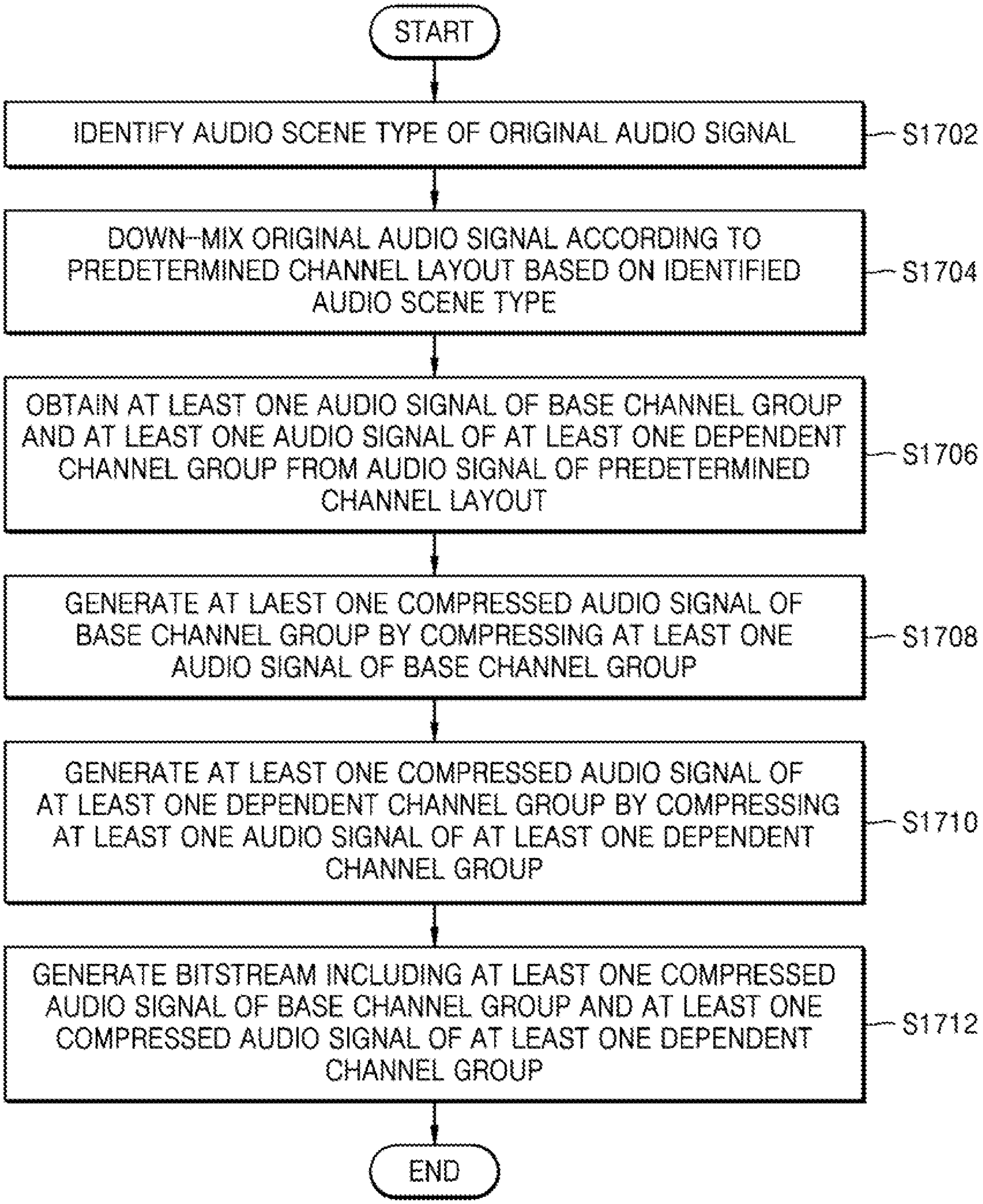
FIG. 17A is a flowchart of an audio processing method according to an embodiment.

FIG. 17A is a flowchart of a method of processing audio, according to an embodiment of the disclosure.

In operation S1702, the audio encoding apparatus 700 may identify an audio scene content type for an original audio signal.

In operation S1704, the audio encoding apparatus 700 may down-mix the original audio signal according to a predetermined channel layout based on the identified audio scene content type.

In operation S1706, the audio encoding apparatus 700 may obtain at least one audio signal of a base channel group and at least one audio signal of at least one dependent channel group from the audio signal of the predetermined channel layout.

In operation S1708, the audio encoding apparatus 700 may generate at least one compressed audio signal of the base channel group by compressing at least one audio signal of the base channel group.

In operation S1710, the audio encoding apparatus 700 may generate at least one compressed audio signal of at least one dependent channel group by compressing at least one audio signal of the at least one dependent channel group.

In operation S1712, the audio encoding apparatus 700 may generate a bitstream that includes the at least one compressed audio signal of the base channel group and the at least one compressed audio signal of the at least one dependent channel group. The audio encoding apparatus 700 may generate a bitstream that further includes information about an audio scene content.

Figure 17B:
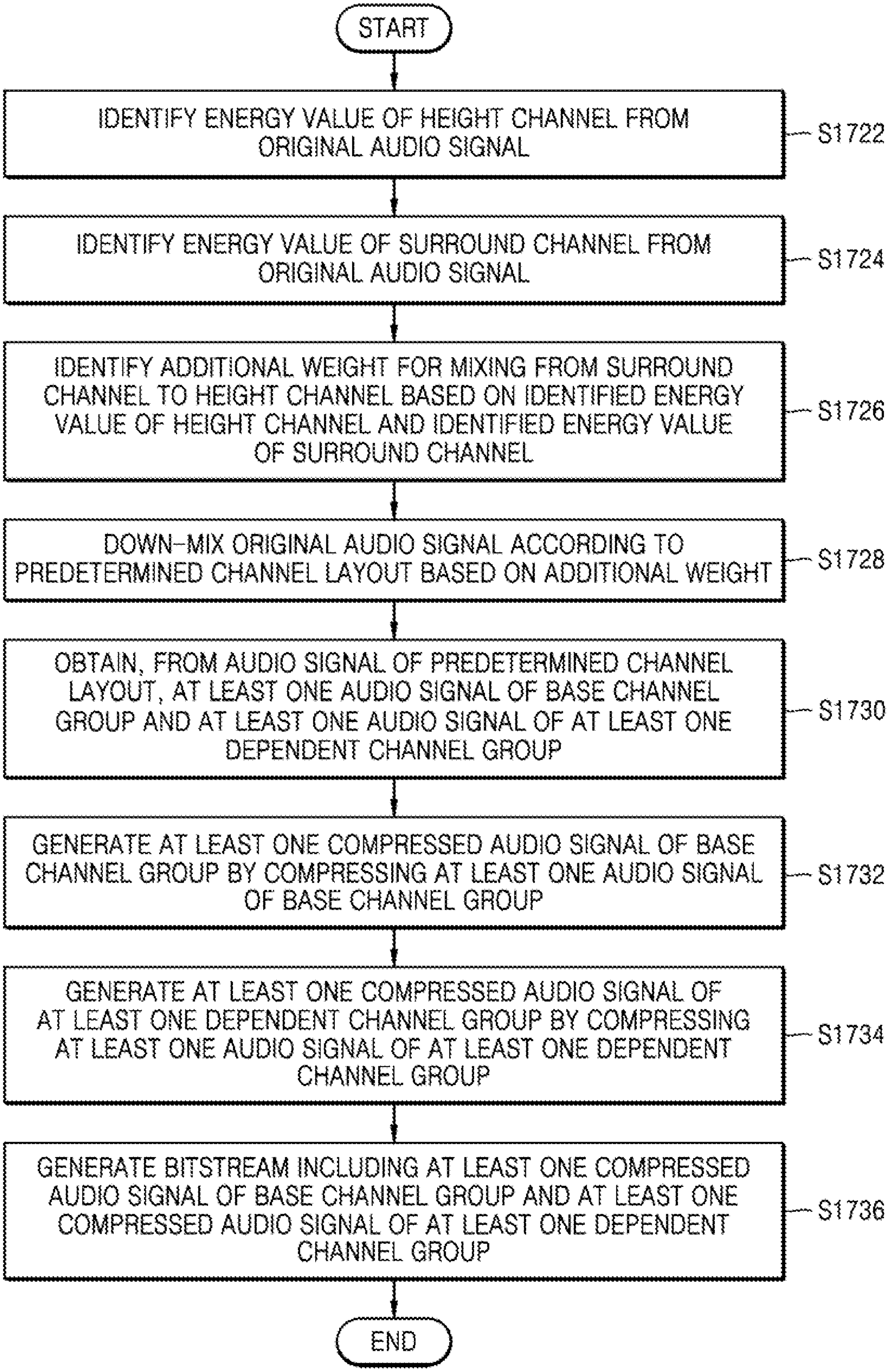
FIG. 17B is a flowchart of an audio processing method according to an embodiment.

FIG. 17B is a flowchart of a method of processing audio, according to an embodiment of the disclosure.

In operation S1722, the audio encoding apparatus 800 may identify an energy value of a height channel from an original audio signal.

In operation S1724, the audio encoding apparatus 800 may identify an energy value of a surround channel from the original audio signal.

In operation S1726, the audio encoding apparatus 800 may identify an additional weight for mixing from the surround channel to the height channel based on the identified energy value of the height channel and the identified energy value of the surround channel.

In operation S1728, the audio encoding apparatus 700 may down-mix the original audio signal according to a predetermined channel layout based on the additional weight.

In operation S1730, the audio encoding apparatus 700 may obtain at least one audio signal of a base channel group and an audio signal of at least one dependent channel group from the audio signal of the predetermined channel layout.

In operation S1732, the audio encoding apparatus 700 may generate at least one compressed audio signal of the base channel group by compressing the at least one audio signal of the base channel group.

In operation S1734, the audio encoding apparatus 700 may generate a compressed audio signal of the at least one dependent channel group by compressing the at least one audio signal of the at least one dependent channel group.

In operation S1736, the audio encoding apparatus 700 may generate a bitstream that includes the at least one compressed audio signal of the base channel group and the at least one compressed audio signal of the at least one dependent channel group. The audio encoding apparatus 700 may generate a bitstream that further includes information about the identified additional weight. More specifically, the audio encoding apparatus 700 may generate a bitstream further including a weight for de-mixing, which is an additional weight that corresponds to the additional weight for mixing. The weight for de-mixing may be a weight for de-mixing from the height channel to the surround channel.

Figure 17C:
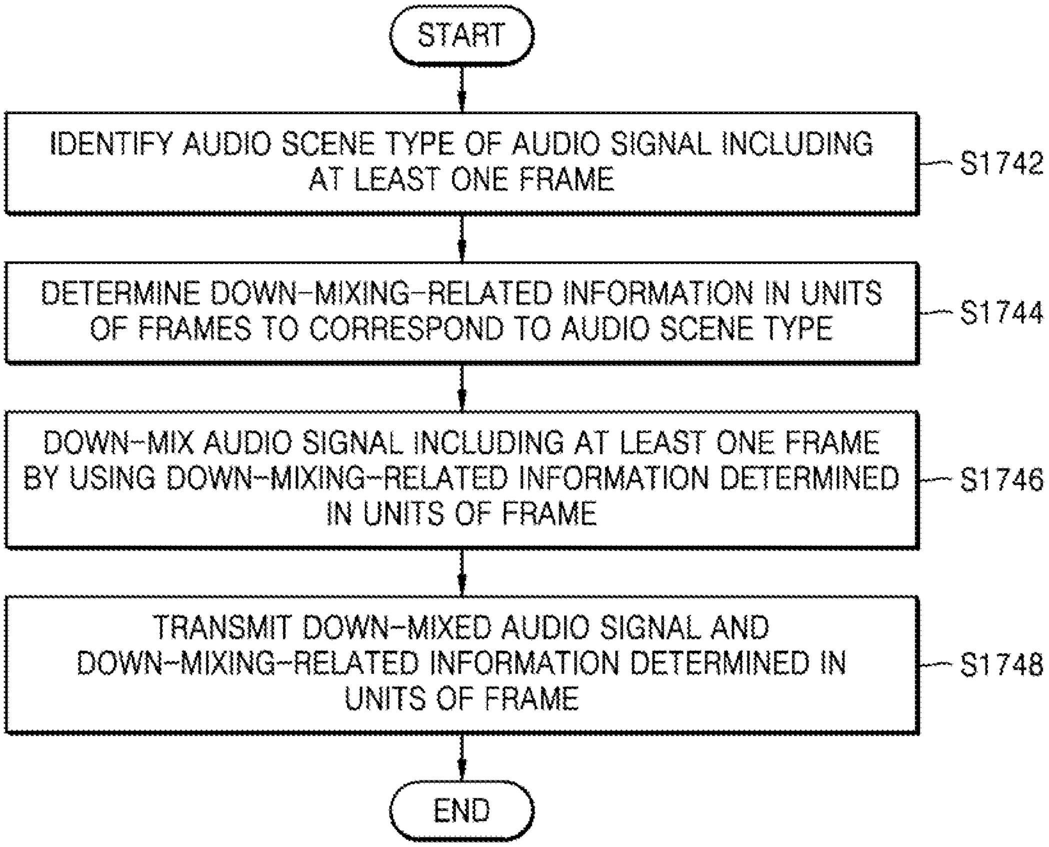
FIG. 17C is a flowchart of an audio processing method according to an embodiment.

FIG. 17C is a flowchart of a method of processing audio, according to an embodiment of the disclosure.

In operation S1742, the audio encoding apparatus 700 may identify an audio scene type for an audio signal including at least one frame.

In operation S1744, the audio encoding apparatus 700 may determine down-mixing-related information in units of frame, to correspond to the audio scene type.

In operation S1746, the audio encoding apparatus 700 may down-mix the audio signal including the at least one frame by using the down-mixing-related information that is determined in units of frame.

In operation S1748, the audio encoding apparatus 700 may transmit the down-mixed audio signal and the down-mixing-related information that is determined in units of frame.

Figure 17D:
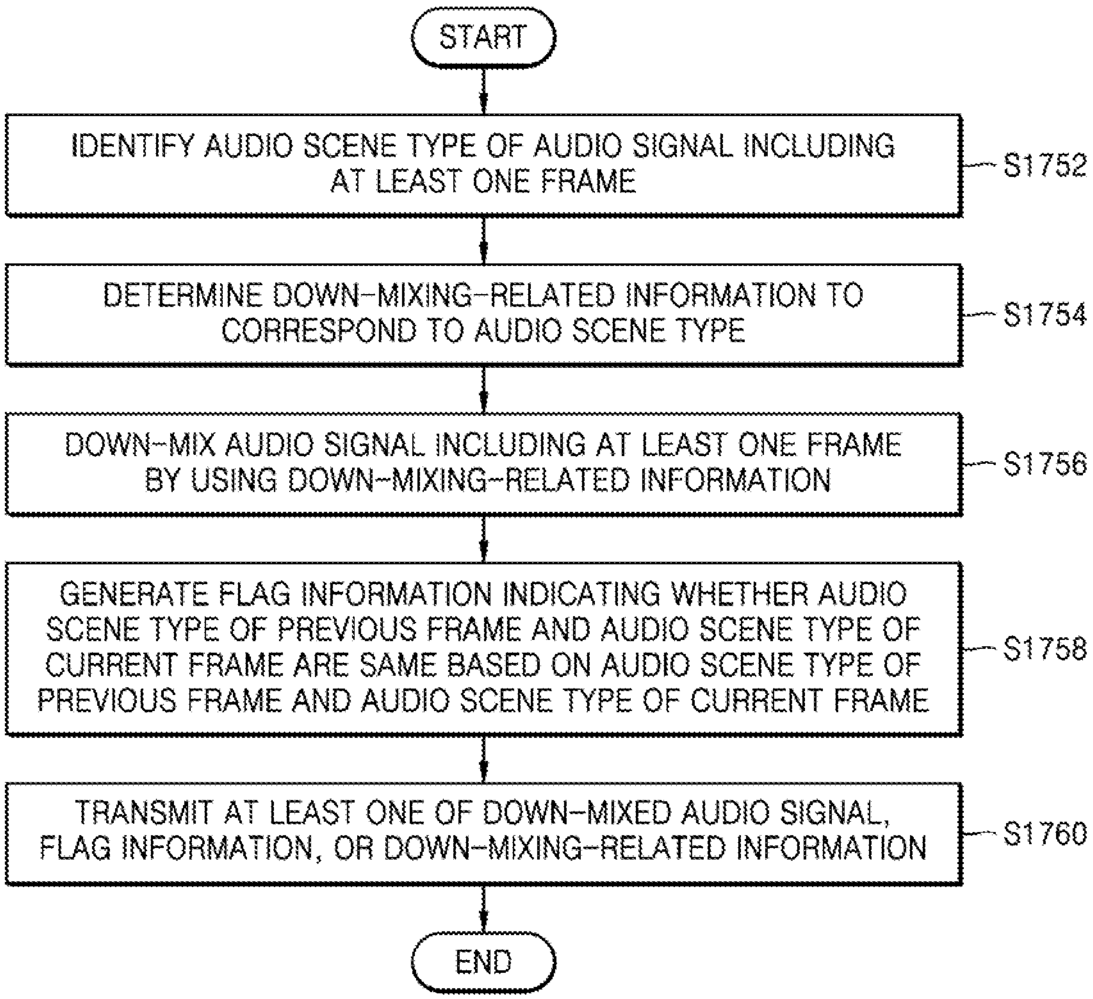
FIG. 17D is a flowchart of an audio processing method according to an embodiment.

FIG. 17D is a flowchart of a method of processing audio, according to an embodiment of the disclosure.

In operation S1752, the audio encoding apparatus 700 may identify an audio scene type for an audio signal including at least one frame.

In operation S1754, the audio encoding apparatus 700 may determine down-mixing-related information in units of frame, to correspond to the audio scene type.

In operation S1756, the audio encoding apparatus 700 may down-mix the audio signal including the at least one frame by using the down-mixing-related information.

In operation S1758, the audio encoding apparatus 700 may generate flag information indicating whether an audio scene type of a previous frame is the same as that of a current frame based on the audio scene type of the previous frame and the audio scene type of the current frame.

According to an embodiment, when the audio scene type of the previous frame is the same as that of the current frame, the audio encoding apparatus 700 may generate flag information indicating that the audio scene type of the previous frame is the same as that of the current frame.

When the audio scene type of the previous frame is not the same as that of the current frame, the audio encoding apparatus 700 may not generate flag information. Because no flag information is generated, flag information may not be transmitted.

According to an embodiment, when the audio scene type of the previous frame is the same as that of the current frame, the audio encoding apparatus 700 may not generate flag information, and because no flag information is generated, flag information may not be transmitted.

When the audio scene type of the previous frame is different from that of the current frame, the audio encoding apparatus 700 may generate flag information.

In operation S1760, the audio encoding apparatus 700 may transmit at least one of the down-mixed audio signal, the flag information, or the down-mixing-related information.

According to an embodiment, when the audio scene type of the previous frame is the same as that of the current frame, the audio encoding apparatus 700 may transmit the down-mixed audio signal and flag information indicating that the audio scene type of the previous frame is the same as that of the current frame. In this case, down-mixing-related information for the current frame may not be additionally transmitted.

When the audio scene type of the previous frame is not the same as that of the current frame, the audio encoding apparatus 700 may transmit the down-mixed audio signal and the down-mixing-related information for the current frame. The flag information may not be additionally transmitted.

In general, when the audio scene type of the previous frame is the same as that of the current frame, flag information and down-mixing-related information for the current frame may not be transmitted.

When the audio scene type of the previous frame is not the same as that of the current frame, the flag information and the down-mixing-related information for the current frame may be transmitted.

However, the disclosure is not limited to the example in which flag information is selectively transmitted, and the audio encoding apparatus 700 may transmit flag information regardless of whether the audio scene type of the previous frame is the same as that of the current frame.

Meanwhile, when audio scene types of frames included in a higher data unit than the frame are the same audio scene type, flag information may be generated for the higher data unit and transmitted. In this case, down-mixing-related information is not transmitted for each frame, and down-mixing-related information about the higher data unit may be transmitted.

Figure 18A:
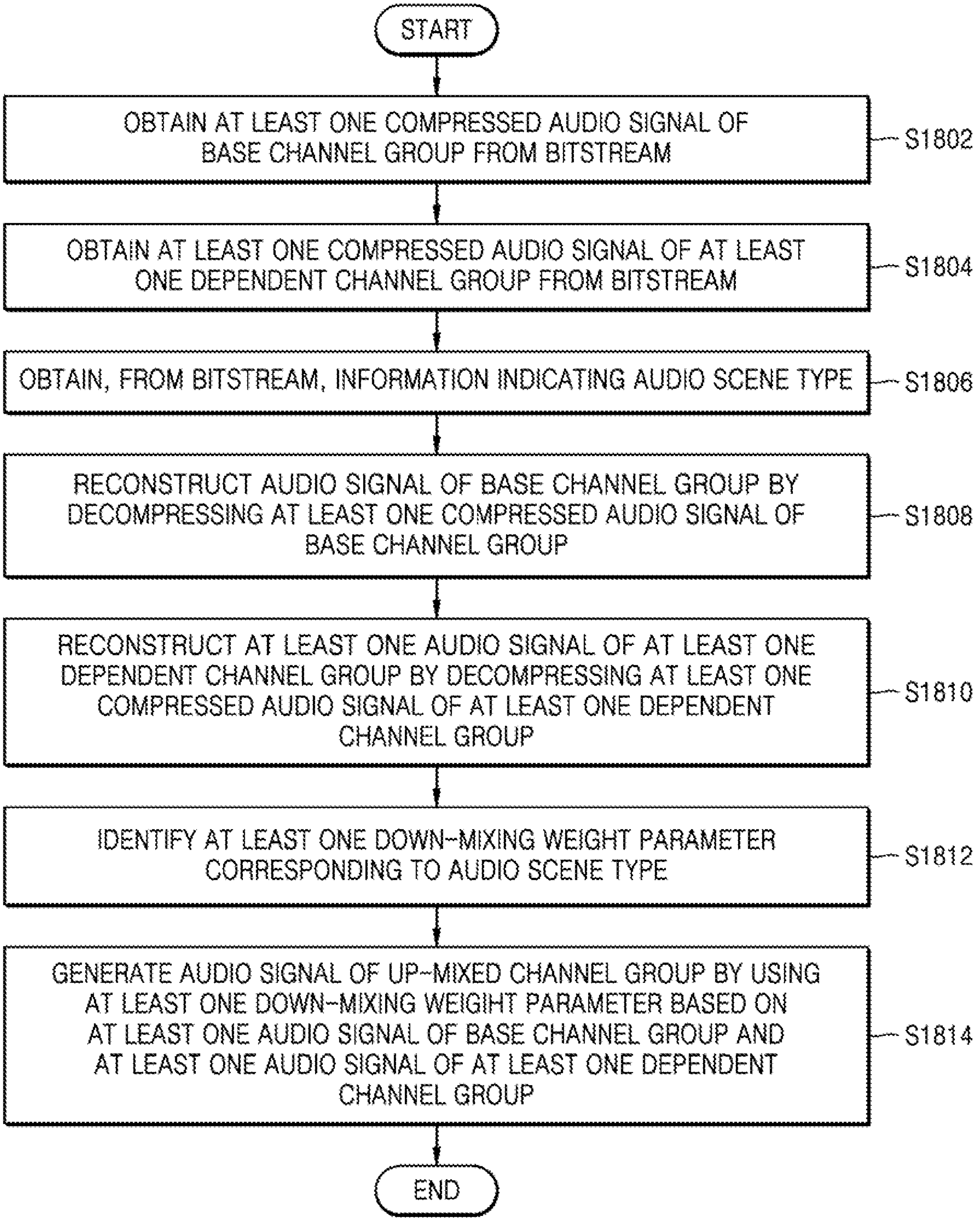
FIG. 18A is a flowchart of an audio processing method according to an embodiment.

FIG. 18A is a flowchart of a method of processing audio, according to an embodiment of the disclosure.

In operation S1802, the audio decoding apparatus 900 may obtain at least one compressed audio signal of a base channel group from a bitstream.

In operation S1804, the audio decoding apparatus 900 may obtain at least one compressed audio signal of at least one dependent channel group from the bitstream.

In operation S1806, the audio decoding apparatus 900 may obtain information indicating an audio scene content type from the bitstream.

In operation S1808, the audio decoding apparatus 900 may reconstruct the audio signal of the base channel group by decompressing the at least one compressed audio signal of the base channel group.

In operation S1810, the audio decoding apparatus 900 may reconstruct at least one audio signal of at least one dependent channel group by decompressing at least one compressed audio signal of the at least one dependent channel group.

In operation S1812, the audio decoding apparatus 900 may identify at least one down-mixing weight parameter corresponding to an audio scene content type.

In operation S1814, the audio decoding apparatus 900 may generate an audio signal of an up-mixed channel group by using the at least one down-mixing weight parameter based on the at least one audio signal of the base channel group and the at least one audio signal of the at least one dependent channel group.

Figure 18B:
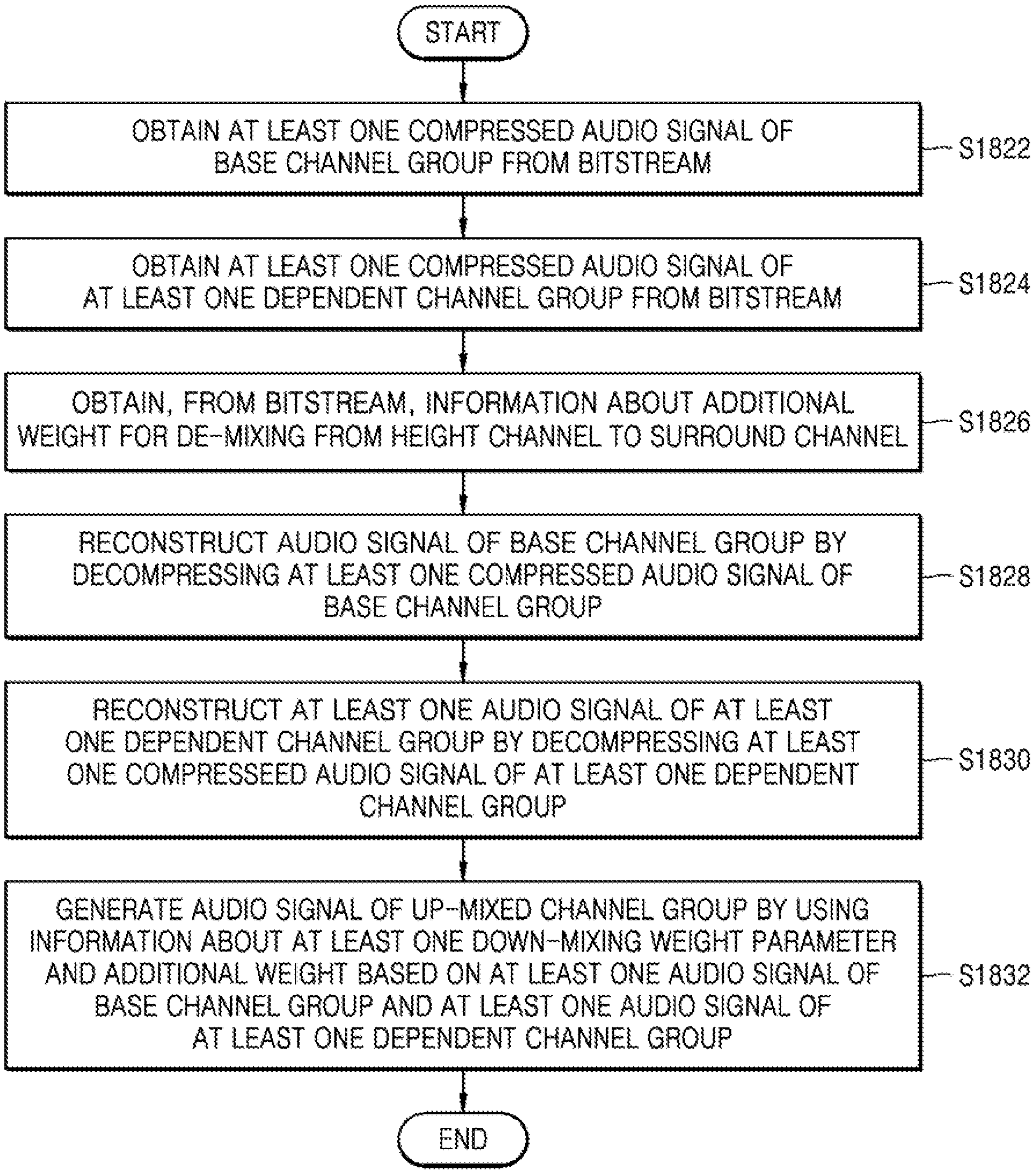
FIG. 18B is a flowchart of an audio processing method according to an embodiment.

FIG. 18B is a flowchart of a method of processing audio, according to an embodiment of the disclosure.

In operation S1822, the audio decoding apparatus 1000 may obtain at least one compressed audio signal of a base channel group from a bitstream.

In operation S1824, the audio decoding apparatus 1000 may obtain at least one compressed audio signal of at least one dependent channel group from the bitstream.

In operation S1826, the audio decoding apparatus 1000 may obtain, from the bitstream, information about an additional weight for de-mixing from a height channel to a surround channel.

In operation S1828, the audio decoding apparatus 1000 may reconstruct an audio signal of the base channel group by decompressing the at least one compressed audio signal of the base channel group.

In operation S1830, the audio decoding apparatus 1000 may reconstruct at least one audio signal of at least one dependent channel group by decompressing the at least one compressed audio signal of the at least one dependent channel group.

In operation S1832, the audio decoding apparatus 1000 may generate an audio signal of an up-mixed channel group by using at least one down-mixing weight parameter and information about an additional weight based on the at least one audio signal of the base channel group and the at least one audio signal of the at least one dependent channel group.

Figure 18C:
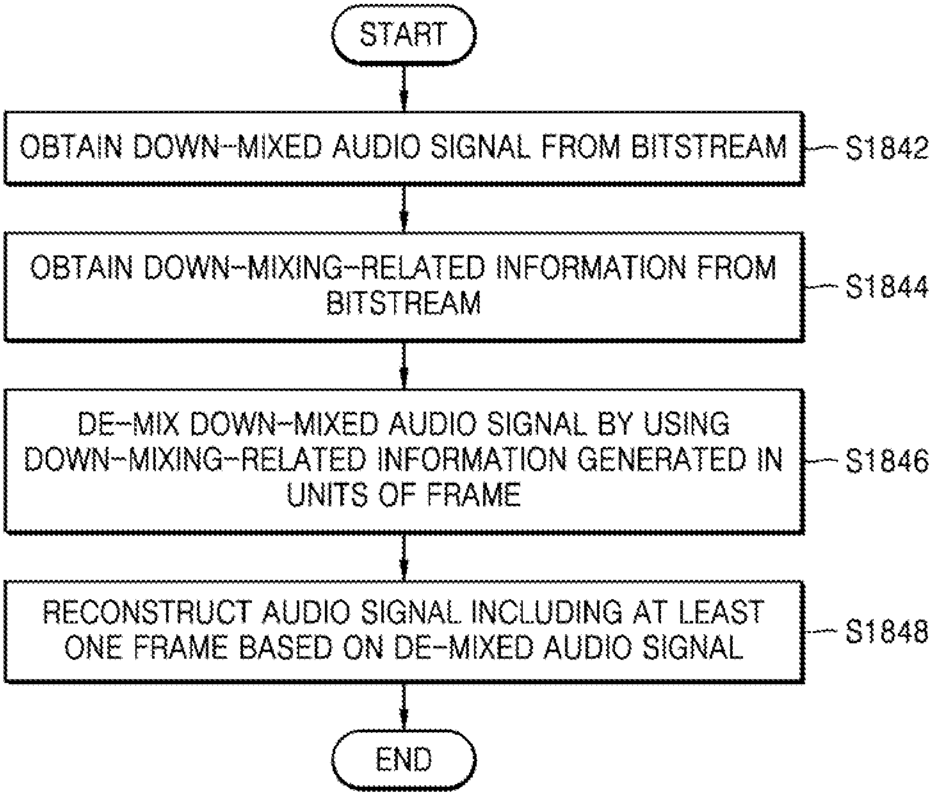
FIG. 18C is a flowchart of an audio processing method according to an embodiment.

FIG. 18C is a flowchart of a method of processing audio, according to an embodiment of the disclosure.

In operation S1842, the audio decoding apparatus 900 may obtain a down-mixed audio signal from a bitstream.

In operation S1844, the audio decoding apparatus 900 may obtain down-mixing-related information from the bitstream. The down-mixing-related information may be information generated in units of frames by using an audio scene type.

In operation S1846, the audio decoding apparatus 900 may de-mix the down-mixed audio signal by using the down-mixing-related information generated in units of frame.

In operation S1848, the audio decoding apparatus 900 may reconstruct an audio signal including at least one frame based on the de-mixed audio signal.

Figure 18D:
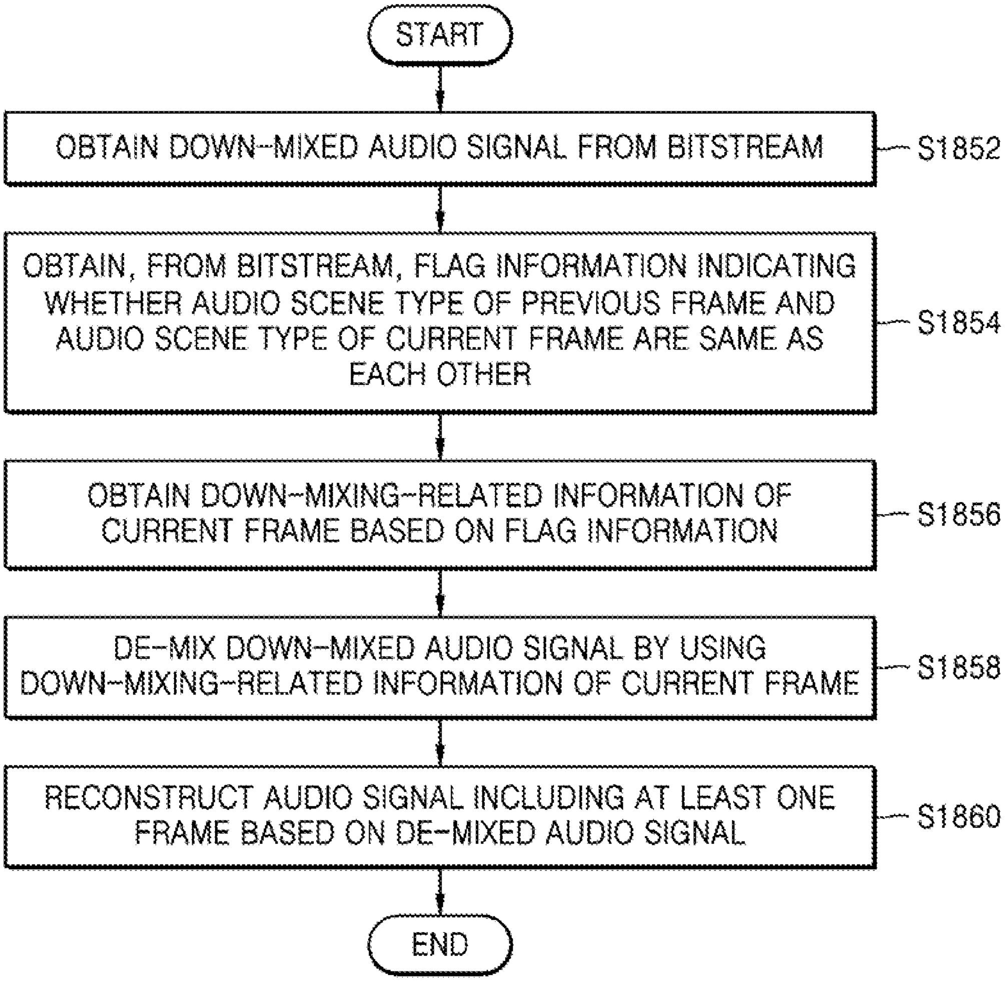
FIG. 18D is a flowchart of an audio processing method according to an embodiment.

FIG. 18D is a flowchart of a method of processing audio, according to an embodiment of the disclosure.

In operation S1852, the audio decoding apparatus 900 may obtain a down-mixed audio signal from a bitstream.

In operation S1854, the audio decoding apparatus 900 may obtain, from the bitstream, flag information indicating whether an audio scene type of a previous frame is the same as that of a current frame. Depending on circumstances, the audio decoding apparatus 900 may not obtain flag information from the bitstream and may induce flag information.

In operation S1856, the audio decoding apparatus 900 may obtain down-mixing-related information about the current frame based on the flag information.

For example, when the flag information indicates that the audio scene type of the previous frame is the same as that of the current frame, the audio decoding apparatus 900 may obtain down-mixing-related information about the current frame based on down-mixing-related information about the previous frame. The audio decoding apparatus 900 may not obtain down-mixing-related information about the current frame from the bitstream.

When the flag information indicates that the audio scene type of the previous frame is not the same as that of the current frame, the audio decoding apparatus 900 may obtain down-mixing-related information about the current frame from the bitstream.

In operation S1858, the audio decoding apparatus 900 may de-mix the down-mixed audio signal by using the down-mixing-related information about the current frame.

In operation S1860, the audio decoding apparatus 900 may reconstruct an audio signal including at least one frame based on the de-mixed audio signal.

Above, the audio decoding apparatuses 900 and 1000 perform an operation of de-mixing a down-mixed audio signal by using down-mixing-related information generated in units of frame. However, an audio signal in a higher channel layout (for example, a 7.1.4 channel layout) than an audio signal in an output channel layout may be reconstructed. That is, an audio signal in an output layout may not be reconstructed through de-mixing.

In this case, the audio decoding apparatuses 900 and 1000 may reconstruct the audio signal in the output channel layout by down-mixing the reconstructed audio signal in the higher channel layout by using the down-mixing-related information generated in units of frame. As a result, the down-mixing-related information received from the audio encoding apparatuses 700 and 800 is not limited to being used in the de-mixing operation by the audio decoding apparatuses 900 and 1000, and may also be used in a down-mixing operation according to circumstances.

However, the flag information is not limited to being transmitted in units of frame, and down-mixing-related information may be signaled fora higher audio data unit (e.g., a parameter sampling unit) including k frames (k is an integer greater than 1). In this case, information about a size of the higher audio data unit and down-mixing-related information received from the higher audio data unit may be signaled through a bitstream. The information about the size of the higher audio data unit may be information about a value of k.

When down-mixing-related information is received from the higher audio data unit, the down-mixing-related information may not be obtained in units of frames included in the higher data unit. For example, down-mixing-related information may be obtained in a first frame included in the higher audio data unit and may not be obtained in frames after the first frame of the higher audio data unit.

Meanwhile, a flag may be obtained in the frames after the first frame of the higher audio data unit.

Based on the flag, when it is identified that an audio scene type of a previous frame is not the same as that of a current frame, down-mixing-related information may be additionally obtained. Down-mixing-related information updated through the flag may be used in frames after the frame in which the flag is obtained in the higher audio data unit.

Meanwhile, when the audio scene type of the previous frame is the same as that of the current frame, a flag for the current frame is not obtained, but down-mixing-related information previously obtained may be used.

According to an embodiment of the disclosure, an original sound effect may be maintained through appropriate down-mixing or up-mixing processing according to an audio scene type.

According to an embodiment of the disclosure, an audio signal may be dynamically mixed so that audio of a surround channel and audio of a height channel may be well represented in a large screen. That is, when audio being reproduced is concentrated in surround, an audio signal of surround channels Ls and Rs may be distributed not only to the L/R channels but also to the height channels, and thereby, the surround effect is maximized. Alternatively, by mixing the audio signal of the surround channels Ls and Rs to the L/R channel and not to the height channel, a horizontal sound and a vertical sound may be distinguished so that the surround effect and the height effect may be expressed in a balanced way at the same time.

Meanwhile, the above-described embodiments of the disclosure may be written as a program or instruction executable on a computer, and the program or instruction may be stored in a storage medium.

The machine-readable storage medium may be provided in the form of a non-transitory storage medium. Wherein, the term “non-transitory storage medium” simply means that the storage medium is a tangible device and does not include a signal (e.g., an electromagnetic wave), but this term does not differentiate between where data is semi-permanently stored in the storage medium and where the data is temporarily stored in the storage medium. For example, the "non-transitory storage medium" may include a buffer in which data is temporarily stored.

According to an embodiment of the disclosure, the method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. When distributed online, at least a part of the computer program product (e.g., a downloadable app) may be at least temporarily stored or temporarily generated in the machine-readable storage medium, such as memory of the manufacturer's server, a server of the application store, or a relay server.

Meanwhile, the model associated with the neural network described above may be implemented as a software module. When implemented as a software module (e.g., a program module including an instruction), the neural network model may be stored on a computer-readable readable recording medium.

In addition, the neural network model may be integrated in the form of a hardware chip, and may be a part of the apparatus described above. For example, the neural network model may be manufactured in the form of a dedicated hardware chip for artificial intelligence, or as a part of a conventional universal processor (e.g., a CPU or AP) or a dedicated graphics processor (e.g., a GPU).

In addition, the neural network model may be provided in the form of downloadable software. The computer program product may include a product (e.g., a downloadable application) in the form of a software program electronically distributed electronically through a manufacturer or an electronic market. For the electronic distribution, at least a part of the software program may be stored in a storage medium or temporarily generated. In this case, the storage medium may be a server of the manufacturer or the electronic market, or a storage medium of a relay server.

The technical spirit of the disclosure is described in detail with reference to example embodiments, but the technical spirit of the disclosure is not limited to the above embodiments, and various changes and modifications may be made to the technical spirit of the disclosure by those of ordinary skill in the art within the technical spirit of the disclosure, without being limited to the foregoing embodiments.

The invention claimed is:

1. A method of processing audio, the method comprising:

identifying, by an audio encoding apparatus, an audio scene type of an audio signal for each frame of the audio signal;

determining, by the audio encoding apparatus, down-mixing-related information for each frame of the audio signal based on the audio scene type;

down-mixing, by the audio encoding apparatus, the audio signal by using the down-mixing-related information to generate a down-mixed audio signal of a predetermined channel layout; and transmitting, by the audio encoding apparatus, the down-mixed audio signal and the down-mixing-related information.

2. The method of claim 1, wherein the identifying of the audio scene type comprises:

obtaining a center channel audio signal from the audio signal;

identifying a dialogue type from the obtained center channel audio signal;

obtaining a front channel audio signal and a side channel audio signal from the audio signal;

identifying a sound effect type based on the front channel audio signal and the side channel audio signal; and identifying the audio scene type based on at least one of the identified dialogue type or the identified sound effect type.

3. The method of claim 2, wherein the identifying of the dialogue type comprises:

identifying the dialogue type by using a first neural network for identifying the dialogue type;

identifying the dialogue type as a first dialogue type when a probability value of the dialogue type identified by using the first neural network is greater than a predetermined first probability value for the first dialogue type; and identifying the dialogue type as a default dialogue type when the probability value of the dialogue type identified by using the first neural network is less than or equal to the predetermined first probability value.

4. The method of claim 3, wherein the identifying of the sound effect type comprises:

identifying the sound effect type by using a second neural network for identifying the sound effect type;

identifying the sound effect type as a first sound effect type when a probability value of the sound effect type identified by using the second neural network is greater than a predetermined second probability value for the first sound effect type; and identifying the sound effect type as a default sound effect type when the probability value of the sound effect type identified by using the second neural network is less than or equal to the predetermined second probability value.

5. The method of claim 2, wherein the identifying of the audio scene type based on the at least one of the identified dialogue type or the identified sound effect type comprises:

identifying the audio scene type as a first dialogue type when the identified dialogue type is the first dialogue type;

identifying the audio scene type as a first sound effect type when the identified sound effect type is the first sound effect type; and identifying the audio scene type as a default type when the identified dialogue type is the default type and the identified sound effect type is the default type.

6. The method of claim 1, wherein the transmitted down-mixing-related information comprises index information indicating one of a plurality of audio scene types.

7. The method of claim 1, further comprising: detecting a sound source object; and identifying an additional weight parameter for mixing from a surround channel to a height channel, based on information about the detected sound source object, wherein the down-mixing-related information further comprises the additional weight parameter.

8. The method of claim 1, further comprising:

identifying an energy value of a height channel audio signal from the audio signal;

identifying an energy value of a surround channel audio signal from the audio signal; and identifying an additional weight parameter for mixing from the surround channel to the height channel, based on the identified energy value of the height channel audio signal and the identified energy value of the surround channel audio signal, wherein the down-mixing-related information further comprises the additional weight parameter.

9. The method of claim 8, wherein the identifying of the additional weight parameter comprises:

identifying the additional weight parameter as a first value, when the energy value of the height channel audio signal is greater than a predetermined first value and a ratio of the energy value of the height channel audio signal to the energy value of the surround channel audio signal is greater than a predetermined second value; and identifying the additional weight parameter as a second value, when the energy value of the height channel audio signal is less than or equal to the predetermined first value or the ratio is less than or equal to the predetermined second value.

10. The method of claim 8, wherein the identifying of the additional weight parameter comprises:

identifying a weight level for at least one time section of the audio signal based on a weight target ratio within audio content of the audio signal; and identifying the additional weight parameter corresponding to the weight level, and wherein a weight of a boundary section between a first time section of the audio signal and a second time section of the audio signal has a value between a weight of a remaining section of the first time section excluding the boundary section and a weight of a remaining section of the second time section excluding the boundary section.

11. The method of claim 1, wherein the down-mixing comprises:

identifying a down-mix profile corresponding to the audio scene type;

obtaining, according to the down-mix profile, a down-mixing weight parameter for mixing from a first audio signal of at least one first channel to a second audio signal of a second channel; and down-mixing the audio signal based on the obtained down-mixing weight parameter, and wherein the down-mixing weight parameter corresponding to the audio scene type is previously determined.

12. The method of claim 7, wherein the detecting of the sound source object comprises:

identifying a movement of the sound source object and a direction of the sound source object based on correlation and delay between channels of the audio signal; and identifying a type of the sound source object and characteristics of the sound source object from the audio signal by using a Gaussian mixed model-based object estimation probability model, wherein the information about the detected sound source object comprises information about at least one of the movement of the sound source object, the direction of the sound source object, the type of the sound source object, or the characteristics of the sound source object, and wherein the identifying the additional weight parameter comprises identifying the additional weight parameter for mixing from the surround channel to the height channel based on the at least one of the movement of the sound source object, the direction of the sound source object, the type of the sound source object, or the characteristics of the sound source object.

13. The method of claim 1, wherein the identifying of the audio scene type comprises:

down-sampling, by the audio encoding apparatus, the audio signal; and identifying, by the audio encoding apparatus, the audio scene type based on the down-sampled audio signal.

14. A method of processing audio, the method comprising:

obtaining, by an audio decoding apparatus, a down-mixed audio signal from a bitstream;

obtaining, by the audio decoding apparatus, down-mixing-related information from the bitstream, wherein the down-mixing-related information is generated for each frame by using an audio scene type identified for each frame;

de-mixing, by the audio decoding apparatus, the down-mixed audio signal by using the down-mixing-related information to generate a de-mixed audio signal of a predetermined channel layout; and reconstructing, by the audio decoding apparatus, an audio signal comprising at least one frame based on the de-mixed audio signal.

15. The method of claim 14, wherein the audio scene type is identified based on at least one of a dialogue type or a sound effect type.

16. The method of claim 15, wherein the audio signal comprises an up-mixed channel group audio signal, wherein the up-mixed channel group audio signal comprises an up-mixed channel audio signal of at least one up-mixed channel, and wherein the up-mixed channel audio signal comprises a second audio signal that is obtained through de-mixing from a first audio signal of at least one first channel.

17. The method of claim 14, wherein the down-mixing-related information further comprises information about an additional weight parameter for de-mixing from a height channel to a surround channel, and wherein the reconstructing of the audio signal comprises reconstructing the audio signal by using a down-mixing weight parameter and the information about the additional weight parameter.

18. A non-transitory computer-readable recording medium having recorded thereon a program for implementing the method of claim 1.

* * * * *